(12) United States Patent
Caldwell et al.

(10) Patent No.: US 7,227,682 B2
(45) Date of Patent: Jun. 5, 2007

(54) WIDE-RANGE, WIDE-ANGLE COMPOUND ZOOM WITH SIMPLIFIED ZOOMING STRUCTURE

(75) Inventors: James Brian Caldwell, Petersburg, VA (US); Iain A. Neil, Calabasas, CA (US)

(73) Assignee: Panavision International, L.P., Woodland Hills, CA (US)

( * ) Notice: Subject to any disclaimer, the term of this patent is extended or adjusted under 35 U.S.C. 154(b) by 193 days.

(21) Appl. No.: 11/101,933

(22) Filed: Apr. 8, 2005

(65) Prior Publication Data

US 2006/0227415 A1    Oct. 12, 2006

(51) Int. Cl.
G02B 23/00    (2006.01)
G02B 15/14    (2006.01)

(52) U.S. Cl. ............. 359/432; 362/363; 362/434; 362/680; 362/682; 362/686; 362/689; 362/715; 359/716; 359/726; 359/737; 359/740; 359/781; 359/665

(58) Field of Classification Search ........ 359/680–682, 359/686, 689, 715, 716, 726, 737, 740, 781, 359/665–667, 362, 363, 432, 434
See application file for complete search history.

(56) References Cited

U.S. PATENT DOCUMENTS

| | | | |
|---|---|---|---|
| 2,454,686 A | 11/1948 | Back | |
| 3,192,829 A | 7/1965 | Yamaji | |
| 3,947,084 A | 3/1976 | Noyes | |
| 3,970,366 A | 7/1976 | Sekiguchi | |
| 4,033,674 A | 7/1977 | Sekiguchi | |
| 4,147,410 A * | 4/1979 | Shimomura et al. | 359/680 |
| 4,411,488 A | 10/1983 | Neil | |
| 4,676,581 A | 6/1987 | Roberts | |
| 4,909,614 A | 3/1990 | Itoh et al. | |
| 4,971,428 A | 11/1990 | Moskovich | |
| 5,194,886 A | 3/1993 | Mukai et al. | |
| 5,270,857 A | 12/1993 | Oizumi et al. | |
| 5,448,411 A | 9/1995 | Morooka | |

(Continued)

FOREIGN PATENT DOCUMENTS

CA    2 306 249 A    4/1999

(Continued)

OTHER PUBLICATIONS

D. F. Horne, "Lens mechanism technology," Crane, Russak & Company, Inc., New York, Oct. 1975 (p. 39).

(Continued)

*Primary Examiner*—Evelyn A. Lester
(74) *Attorney, Agent, or Firm*—Morrison & Foerster LLP

(57) ABSTRACT

A zoom lens is disclosed having a zoom ratio larger than four with a field of view at the short focal length position larger than 85 degrees and with a minimal number of moving groups. The zoom lens utilizes a compound zoom structure comprising an NP or NPP zoom kernel followed by a P or PP zoom relay, with only two or three moving groups that can be used for both zooming, focusing and athermalization. An overall compact package size is achieved by the use of prisms to fold the optical path in strategic locations. An optional variable power liquid cell can provide close focusing with little or no focus breathing.

44 Claims, 38 Drawing Sheets

U.S. PATENT DOCUMENTS

| | | |
|---|---|---|
| 5,721,641 A | 2/1998 | Aoki |
| 5,771,123 A | 6/1998 | Hamano |
| 5,790,309 A | 8/1998 | Ohtake |
| 5,835,272 A | 11/1998 | Kodama |
| 6,157,494 A | 12/2000 | Nagata |
| 6,369,954 B1 | 4/2002 | Berge et al. |
| 6,961,188 B2 * | 11/2005 | Betensky et al. ........... 359/432 |
| 7,142,370 B2 * | 11/2006 | Sato ........................... 359/686 |
| 2003/0133200 A1 * | 7/2003 | Sato ........................... 359/686 |

FOREIGN PATENT DOCUMENTS

| | | |
|---|---|---|
| GB | 2 141 260 A | 12/1984 |

OTHER PUBLICATIONS

Ellis I. Betensky et al., "Zoom Lenses II," Proceedings of SPIE-The International Society for Optical Engineering, SPIE vol. 3129, Jul. 28-29, 1997 (pp. 90-96).

Stein Kuiper et al., "Wet & Wild", OE Magazine, Jan. 2005, pp. 20-23.

* cited by examiner

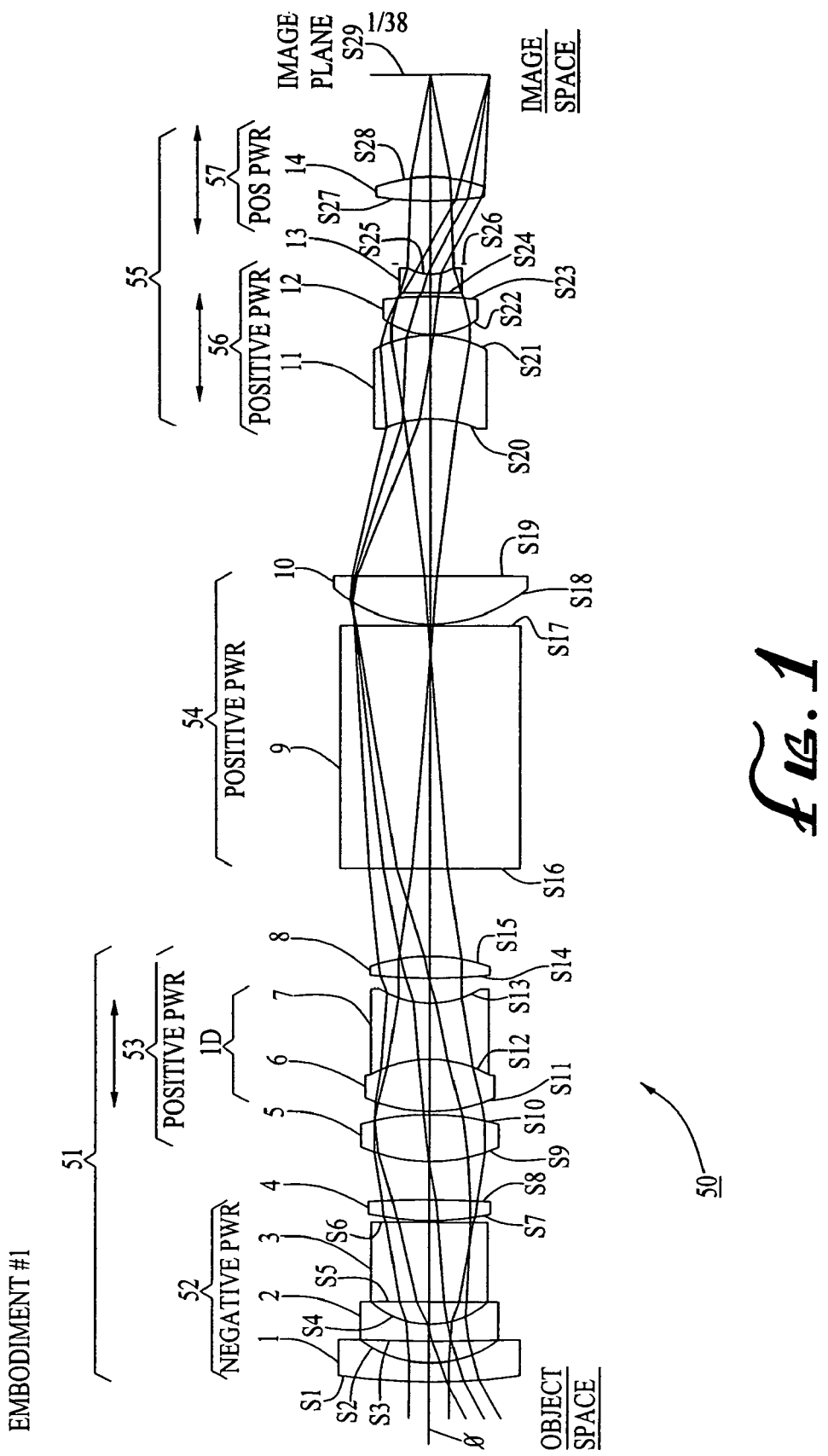

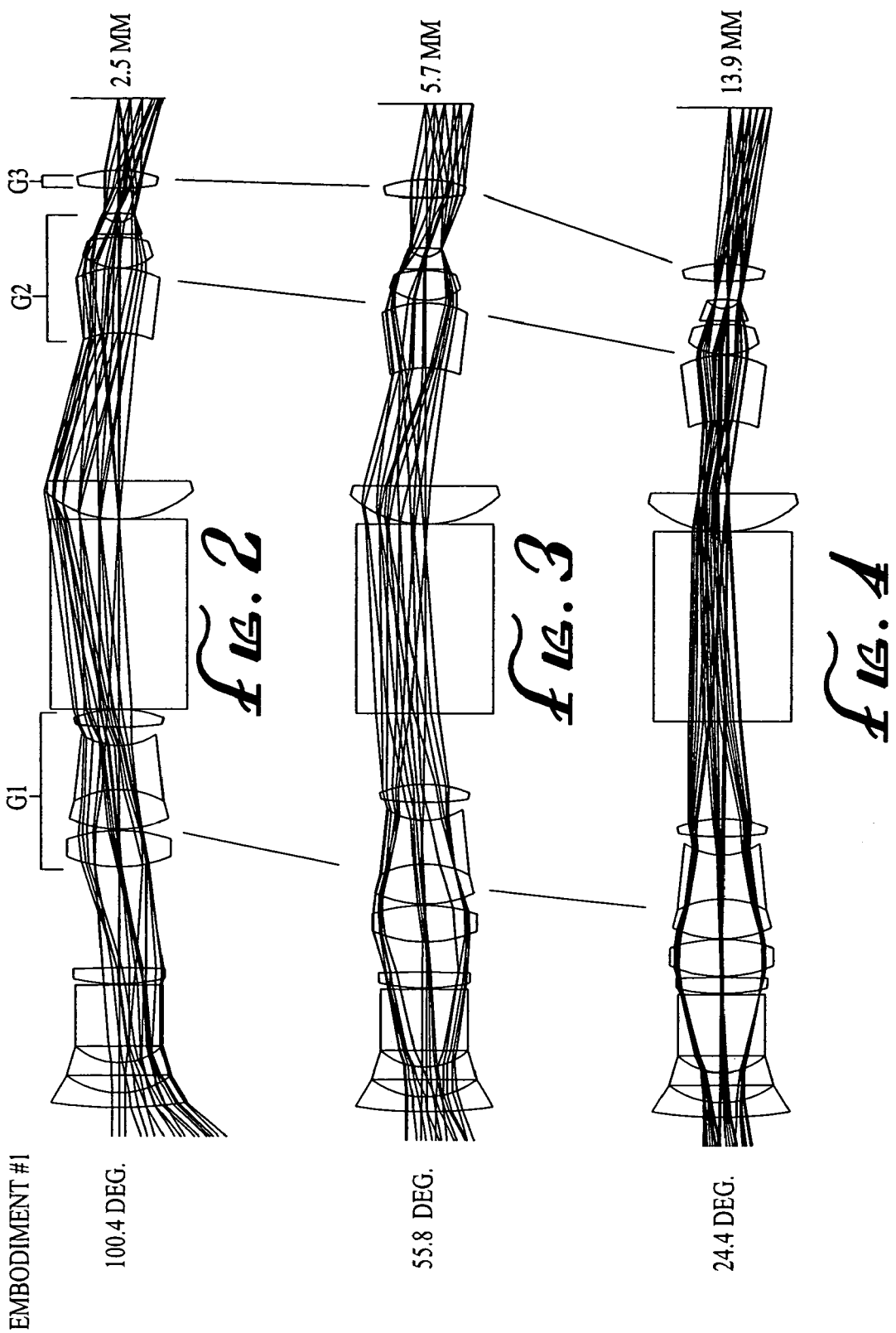

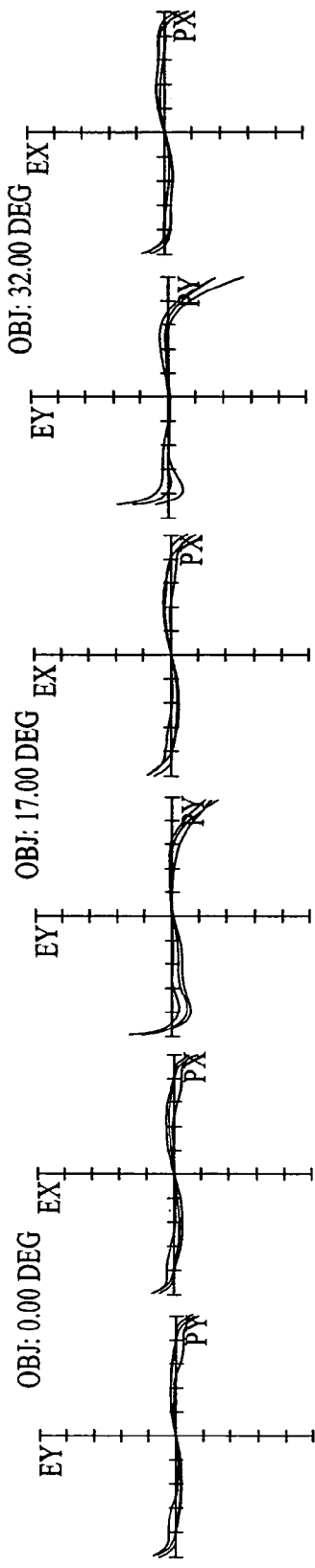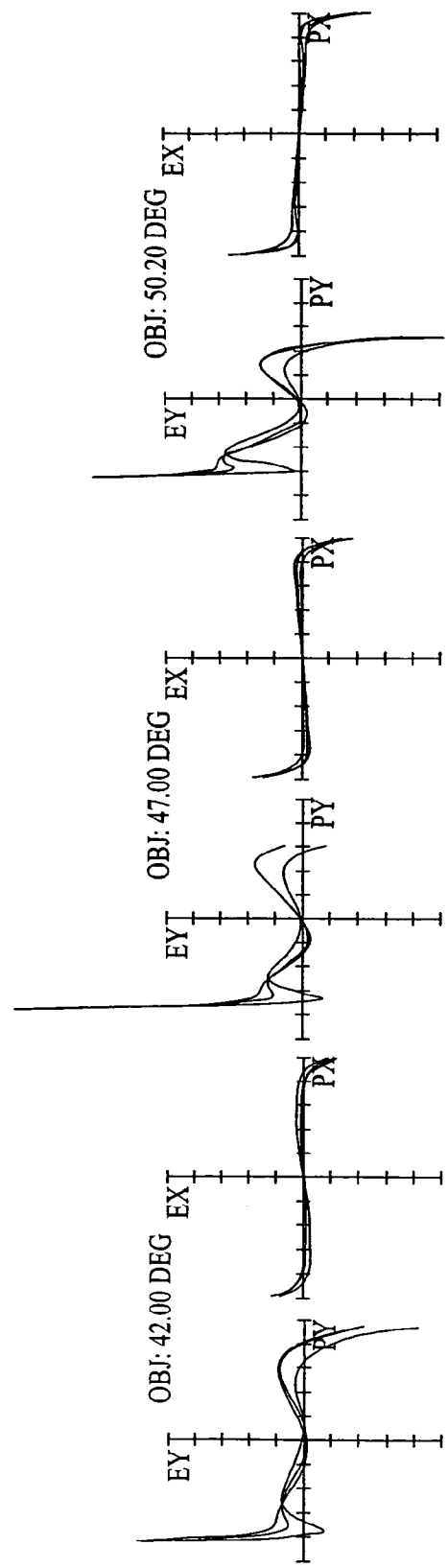
Fig. 8
TRANSVERSE RAY FAN PLOT
EFL = 2.5MM
MAXIMUM SCALE: +/- 50.000 MICRONS

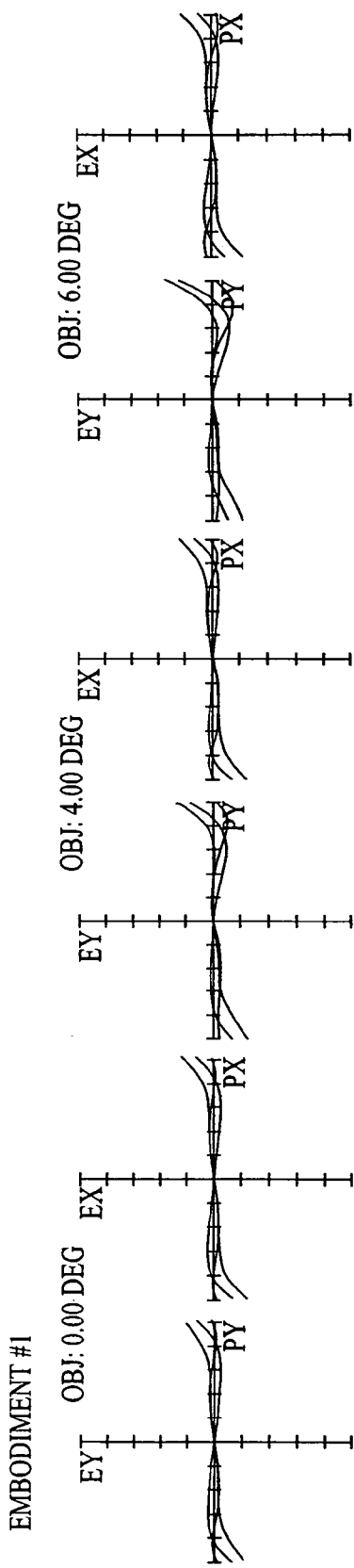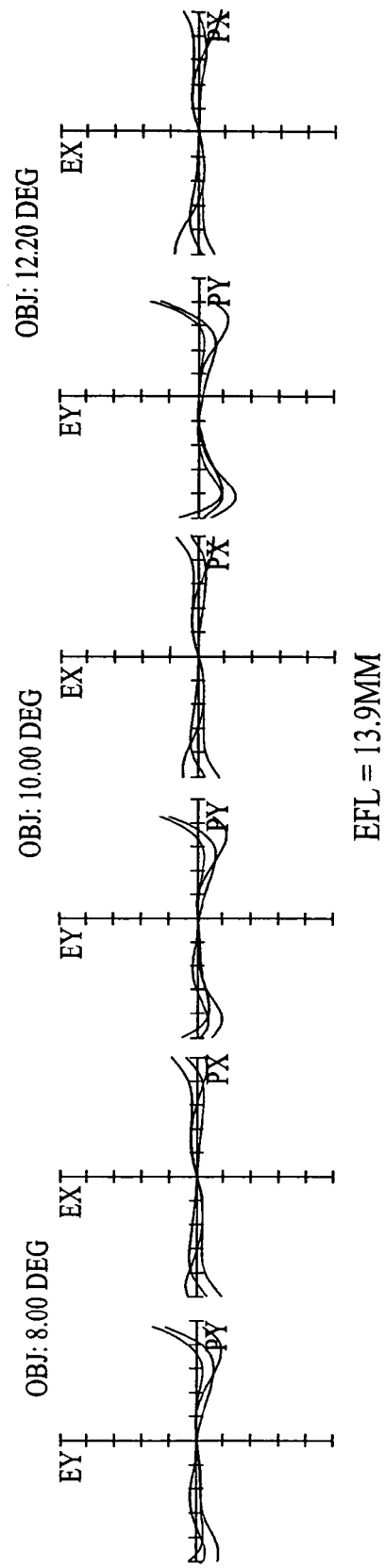
Fig. 10
TRANSVERSE RAY FAN PLOT
EFL = 13.9MM
MAXIMUM SCALE: +/- 50.000 MICRONS

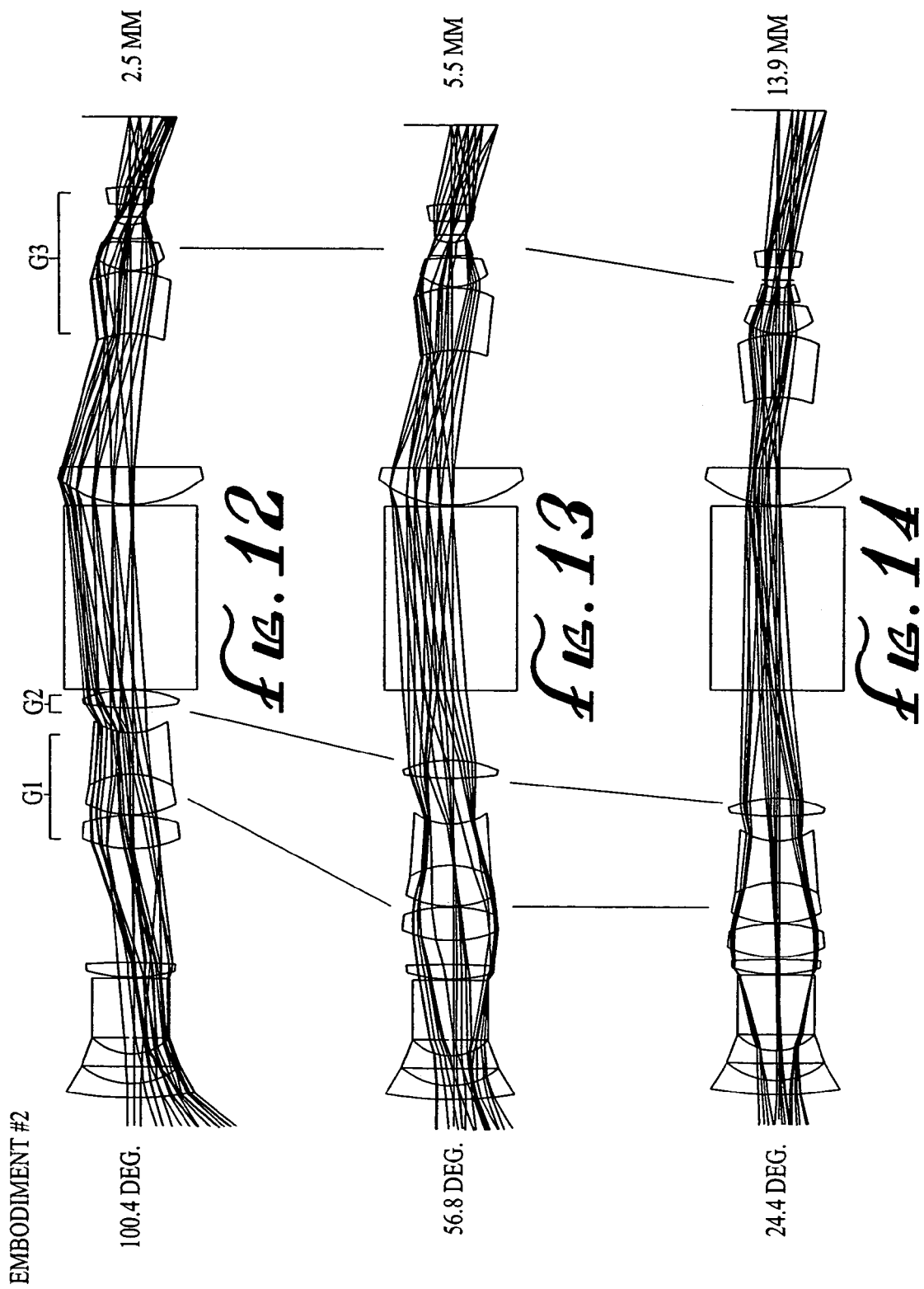

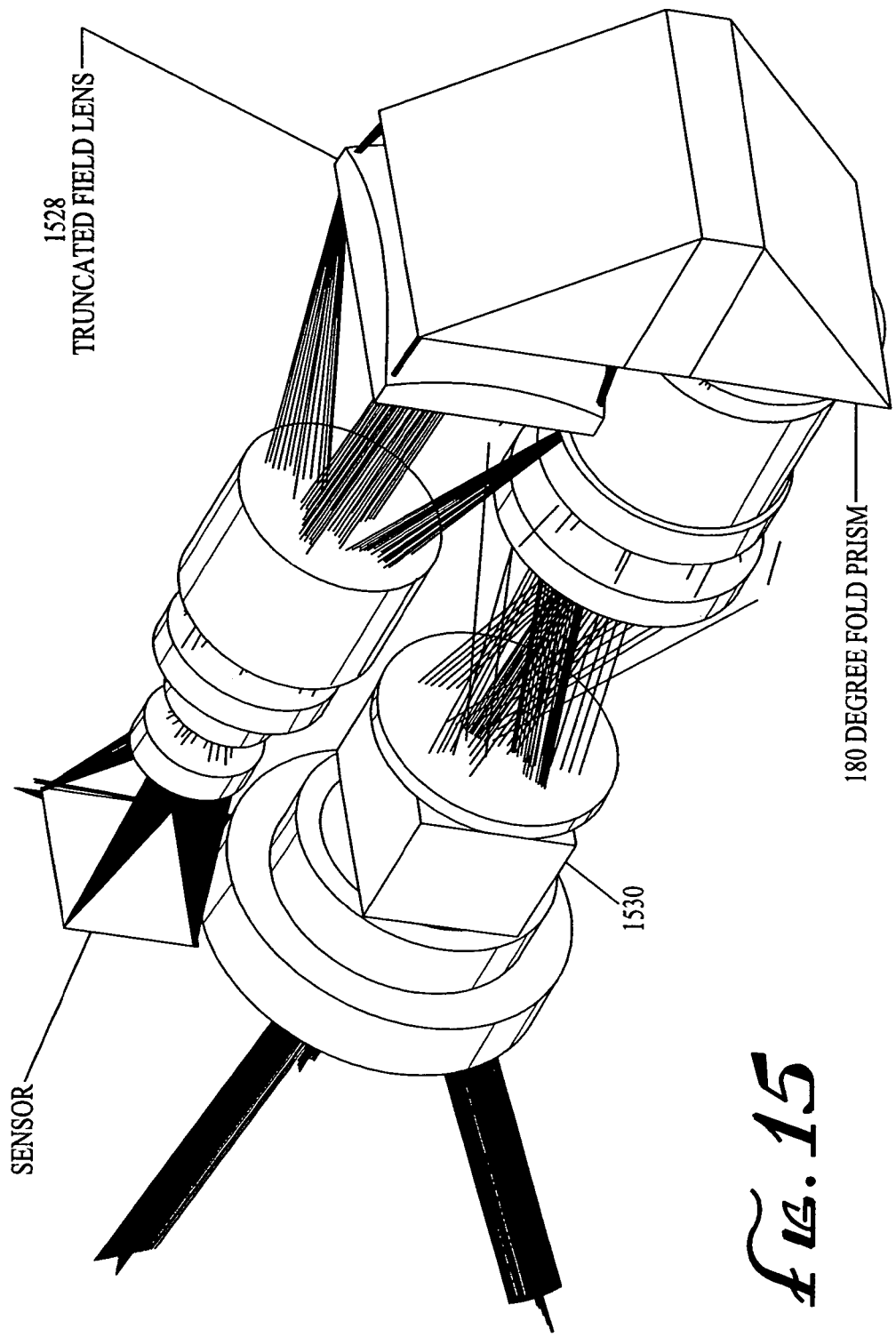

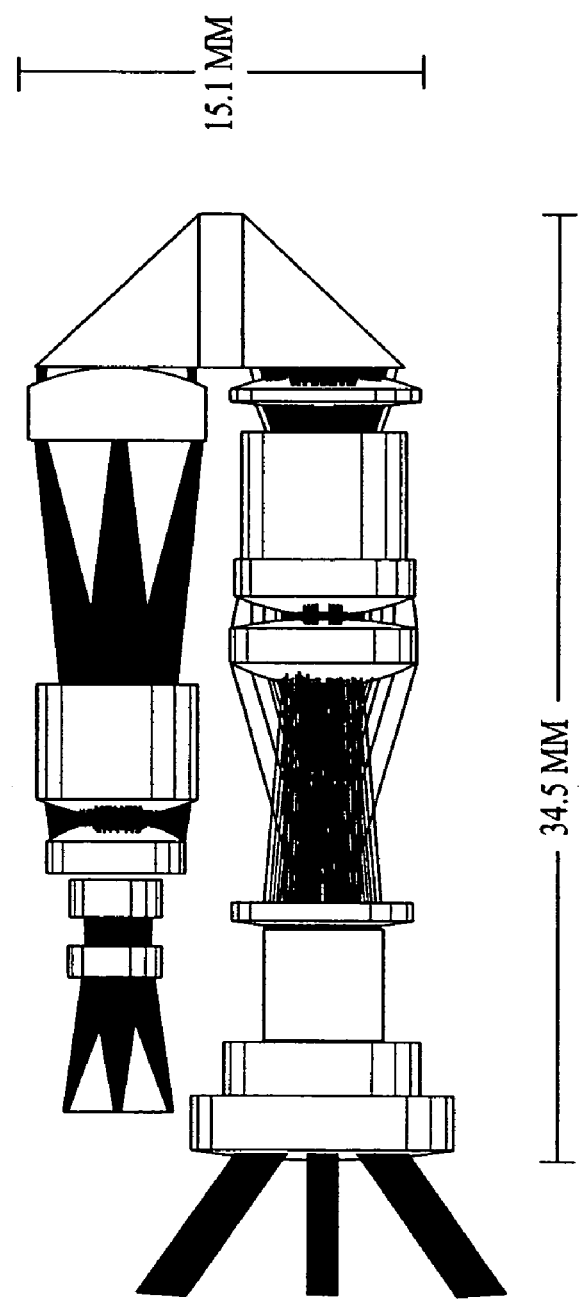

EMBODIMENT #2

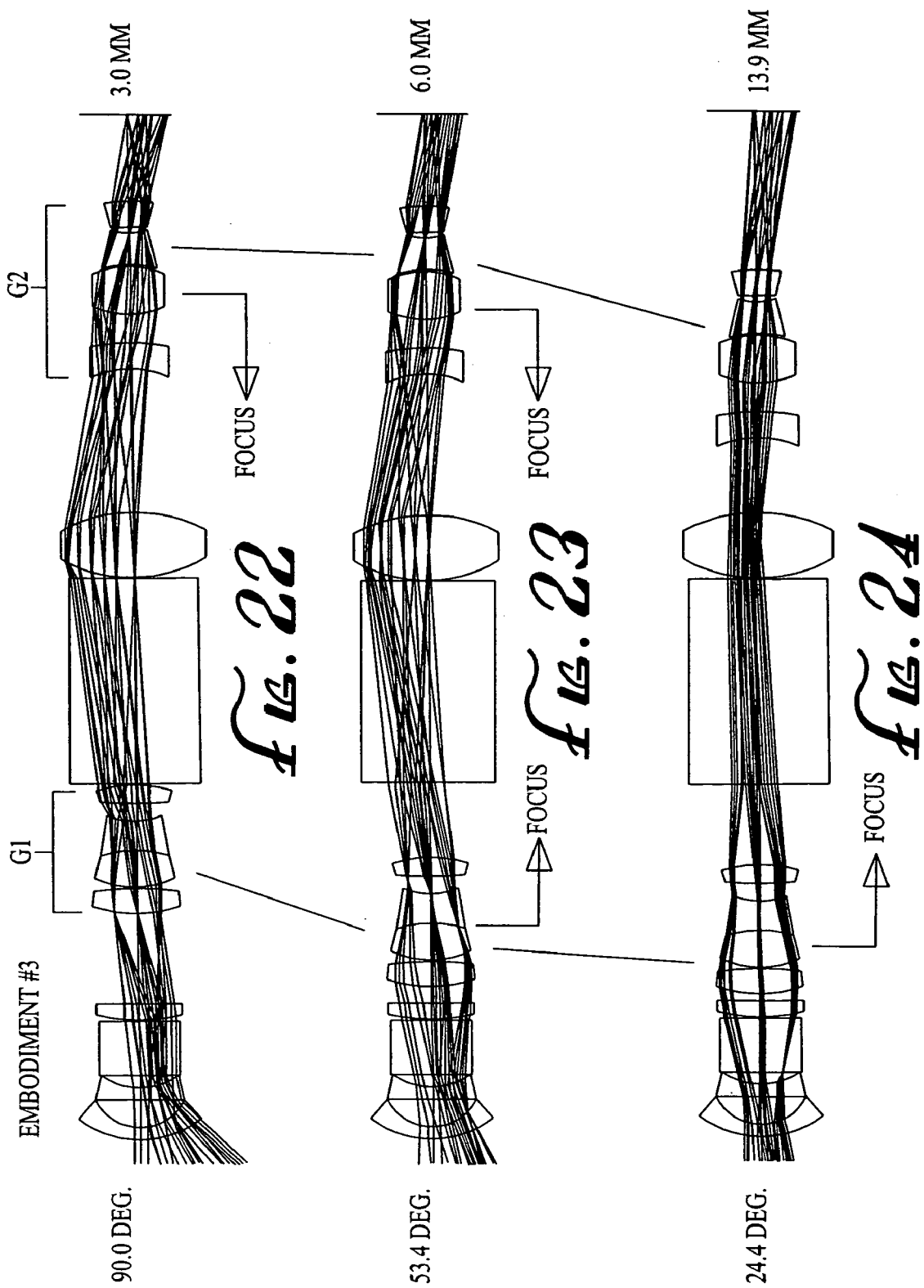

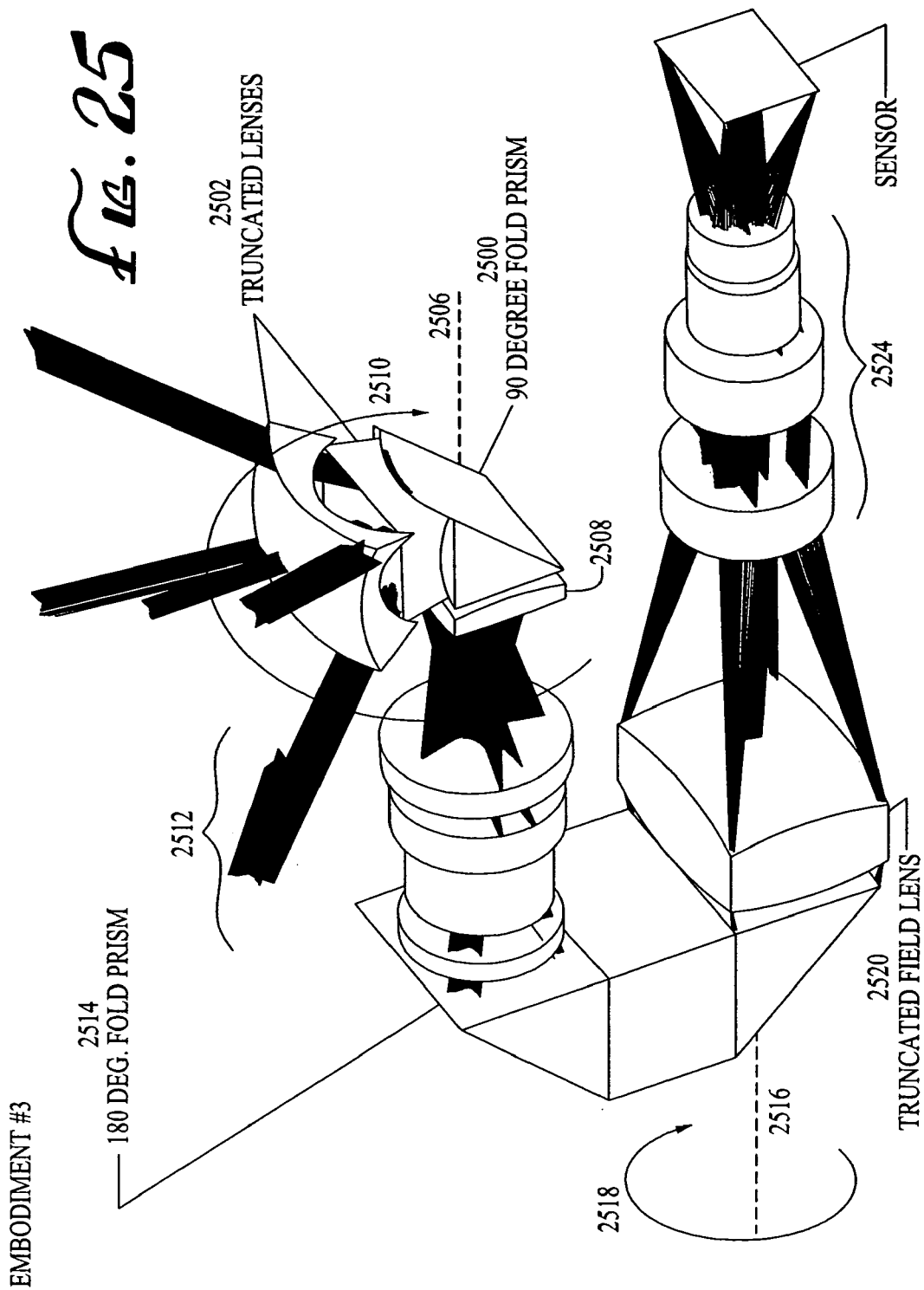

EMBODIMENT #3

EMBODIMENT #3

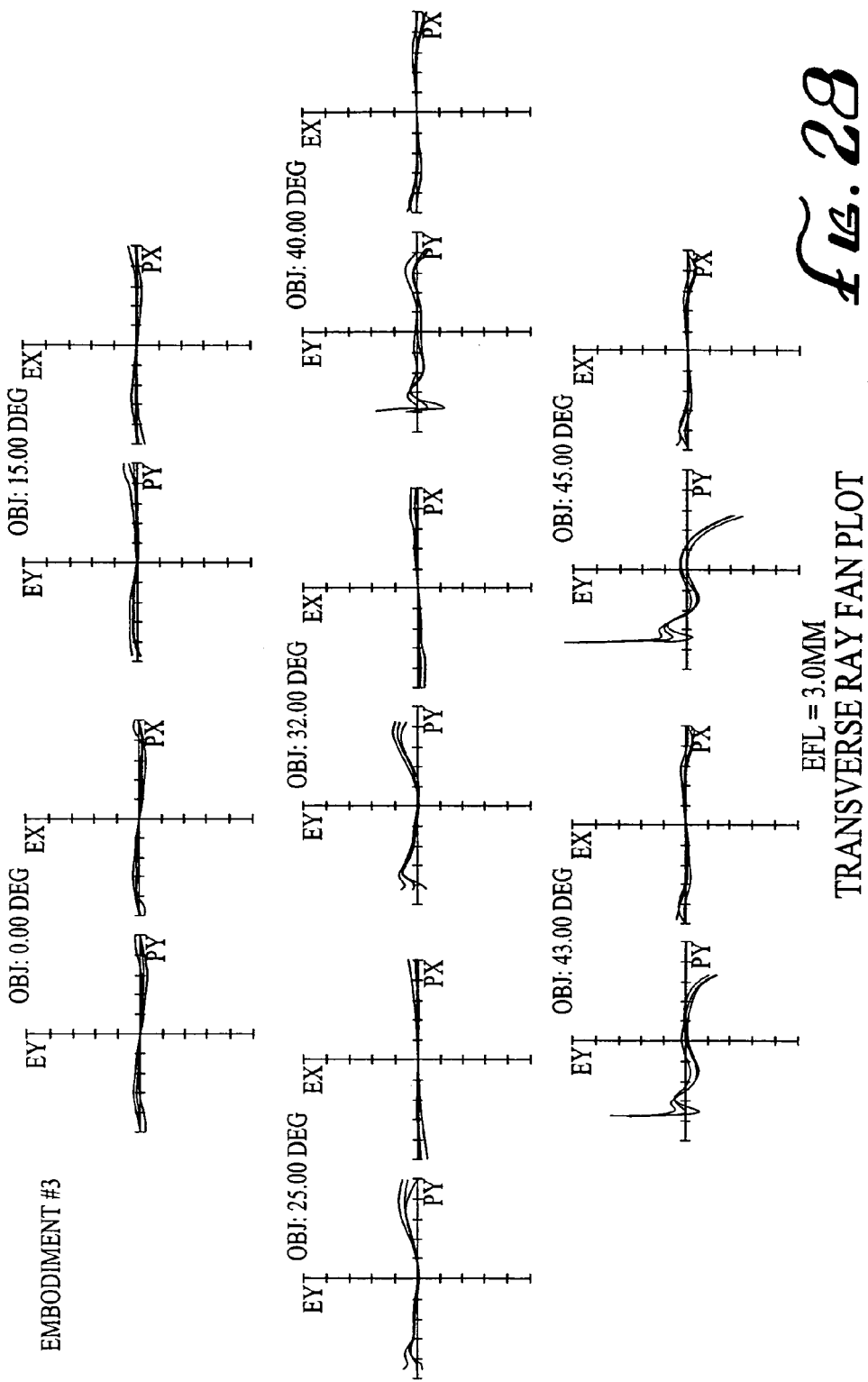

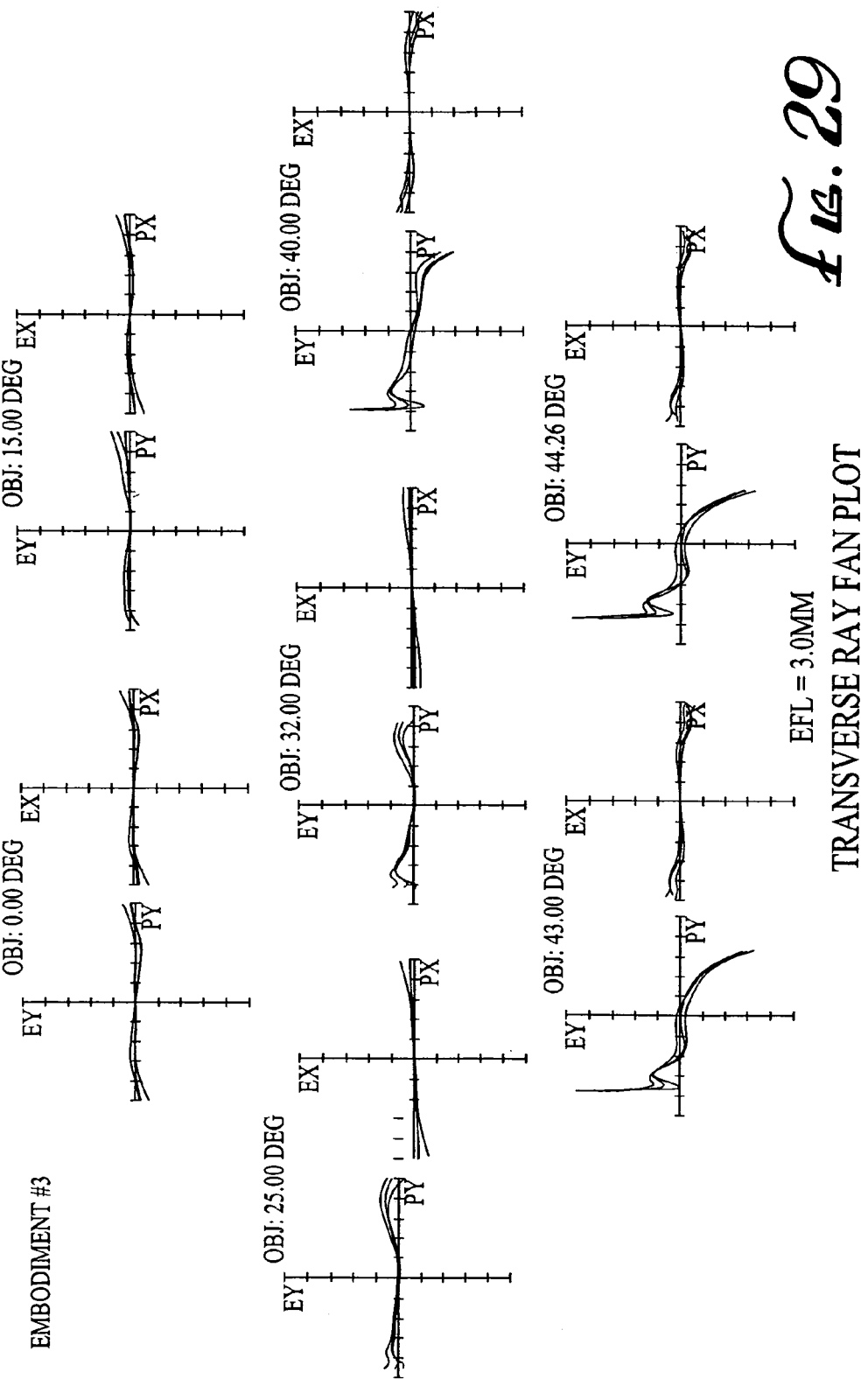

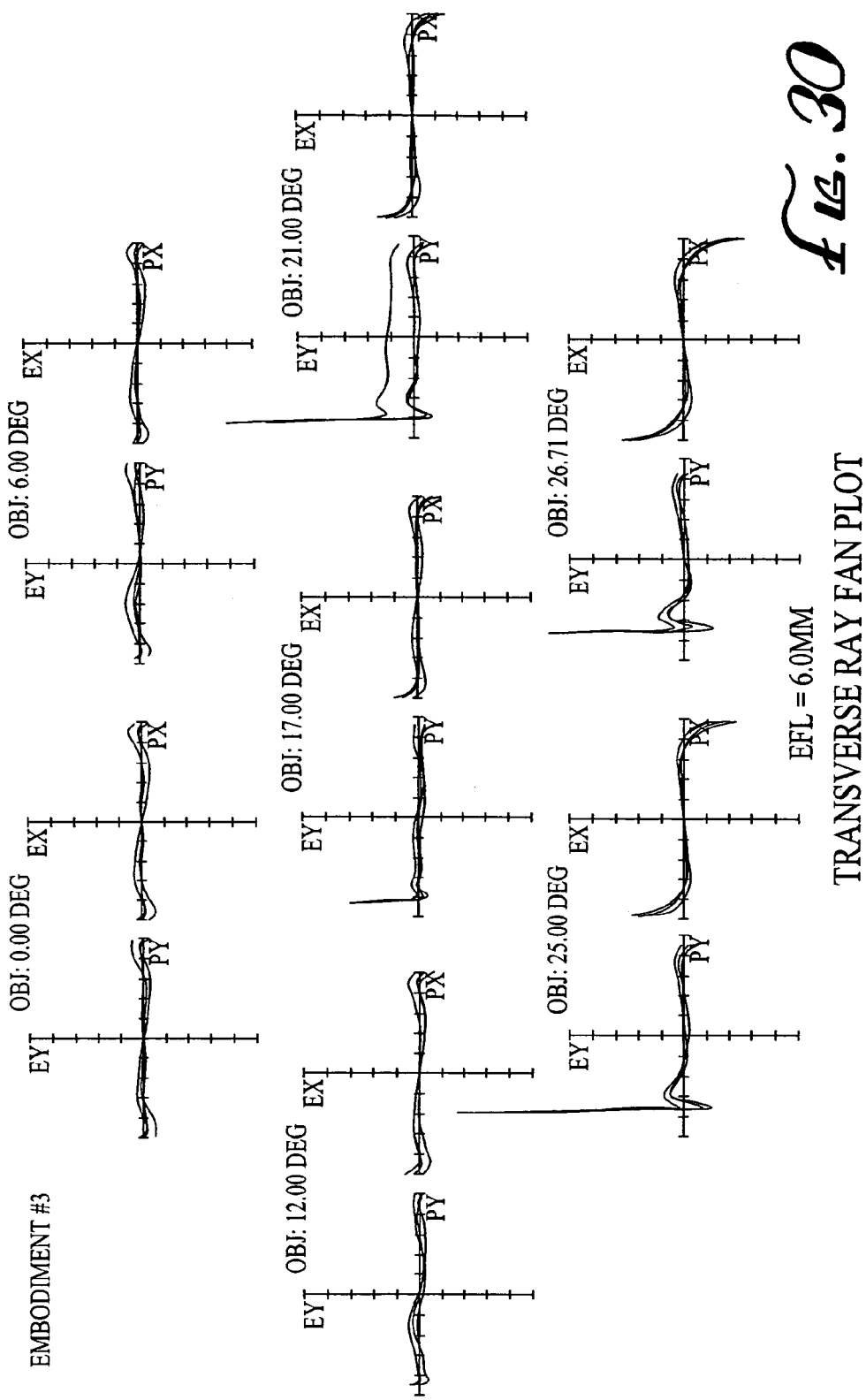

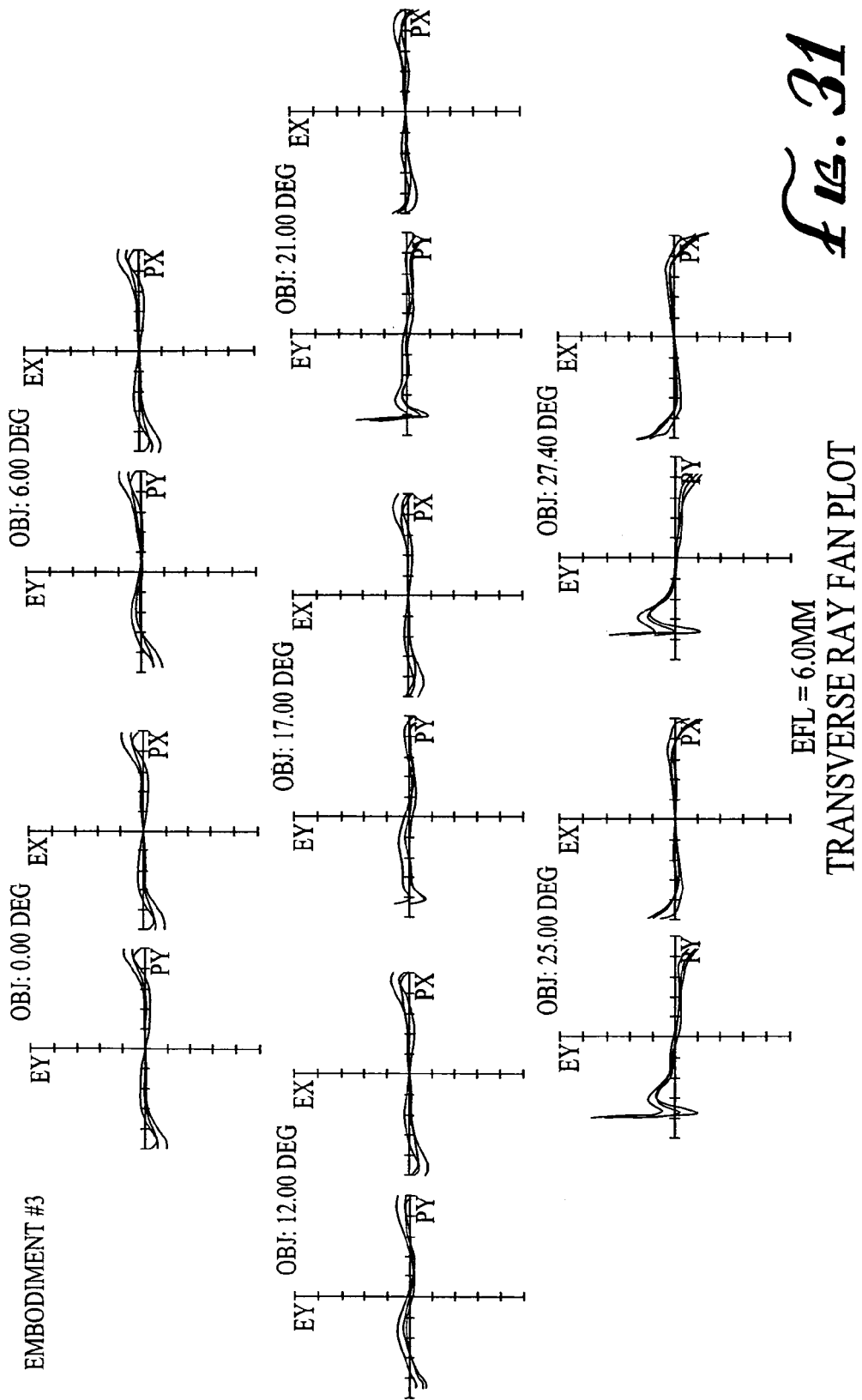

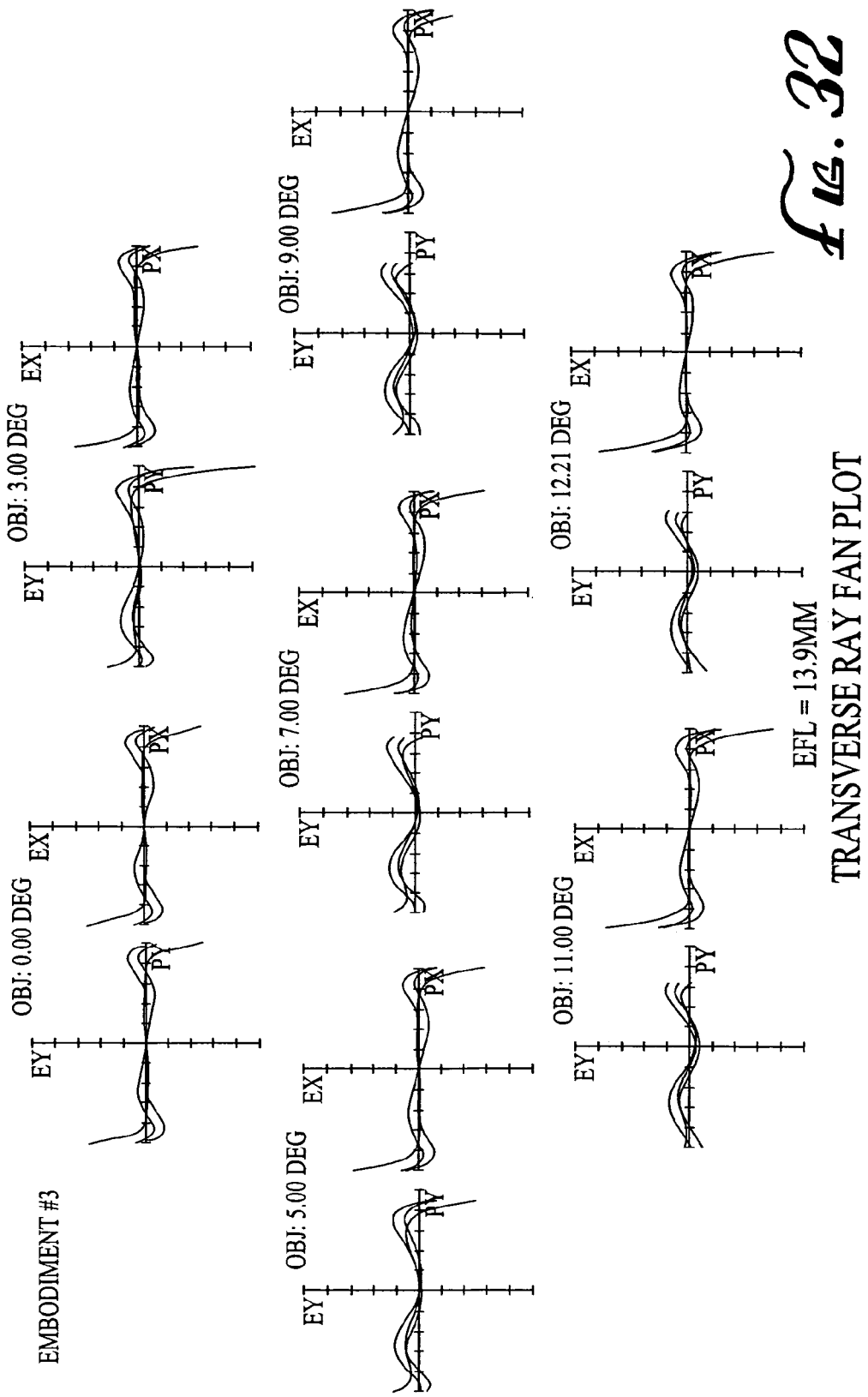

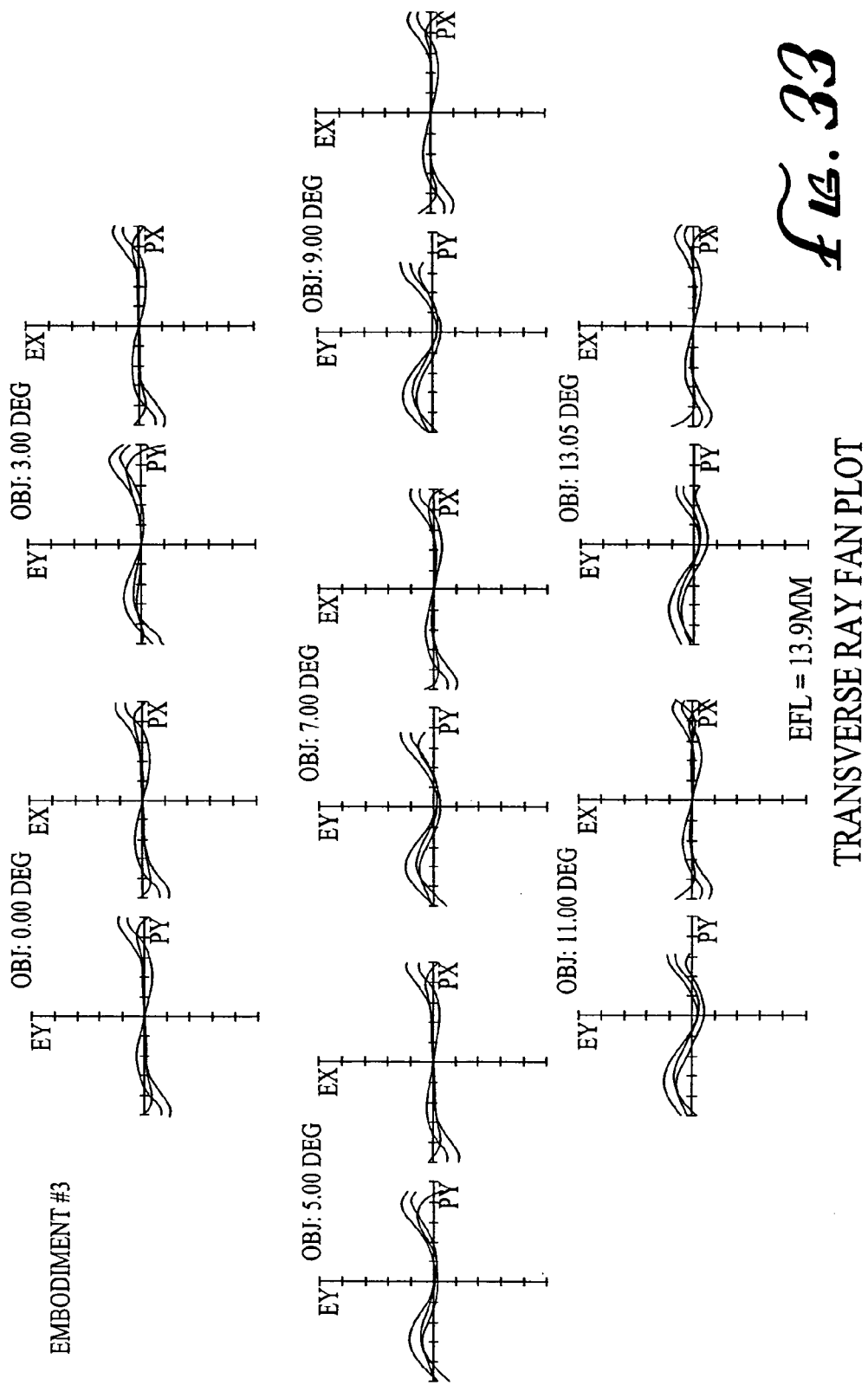

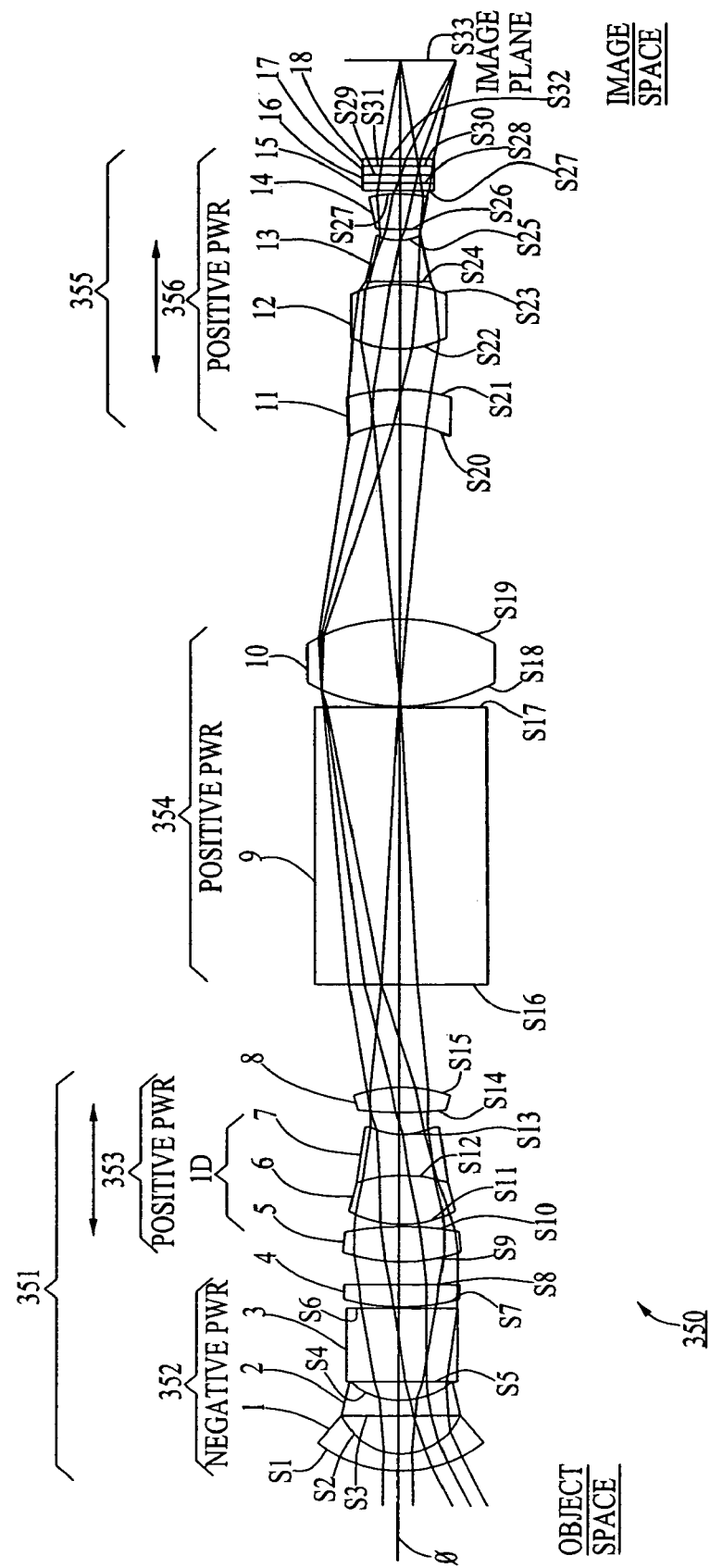

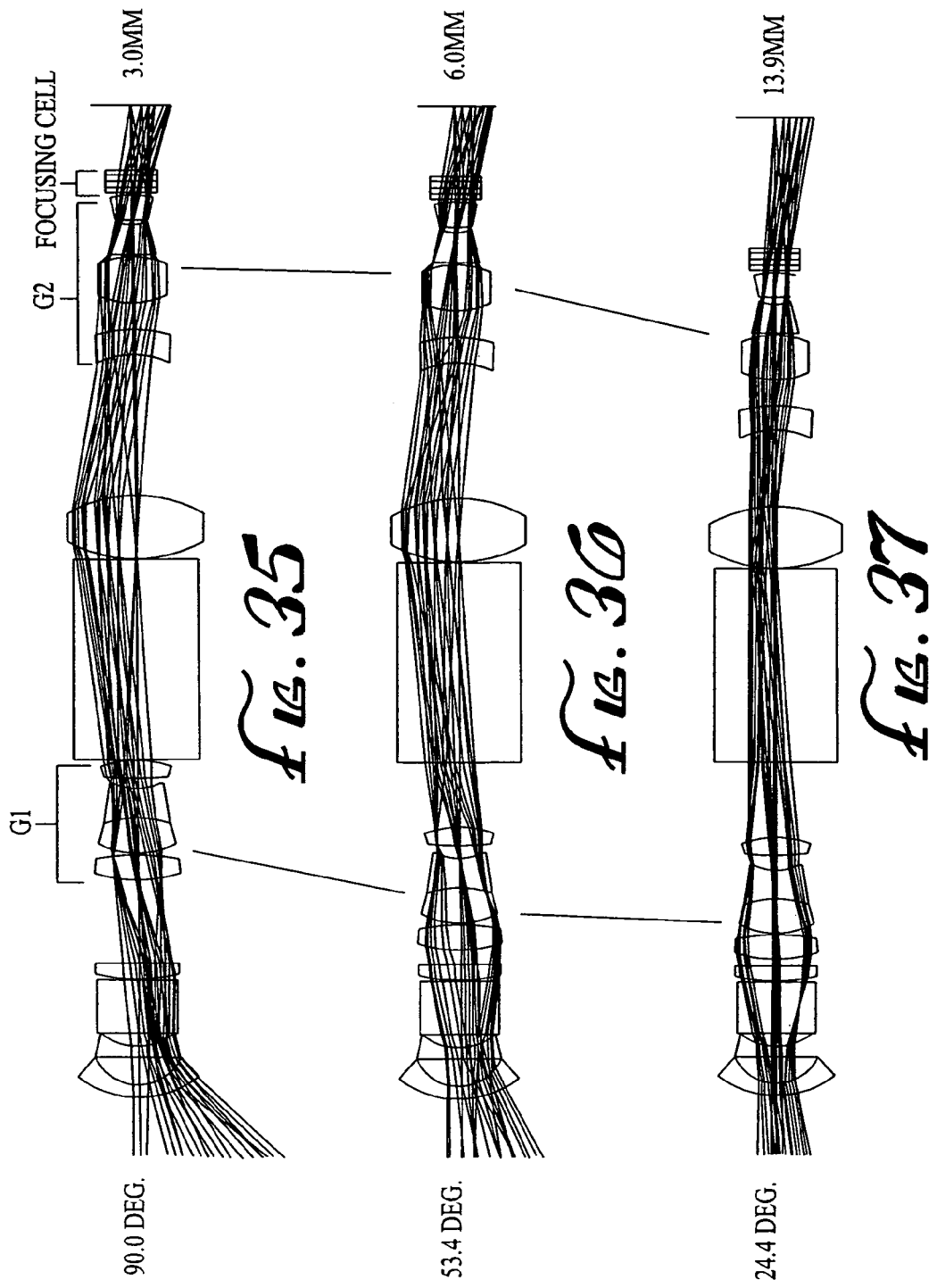

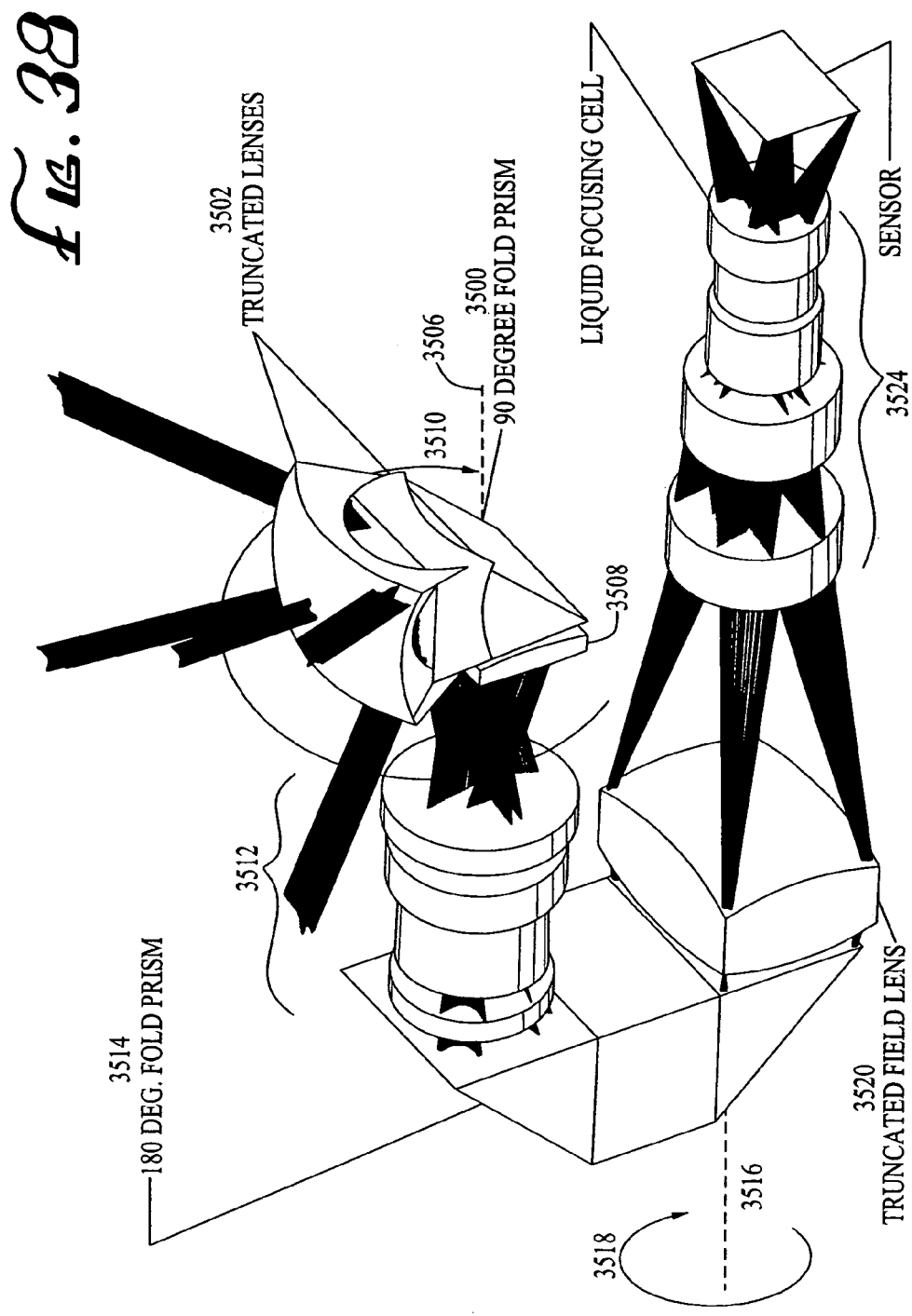

EMBODIMENT #4

EMBODIMENT #4

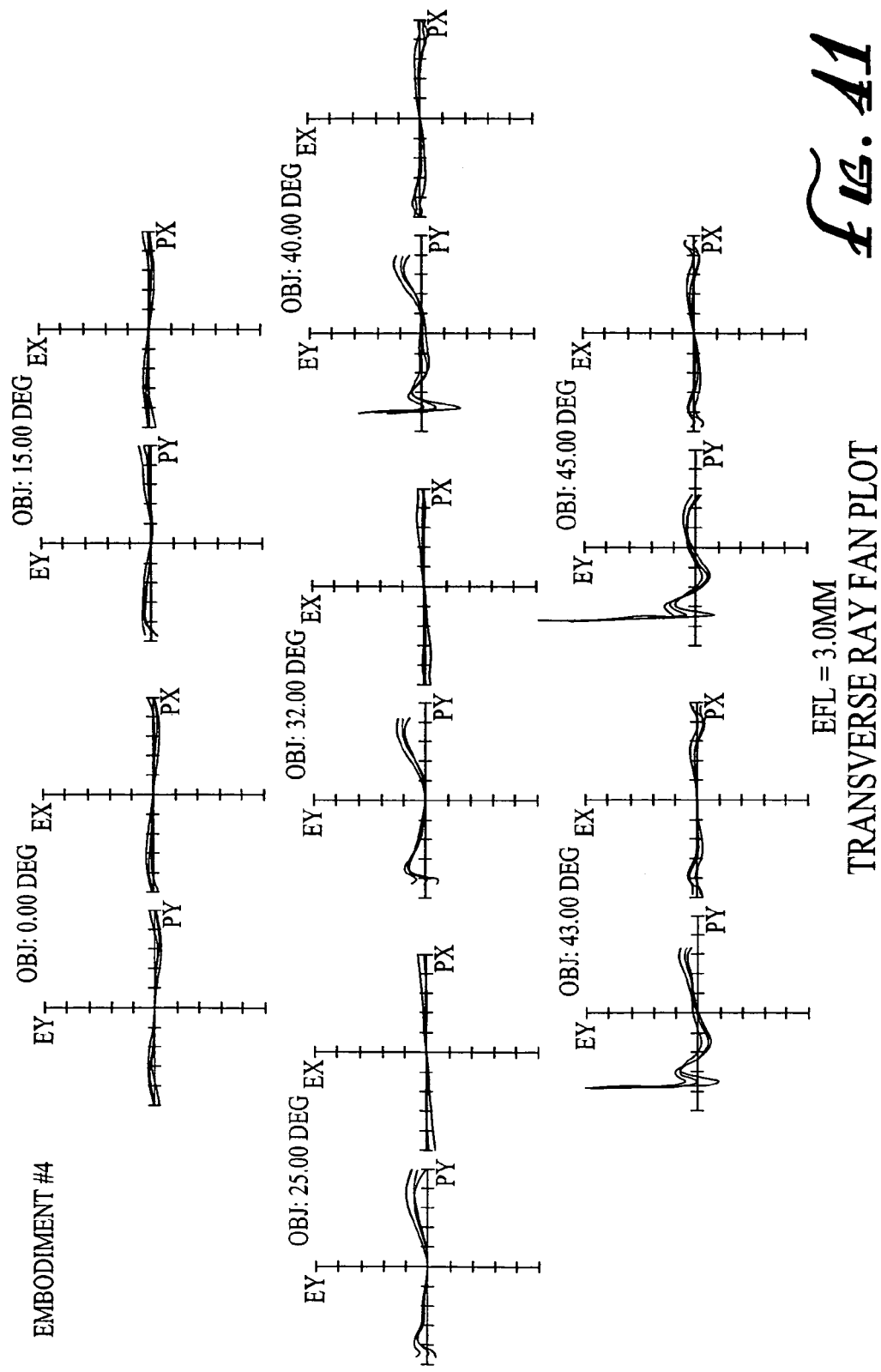

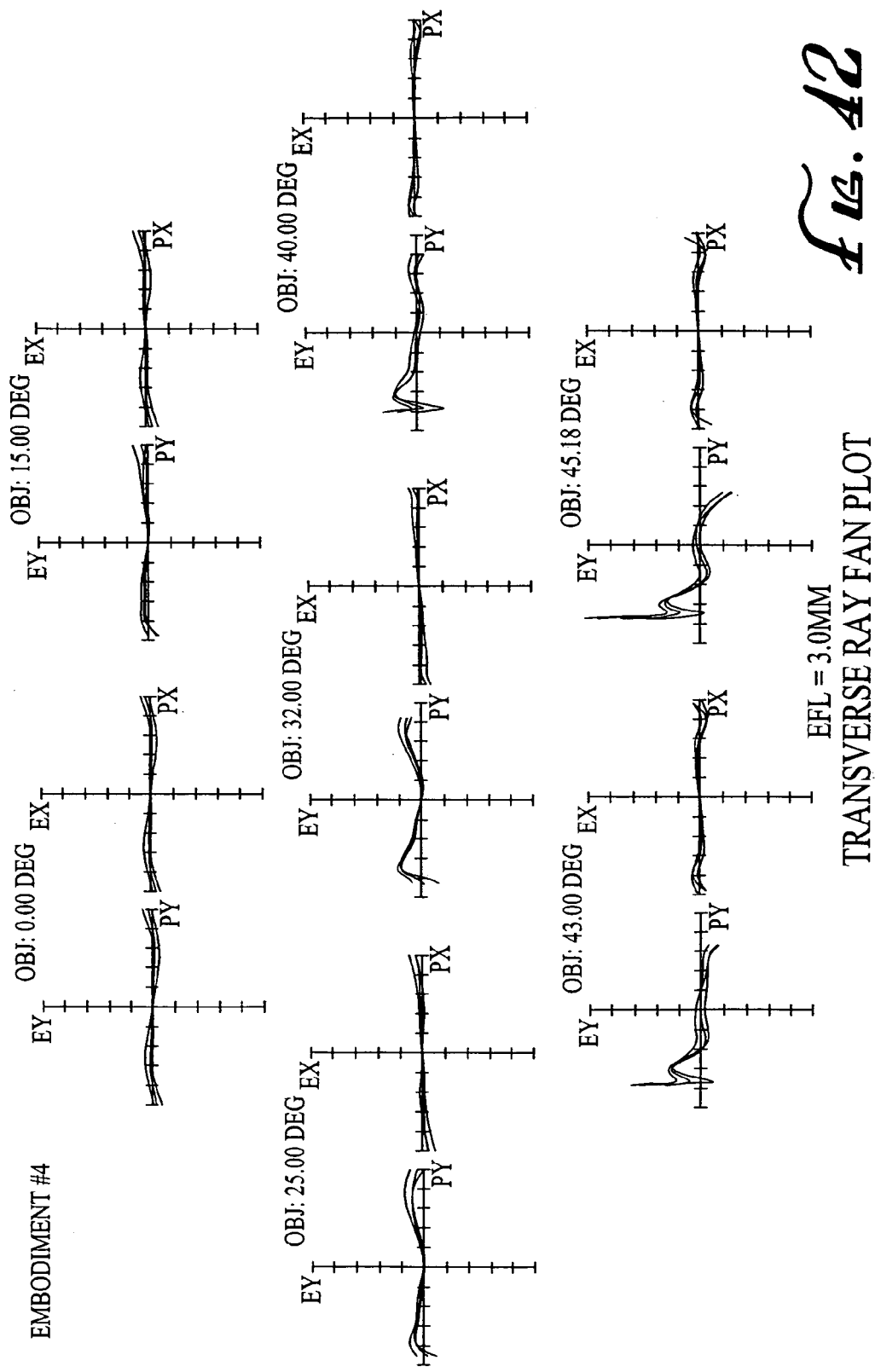

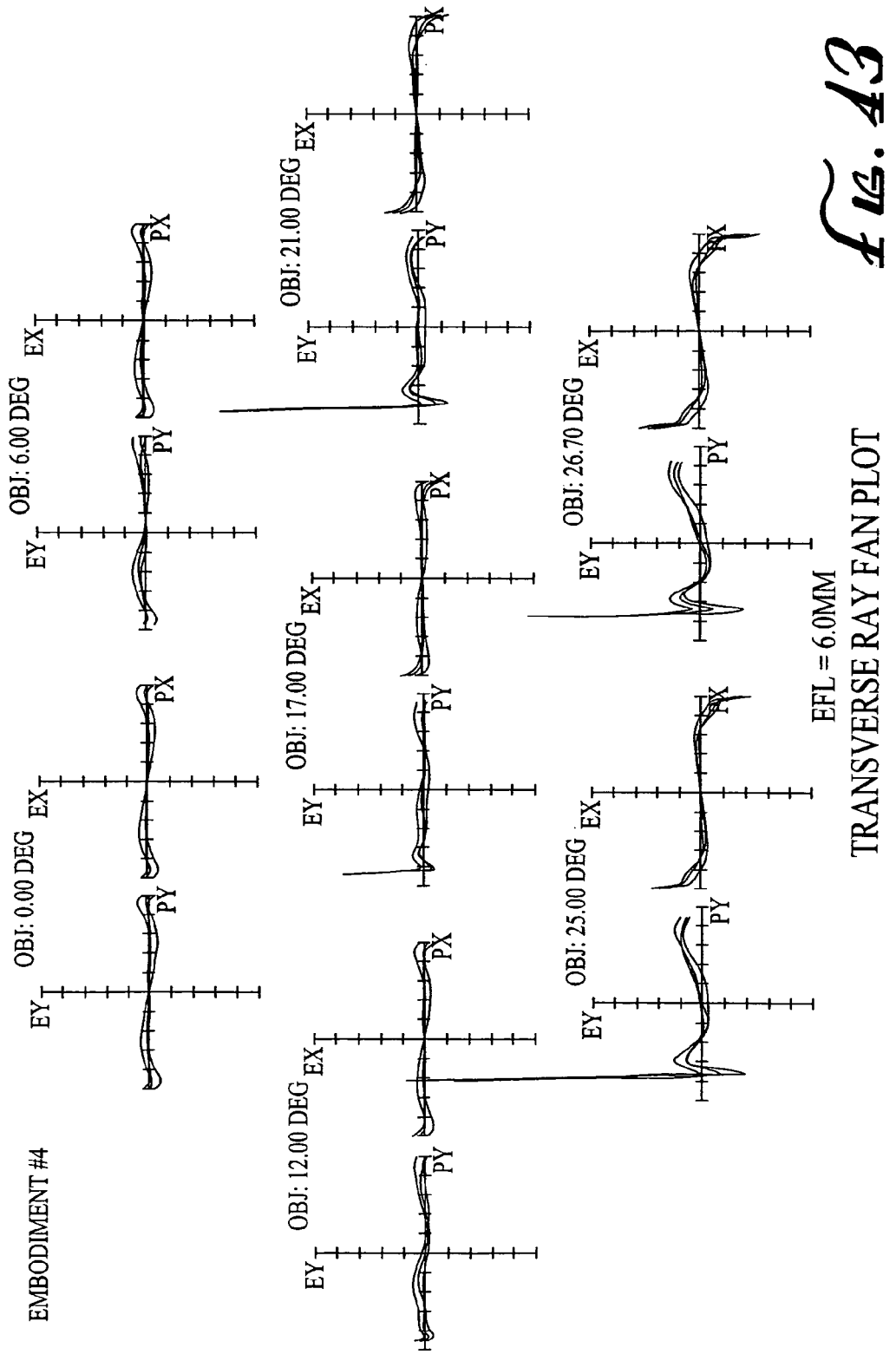

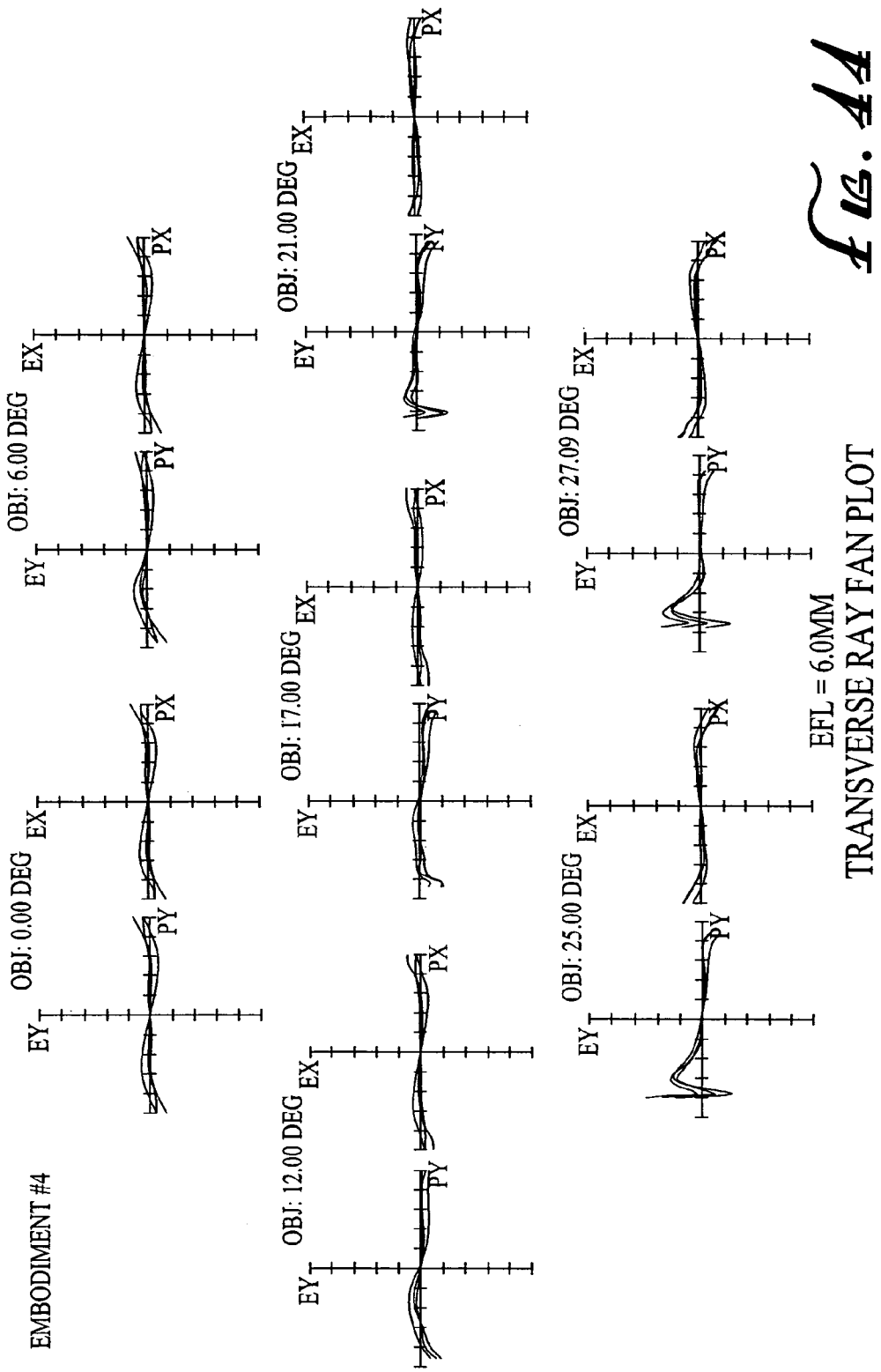

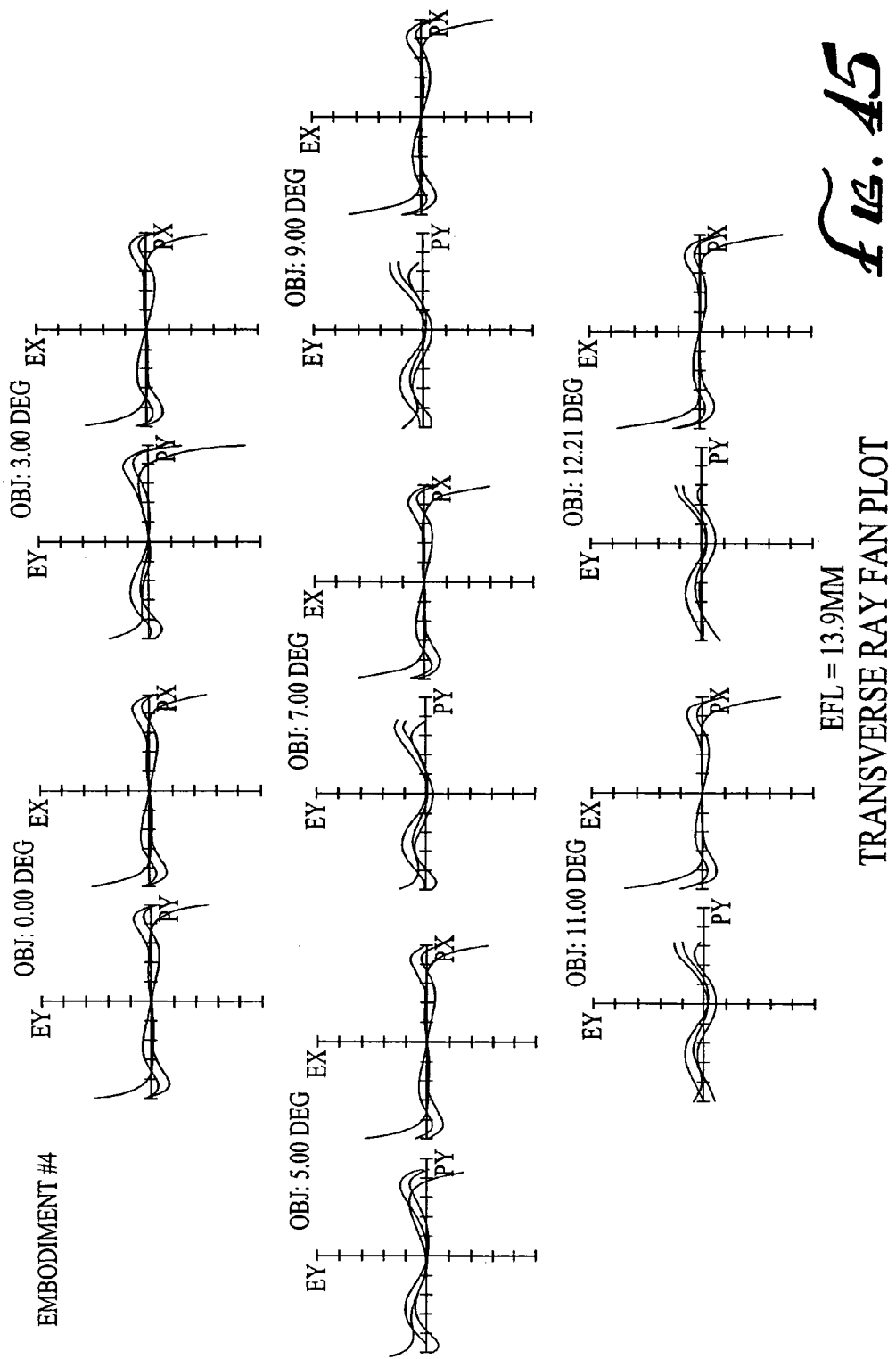

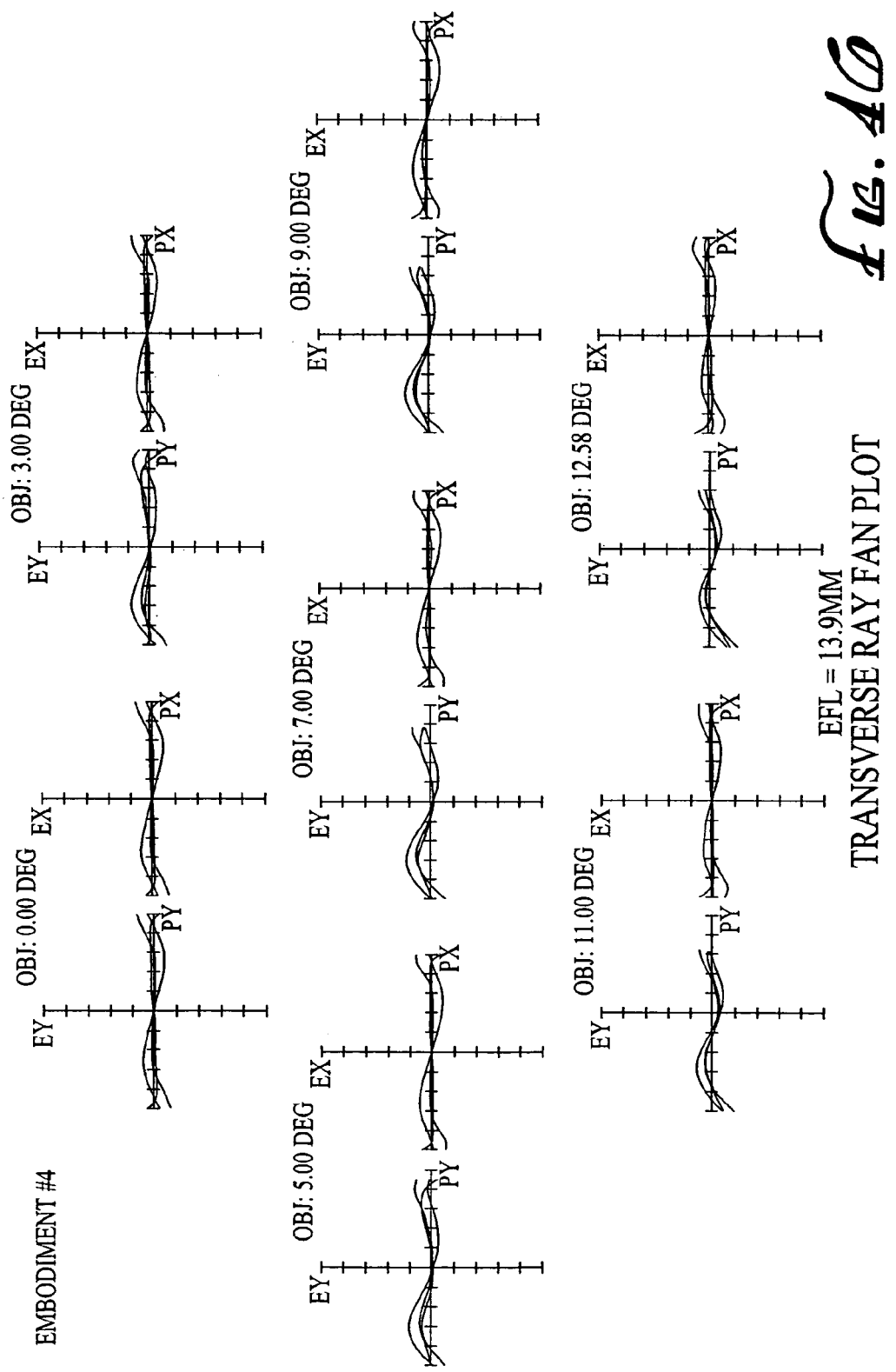

WIDE-RANGE, WIDE-ANGLE COMPOUND ZOOM WITH SIMPLIFIED ZOOMING STRUCTURE

CROSS-REFERENCE TO RELATED APPLICATIONS

This application is related to U.S. Patent Application Publication No. 20040021953, filed on Jul. 18, 2003, and U.S. patent application Ser. No. 11/071,125, filed on Mar. 2, 2005, the contents of which are incorporated by reference herein.

BACKGROUND OF THE INVENTION

1. Field of the Invention

The present invention relates, generally, to zoom lenses, and in particular embodiments, to an optionally rotatable compound zoom lens with a minimal number of moving lens groups that provides a wide focal length range and a wide field of view and is small in size to fit in consumer products such as cellular telephones and other products with compact lenses.

2. Description of Related Art

Notably lacking in the prior art are zoom lenses having a zoom ratio greater than about four combined with a maximum field of view at the short focal length position of 85 degrees or more. Although such zoom lenses are known in the field of broadcast zoom lenses, these are typically large, complex and expensive designs. Examples can be found in U.S. Pat. No. 5,745,300, and in Japanese Patents 62-153,913, 08-136,808, 09-015,501, 09-033,812 and 11-030,749.

A more compact, wide-range, wide-angle zoom can be found in U.S. Pat. No. 6,038,084, although the performance of the examples is poor despite significant complexity.

What is desired is a compact and relatively simple zoom lens with both a wide zoom range and wide field angle that can be economically produced in high volume. Such a zoom lens would have wide-ranging application in digital still and video cameras, cell phones, Personal Digital Assistants (PDAs), and the like.

Recently, a novel compound zoom system was described in related U.S. Patent Application Publication No. 20040021953. This system comprises a zoom kernel that forms an intermediate image, followed by a zoom relay that re-images the intermediate image to a final image plane. The zoom ratio of the lens system as a whole is equal to the zoom ratio of the kernel multiplied by the zoom ratio of the relay. Such a design approach has a number of potential advantages over conventional zoom lens designs, including large zoom range, wide field of view, high image quality, and flexibility in arranging fold mirrors or prisms. However, the zoom system does not provide for a compact wide-range wide-angle zoom lens that is suitable for mass-market applications.

More recently, a wide angle compound zoom system was described in related U.S. patent application Ser. No. 11/071,125, filed on Mar. 2, 2005. This system comprises four independently moving groups to achieve a zoom ratio of about 8.6 together with a field of view of 90 degrees at the short focal length position. The system is sufficiently compact to be used in a cell phone, PDA, or compact digital camera.

However, with the size of personal electronics ever decreasing, there is still a need for an even more compact and relatively simple zoom lens with both a wide zoom range and wide field angle that can be economically produced in high volume. Such a zoom lens would have broad application in digital still and video cameras, cell phones, PDAs, and the like.

SUMMARY OF THE INVENTION

Embodiments of the present invention represent an improvement to the compound zoom design described in related U.S. patent application Ser. No. 11/071,125 that reduces the number of independently moving lens groups to just two or three while retaining a large zoom ratio and maintaining or enlarging the field of view at the shortest focal length. The compound zoom system according to embodiments of the present invention can also utilize the zooming groups as focusing groups and for athermalization, thus maintaining a relatively simple mechanical structure. It is to be understood that temperature changes may cause the lens to go out of focus, so additional movement of the zooming groups (similar to moving the zooming groups for focusing) compensates for these temperature changes. This temperature compensation is referred to as athermalization.

The lens system detailed herein is a wide-range, ultra-wide angle optionally rotatable compound zoom with a simplified zooming structure having sufficient performance to be used with a 3 megapixel class sensor with a pixel size of 2.4 µm. The focal lengths covered by the zoom range have a 35 mm still camera equivalent of approximately 18 or 21 mm at the short focal length end to about 100 mm at the long focal length end.

An important aspect of embodiments of the present invention is the extremely wide angle starting point. Although it is possible to design wide-range zooms with conventional non-compound technology, such designs are generally limited at the wide end to a 35 mm format equivalent focal length of about 24 to 28 mm.

Compound zoom technology allows for a very small diameter front element even with a large zoom range and extremely wide field of view, but the vertex length tends to be large because a compound zoom system effectively comprises two separate zooming systems in series. In embodiments of the present invention the vertex length ranges from about 70 mm to about 80 mm when scaled for an image diagonal of 6 mm. In order to allow the system to be used in a compact package, one or more fold prisms or mirrors can be included in the design. In a first embodiment of the present invention, the folded optics train is "U" shaped and is small enough to occupy a box-shaped volume of about 4.7 cc (e.g. about 34.6 mm×16.7 mm×8.2 mm). In a second embodiment, the first fold prism is replaced by a rectangular glass block to illustrate an optional packaging format. The folded optics train is also "U" shaped and is small enough to occupy a box-shaped volume of about 4.9 cc (e.g. about 34.5 mm×15.1 mm×9.4 mm). In a third embodiment, the folded optics train is also "U" shaped and is small enough to occupy a box-shaped volume of about 6.9 cc (e.g. about 42.2 mm×20.5 mm×8.0 mm). In a fourth embodiment, the folded optics train is also "U" shaped and is small enough to occupy a box-shaped volume of about 7.1 cc (e.g. about 42.7 mm×20.7 mm×8.0 mm). The working distance of the system is sufficient to place a third fold mirror or prism just before the image plane. This third fold could be used to simplify the sensor placement, or it could also be used to incorporate a true SLR optical viewfinder.

The optical design consists of a zooming kernel followed by a zooming relay, with a stationary P lens group in between. The zooming kernel has either an NP or NPP structure, and the zooming relay has either a P or PP structure. The kernel, as defined herein, includes all lens groups on the object space side of the stationary P lens group, while the zooming relay includes all zoom groups on the image space side of the stationary P lens group. There are just two or three independently moving groups altogether, one or two on each side of the intermediate image. The front group is stationary with respect to the image plane, as are the fold prisms. The zooming relay, comprising just one or two independently moving positive groups, has a notably simple structure that contributes significantly to the simplicity of the system as a whole.

BRIEF DESCRIPTION OF THE DRAWINGS

FIG. 1 illustrates an unfolded layout of the compound zoom lens with lens elements and surfaces identified according to a first embodiment of the present invention.

FIG. 2 illustrates an unfolded layout of the compound zoom lens at Zoom Position Z1 according to the first embodiment of the present invention.

FIG. 3 illustrates an unfolded layout of the compound zoom lens at Zoom Position Z2 according to the first embodiment of the present invention.

FIG. 4 illustrates an unfolded layout of the compound zoom lens at Zoom Position Z3 according to the first embodiment of the present invention.

FIG. 8 illustrates transverse ray aberration plots at Zoom Position Z1 with an effective focal length (EFL) of 2.5 mm and a field of view (FOV) of 100.4 degrees according to the first embodiment of the present invention.

FIG. 10 illustrates transverse ray aberration plots at Zoom Position Z3 with an EFL of 13.9 mm and a FOV of 24.4 degrees according to the first embodiment of the present invention.

FIG. 12 illustrates an unfolded layout of the compound zoom lens at Zoom Position Z1 according to the second embodiment of the present invention.

FIG. 13 illustrates an unfolded layout of the compound zoom lens at Zoom Position Z2 according to the second embodiment of the present invention.

FIG. 14 illustrates an unfolded layout of the compound zoom lens at Zoom Position Z3 according to the second embodiment of the present invention.

FIG. 15 is a three dimensional view of the compound zoom lens system according to the second embodiment of the present invention.

FIG. 16 illustrates a folded layout of the compound zoom lens according to the second embodiment of the present invention.

FIG. 22 illustrates an unfolded layout of the compound zoom lens at Zoom Position Z1 according to the third embodiment of the present invention.

FIG. 23 illustrates an unfolded layout of the compound zoom lens at Zoom Position Z3 according to the third embodiment of the present invention.

FIG. 24 illustrates an unfolded layout of the compound zoom lens at Zoom Position Z5 according to the third embodiment of the present invention.

FIG. 25 is a three dimensional view of the compound zoom lens system according to the third embodiment of the present invention.

FIG. 28 illustrates transverse ray aberration plots at Zoom Position Z1 with an EFL of 3.0 mm and a FOV of 90.0 degrees and an object distance of infinity according to the third embodiment of the present invention.

FIG. 29 illustrates transverse ray aberration plots at Zoom Position Z2 with an EFL of 3.0 mm and a FOV of 88.5 degrees and an object distance of 100 mm according to the third embodiment of the present invention.

FIG. 30 illustrates transverse ray aberration plots at Zoom Position Z3 with an EFL of 6.0 mm and a FOV of 53.4 degrees and an object distance of infinity according to the third embodiment of the present invention.

FIG. 31 illustrates transverse ray aberration plots at Zoom Position Z4 with an EFL of 6.0 mm and a FOV of 54.8 degrees and an object distance of 100 mm according to the third embodiment of the present invention.

FIG. 32 illustrates transverse ray aberration plots at Zoom Position Z5 with an EFL of 13.9 mm and a FOV of 24.4 degrees and an object distance of infinity according to the third embodiment of the present invention.

FIG. 33 illustrates transverse ray aberration plots at Zoom Position Z6 with an EFL of 13.9 mm and a FOV of 26.0 degrees and an object distance of 100 mm according to the third embodiment of the present invention.

FIG. 34 illustrates an unfolded layout of the compound zoom lens with lens elements and surfaces identified according to a fourth embodiment of the present invention.

FIG. 35 illustrates an unfolded layout of the compound zoom lens at Zoom Position Z1 according to the fourth embodiment of the present invention.

FIG. 36 illustrates an unfolded layout of the compound zoom lens at Zoom Position Z3 according to the fourth embodiment of the present invention.

FIG. 37 illustrates an unfolded layout of the compound zoom lens at Zoom Position Z5 according to the fourth embodiment of the present invention.

FIG. 38 is a three dimensional view of the compound zoom lens system according to the fourth embodiment of the present invention.

FIG. 41 illustrates transverse ray aberration plots at Zoom Position Z1 with an EFL of 3.0 mm and a FOV of 90.0 degrees and an object distance of infinity according to the fourth embodiment of the present invention.

FIG. 42 illustrates transverse ray aberration plots at Zoom Position Z2 with an EFL of 3.0 mm and a FOV of 90.4 degrees and an object distance of 100 mm according to the fourth embodiment of the present invention.

FIG. 43 illustrates transverse ray aberration plots at Zoom Position Z3 with an EFL of 6.0 mm and a FOV of 53.4 degrees and an object distance of infinity according to the fourth embodiment of the present invention.

FIG. 44 illustrates transverse ray aberration plots at Zoom Position Z4 with an EFL of 6.0 mm and a FOV of 54.2 degrees and an object distance of 100 mm according to the fourth embodiment of the present invention.

FIG. 45 illustrates transverse ray aberration plots at Zoom Position Z5 with an EFL of 13.9 mm and a FOV of 24.4 degrees and an object distance of infinity according to the fourth embodiment of the present invention.

FIG. 46 illustrates transverse ray aberration plots at Zoom Position Z6 with an EFL of 13.9 mm and a FOV of 25.2 degrees and an object distance of 100 mm according to the fourth embodiment of the present invention.

DETAILED DESCRIPTION OF PREFERRED EMBODIMENTS

Figure 5:
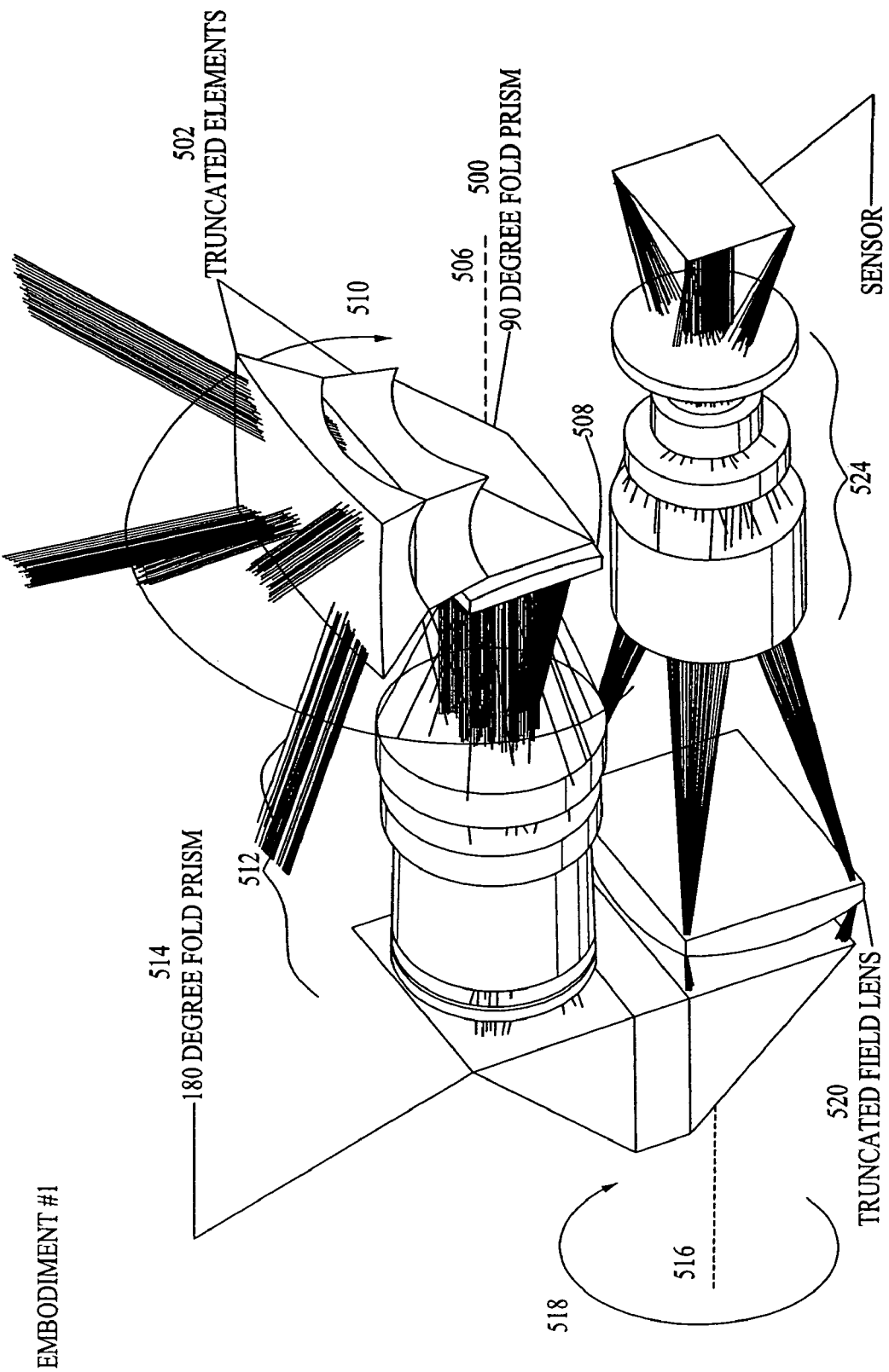
FIG. 5 is a three dimensional view of the compound zoom lens system according to the first embodiment of the present invention.

In the following description of preferred embodiments, reference is made to the accompanying drawings that form a part hereof, and in which is shown by way of illustration specific embodiments in which the invention may be practiced. It is to be understood that other embodiments may be utilized and structural changes may be made without departing from the scope of the preferred embodiments of the present invention.

Embodiments of the present invention are directed to an optionally rotatable compound zoom design having only two or three independently moving lens groups, a large zoom ratio and a wide field of view at the shortest focal length, and having sufficient performance to be used with a 3 megapixel class sensor with a pixel size of 2.4 μm. The compound zoom system according to embodiments of the present invention can also utilize the zooming groups as focusing groups and for athermalization, thus maintaining a relatively simple mechanical structure.

First exemplary embodiment. FIG. 1 illustrates an unfolded layout of a first exemplary embodiment of the optionally rotatable compound zoom lens with lens elements and surfaces identified. The specifications of the first exemplary embodiment (without the rotation feature) are approximately as follows:

Zoom Ratio: 5.5:1
Focal Length: 2.5–13.9 mm
Aperture: f/2.8–f/6.0
Full Field of View: 100.4 deg.–24.4 deg.
35 mm Still Equivalent: 18 mm–100 mm
35 mm Cine Equivalent: 12 mm–67 mm
Unfolded Vertex Length: 69.5 mm
Format: ⅓" (6 mm diagonal)
Folded Package Size: 34.6 mm×16.7 mm×8.2 mm
Exit Chief Ray Angle: Less than 19.7 degrees throughout zoom range In this first exemplary embodiment, the focal lengths covered by the zoom range have a 35 mm still camera equivalent of about 18 mm to 100 mm. The ultra-wide field of over 100 degrees at the short focal length position is a notable feature of this design. Despite this, the front element diameter is remarkably small, and the folded package size is very compact. This range of focal lengths in a single zoom is exceptional for a consumer-oriented optical system, and encompasses the previously unattainable but highly desirable ultra-wide to short-tele range.

What makes this design particularly interesting is the extremely wide angle starting point. Conventional non-compound zoom lenses having a wide-angle field of view greater than 100 degrees are known in the art, but these generally have a zoom ratio only of about 2:1.

Although compound zoom technology provides a unique capability for wide-range wide-angle optics, it has a shortcoming in that the vertex length tends to be fairly long. In the present case the vertex length is 69.6 mm. In order to allow the system to be used in a compact package, two fold prisms have been included in the design. These fold prisms allow the system to be fit into a package size of about 34.6 mm×16.7 mm×8.2 mm. It should be noted that other configurations are possible. If the fold prisms are eliminated it would be possible to shorten the vertex length by about 10–15 mm, which may be acceptable or even preferable in some applications.

The working distance of the system is sufficient to place a third fold mirror or prism just before the image plane. This third fold mirror or prism could be used to simplify the sensor placement, or it could also be used to incorporate a true SLR optical viewfinder.

The first exemplary non-rotational embodiment of the present invention illustrated in FIG. 1 will now be described in greater detail with accompanying figures and tables. Referring to FIG. 1, each lens element is identified by a numeral from 1 through 14 and the general configuration of each lens element is depicted, but the actual radius of each lens surface is set forth below in a table. The lens surfaces are identified by the letter "S" followed by a numeral from S1 through S29.

Each lens element has its opposite surfaces identified by a separate but consecutive surface number as, for example, lens element 1 has lens surfaces S1 and S2, lens element 5 has lens surfaces S9 and S10 and so forth, as shown in FIG. 1, except that for doublet lens component 1D the coincident facing lens surfaces are given a single surface number S12. For example, doublet 1D is comprised of lens element 6 having a front lens surface S11 and a rear lens surface S12 and lens element 7 having a front lens surface S12 (coincidental) and a rear lens surface S13. The real image surface is identified by the numeral S29. All of the lens surfaces are spherical except lens surfaces S3, S4, S18, S20, S22 and S23 which are aspheric surfaces that are non-spherical, non-plano but rotationally symmetrical about the optical axis.

Before describing the detailed characteristics of the lens elements, a broad description of the lens groups and their axial positions and movement will be given for the zoom lens system, generally designated 50, of this first exemplary embodiment of the present invention.

Beginning from the end facing the object to be photographed, i.e. the left end in FIG. 1, a first lens group 51 comprises a first lens subgroup 52 and a first zoom subgroup 53. The first lens subgroup 52 is a negative-powered subgroup and comprises singlet lens elements 1–4 which gather light from object space and reduce the angle of the chief ray with respect to the optical axis (identified with a 0). The first zoom subgroup 53 is a positive-powered subgroup and comprises a singlet lens element 5, a first doublet 1D comprised of lens elements 6 and 7, and singlet lens element 8. A second lens group 54 is stationary and is a positive-powered group, and comprises a prism element 9, a singlet lens element 10 and an intermediate image located near or within element 10. Lens element 10 may be referred to as a field lens. A third lens group 55 comprises a second zoom subgroup 56 and a third zoom subgroup 57. The second zoom subgroup 56 is a positive-powered subgroup, includes an optical stop at S26 and comprises singlet lens elements 11–13, and the fourth zoom subgroup 57 comprises a singlet lens element 14. Note that throughout the application, the word "zoom" refers to at least one element that changes the magnification of an object conjugate to an image conjugate about the at least one element. The various groups and subgroups described above can also be viewed as lens units or portions, where a first lens unit or portion can be defined to include all lens elements on the object side of the field lens, while a second lens unit or portion can be defined to including all lens elements on the image side of the field lens.

The positive or negative power of each lens element in the first exemplary embodiment of the present invention is set forth below in TABLE 1. As described above, the resultant optical power of each group of lenses is as follows; the first lens subgroup 52 is negative, the first zoom subgroup 53 is positive, the second lens group 54 is positive, the second zoom subgroup 56 is positive, and the third zoom subgroup 57 is positive.

The optical design of the first exemplary embodiment comprises an NP kernel followed by a PP relay. There are three independently moving groups altogether; one on the object side and two on the image side of the intermediate image. The front negative powered group is stationary with respect to the image plane, as are both of the fold prisms. The zoom ratio of 5.5:1 is larger than that found in most compact digital cameras currently on the market, and the field of view at the wide end of 100.4 degrees is dramatically wider than that on any current compact digital camera.

The PP relay, comprising two independently moving positive groups, has a notably simple structure that contributes significantly to the simplicity of the system as a whole. Because both groups are positive the total number of elements is minimized while maintaining a very high image quality.

The aperture of the system ranges from about f/2.8 to f/6.0, but is constant at about f/2.8 from about 2.5 mm through 5.5 mm focal length. From about 5.5 mm to 13.9 mm the aperture drops gradually from f/2.8 to f/6.0.

Each of the zoom subgroups 53, 56 and 57 are movable in both directions along the optical axis for focusing, zooming and athermalization, depending on their positions. In particular, at least two of the three zoom subgroups 53, 54 and 57 are simultaneously movable along an optical axis for zooming, and at least one of the zoom subgroups 53, 56 and 57 may also be movable along the optical axis for focusing and/or thermal compensation. The stationary first lens subgroup 52 and second lens group 54 remain stationary and at a fixed distance from the real image surface S29 during zooming. The horizontal arrows with arrowheads on both ends in the upper portion of FIG. 1 indicate that each of the zoom subgroups 53, 56 and 57 are movable in both axial directions but in a monotonic manner (i.e. in only one direction when progressing from one extreme to the other of adjustments).

While only the lens elements are physically shown in FIG. 1, it is to be understood that conventional mechanical devices and mechanisms are provided for supporting the lens elements and for causing axial movement of the movable groups in a conventional lens housing or barrel.

The lens construction and fabrication data for the above-described first exemplary embodiment 50 is set forth below in TABLE 1, which is extracted from data produced by ZEMAX® optical design software that is commercially available from ZEMAX Development Corporation, San Diego, Calif., U.S.A., which was also used for producing the optical diagrams throughout this application. Throughout this specification, including the Tables, all measurements are in millimeters (mm) with the exception of wavelengths, which are in nanometers (nm), refractive index, which is given as $n_d$, which is the refractive index at a wavelength of about 587.6 nm, and Abbe #, which is indicative of the dispersion of glass and is given as $_d=(n_d-1)/(n_F-n_C)$, where $n_F$ is the refractive index at about 486.1 nm and $n_C$ is the refractive index at about 656.3 nm. Note that the larger the Abbe #, the smaller the dispersion.

In TABLE 1, the first column "ITEM" identifies each optical element, with the same numeral or label as used in FIG. 1. The second and third columns identify the "Group" and "Subgroup," respectively, to which that optical element (lens) belongs with the same numerals used in FIG. 1. The fourth column "Surface" is a list of the surface numbers of the Stop (iris) S26 and each of the actual surfaces of the lenses, as identified in FIG. 1. The fifth column "Zoom Position" identifies three typical zoom positions (Z1–Z3) of the zoom subgroups 53, 56 and 57 (illustrated in FIGS. 2–4) wherein there are changes in the distance (separation) between some of the surfaces listed in the fourth column, as described below more thoroughly. The sixth column, headed by the legend "Radius of Curvature," is a list of the optical surface radius of curvature for each surface, with a minus sign (−) meaning the center of the radius of curvature is to the left of the surface, as viewed in FIG. 1, and "Infinity" meaning an optically flat surface. The asterisk (*) for surfaces S3, S4, S18, S20, S22 and S23 indicate these are aspheric surfaces for which the "radius of curvature" is a base radius, and the formula and coefficients for those two surfaces are set forth as a footnote to TABLE 1 at the * (asterisk). The seventh column "Thickness or Separation" is the axial distance between that surface (fourth column) and the next surface. For example, the distance between surface S2 and surface S3 is 1.137 mm.

The eighth and ninth columns of TABLE 1 provide the refractive index and Abbe # of each lens element. The last column of TABLE 1 headed "Aperture Diameter" provides the maximum diameter for each surface through which the light rays pass. All of the maximum aperture diameters, except for the Stop surface S26, are calculated assuming an image diagonal of 6 mm and a relative aperture ranging from f/2.8 at the shortest focal length to f/6.0 at the longest focal length. The maximum aperture diameters of the Stop surface S26 for Zoom Positions Z1–Z3 are 2.052 mm, 2.301 mm and 1.642 mm, respectively. The relative apertures (f-number) for Zoom Positions Z1–Z3 are f/2.8, f/2.8 and f/6.0, respectively.

TABLE 1

OPTICAL PRESCRIPTION

| Item | Group | Sub-Group | Surface | Zoom Position | Radius of Curvature (mm) | Thickness or Separation (mm) | Refractive Index ($n_d$) | Abbe # ($v_d$) | Aperture Diameter (mm) |
|---|---|---|---|---|---|---|---|---|---|
| 0 | | | | All | Infinity | Infinity | | | |
| 1 | 51 | 52 | S1 | All | 39.037 | 1.000 | 1.74400 | 44.72 | 9.17 |
| | | | S2 | All | 5.775 | 1.137 | | | 6.99 |
| 2 | 51 | 52 | S3 | All | −182.543* | 0.910 | 1.58913 | 61.27 | 6.99 |
| | | | S4 | All | 3.820* | 1.138 | | | 5.77 |
| 3 | 51 | 52 | S5 | All | Infinity | 4.200 | 1.78472 | 25.76 | 5.77 |
| | | | S6 | All | Infinity | 0.140 | | | 5.88 |
| 4 | 51 | 52 | S7 | All | 17.861 | 1.073 | 1.78472 | 25.76 | 6.08 |
| | | | S8 | Z1 | −47.335 | 6.973 | | | 6.18 |
| | | | | Z2 | | 2.041 | | | |
| | | | | Z3 | | 0.008 | | | |
| 5 | 51 | 53 | S9 | All | 9.166 | 2.516 | 1.57960 | 53.89 | 6.92 |
| | | | S10 | All | −11.649 | 0.140 | | | 7.00 |
| 6 | 51 | 53 | S11 | All | 8.173 | 2.787 | 1.62004 | 36.37 | 6.62 |
| 7 | 51 | 53 | S12 | All | −5.687 | 3.025 | 1.84666 | 23.83 | 6.01 |
| | | | S13 | All | 4.724 | 1.320 | | | 5.05 |
| 8 | 51 | 53 | S14 | All | 28.963 | 1.200 | 1.62004 | 36.37 | 5.87 |
| | | | S15 | Z1 | −8.382 | 0.095 | | | 6.12 |
| | | | | Z2 | | 4.761 | | | |
| | | | | Z3 | | 6.795 | | | |
| 9 | 54 | | S16 | All | Infinity | 13.000 | 1.71300 | 53.83 | 6.37 |
| | | | S17 | All | Infinity | 0.140 | | | 9.23 |
| 10 | 54 | | S18 | All | 6.339* | 2.500 | 1.81600 | 46.60 | 9.97 |
| | | | S19 | Z1 | Infinity | 10.284 | | | 9.70 |
| | | | | Z2 | | 8.423 | | | |
| | | | | Z3 | | 5.122 | | | |
| 11 | 55 | 56 | S20 | All | −5.578* | 4.437 | 1.77250 | 49.60 | 4.84 |
| | | | S21 | All | −5.868 | 0.100 | | | 5.75 |
| 12 | 55 | 56 | S22 | All | 3.333* | 2.000 | 1.77250 | 49.60 | 4.84 |
| | | | S23 | All | −19.539* | 0.199 | | | 4.17 |
| 13 | 55 | 56 | S24 | All | Infinity | 1.000 | 1.84666 | 23.83 | 3.20 |
| | | | S25 | All | | 2.185 | | 0.500 | 2.31 |
| Stop | | | S26 | Z1 | Infinity | 1.664 | | | 2.30 |
| | | | | Z2 | | 3.404 | | | |
| | | | | Z3 | | 1.356 | | | |
| 14 | 55 | 57 | S27 | All | 17.862 | 1.260 | 1.77250 | 49.60 | 5.26 |
| | | | S28 | Z1 | −7.768 | 4.886 | | | 5.48 |
| | | | | Z2 | | 5.290 | | | |
| | | | | Z3 | | 10.606 | | | |
| Image | | | S29 | All | Infinity | | | | 6.00 |

*Surface profiles of aspheric surfaces S3, S4, S18, S20, S22 and S23 are governed by the following conventional equation:

$$Z = \frac{(CURV)Y^2}{1 + (1 - (1 + K)(CURV)^2 Y^2)^{1/2}} + (A)Y^4 + (B)Y^6 + (C)Y^8 + (D)Y^{10}$$

where
CURV=1/(Radius of Curvature)
Y=Aperture height, measured perpendicular to optical axis
K, A, B, C, D=Coefficients
Z=Position of surface profile for a given Y value, as measured along the optical axis from the pole (i.e. axial vertex) of the surface.

The coefficients for the surface S3 of item 2 are:
K=0.00000
A=−5.34659E-04
B=9.26878E-05
C=3.24510E-07
D=−3.30602E-08

The coefficients for the surface S4 of item 2 are:
K=−2.62061
A=3.32166E-03
B=−2.33880E-04
C=5.47697E-05
D=−3.15557E-06

The coefficients for the surface S18 of item 10 are:
K=0.00000
A=−8.83354E-04
B=1.30200E-05
C=−8.93854E-07
D=7.85338E-09

The coefficients for the surface S20 of item 11 are:
K=−2.36804
A=3.71978E-04
B=−4.11465E-04
C=3.84247E-05
D=−3.62581E-06

The coefficients for the surface S22 of item 12 are:
K=0.00000
A=−2.53984E-03
B=−3.92970E-04
C=3.96547E-05
D=−1.50072E-05

The coefficients for the surface S23 of item 12 are:
K=0.00000
A=−9.43773E-04
B=−2.58120E-04
C=−9.84934E-05
D=1.36421E-05

The foregoing footnote * to TABLE 1 includes the equation for calculating the shape of the aspheric surfaces S3, S4, S18, S20, S22 and S23 for the value Z, wherein CURV is the curvature at the pole of the surface, Y is the height or distance from the optical axis of a specific point on the surface of the glass, K is the conic coefficient, and A, B, C and D are the 4th, 6th, 8th, and 10th, respectively, order deformation coefficients. As noted above, for illustrating the scope and versatility of the present invention there are three different Zoom Positions Z1, Z2 and Z3 set forth in the data of TABLE 1 which provide specific data for three different positions for the three movable zoom subgroups. The Zoom Positions Z1, Z2 and Z3 are representative of three positions of the zoom subgroups 53, 56 and 57 with Zoom Positions Z1 and Z3 being the extreme positions and Z2 being an intermediate position. Of course, it will be understood that continuous zooming is available between the extreme Zoom Positions Z1 and Z3, and that any combination of continuous zooming is available within the described zoom ranges with the lens system 50.

The Effective Focal Length (EFL), Full Field Of View (FFOV) and F-number of the lens system 50 varies for the different Zoom Positions. Referring now to FIGS. 2–4, the zoom lens system 50 is shown with the zoom groups in various Zoom Positions and with light ray traces for those positions. FIG. 2 represents the zoom position Z1 for which data is set forth above in TABLE 1 with an EFL of about 2.5 mm, a FFOV of about 100.4°, and an F-number of about 2.8. FIG. 3 represents the zoom position Z2 from TABLE 1 with an EFL of about 5.7 mm, a FFOV of about 55.8°, and an F-number of about 2.8. FIG. 4 represents the zoom position Z3 from TABLE 1 with an EFL of about 13.9 mm, a FFOV of about 24.4°, and an F-number of about 6.0.

From the specifications for the individual lens elements (Items 1–14) and the separation between lens elements set forth in TABLE 1, the focal lengths of each lens element and then each group of lens elements (i.e. first lens group 52, first zoom subgroup 53, second lens group 54, second zoom subgroup 56 and third zoom subgroup 57) may be calculated by using the aforementioned ZEMAX® optical design software, and those calculated group focal lengths are as follows:

First lens group 52 (elements 1–4)=−6.419 mm;
First zoom subgroup 53 (elements 5–8)=9.351 mm;
Second lens group 54 (elements 9 and 10)=7.768 mm;
Second zoom subgroup 56 (elements 11–13)=7.610 mm; and
Third zoom subgroup 57 (element 14)=7.161 mm.

Also, it should be noted that the first exemplary embodiment 50 is provided with one optical stop at the surface S26 which controls the diameter of the aperture through which light rays may pass at that point to thereby cause any light rays in the zoom lens system radially beyond that diameter to be stopped. The optical stop is the location at which a physical iris is located. The iris is located within or at an end of the second zoom subgroup 56, and moves with that zoom subgroup. Note that in FIG. 4, for example, the rim rays pass through the S26 with room to spare, while in FIG. 3, the rim rays are almost touching the extreme edges of S26 as they pass through the optical stop. This shows that the iris located at S26 must open as the focal length increases. To maintain a constant f-number at the image, the iris must "zoom" or change. In other words, the iris must be adjusted for constant aperture. A separate cam may be used to open or close the iris during zooming. In addition, it should be noted that all of the lens element surface apertures, set forth in TABLE 1, act as field stops at all focus and zoom positions as depicted in FIGS. 2–4.

The three zoom subgroups 53, 56 and 57 are each axially movable independently and their respective movements are coordinated by any convenient means, such as conventional mechanical devices such as cams or the like, to accomplish the desired focusing, zooming and athermalization functions.

The zoom lens system 50 has an iris S26 located within the second zoom subgroup 56 and therefore the iris S26 moves axially therewith. The size of the aperture of iris S26 is adjusted as the second zoom subgroup 56 moves axially, as described above, with respect to the maximum aperture diameters listed in TABLE 1 and is given with its largest value in TABLE 1.

Figure 6:
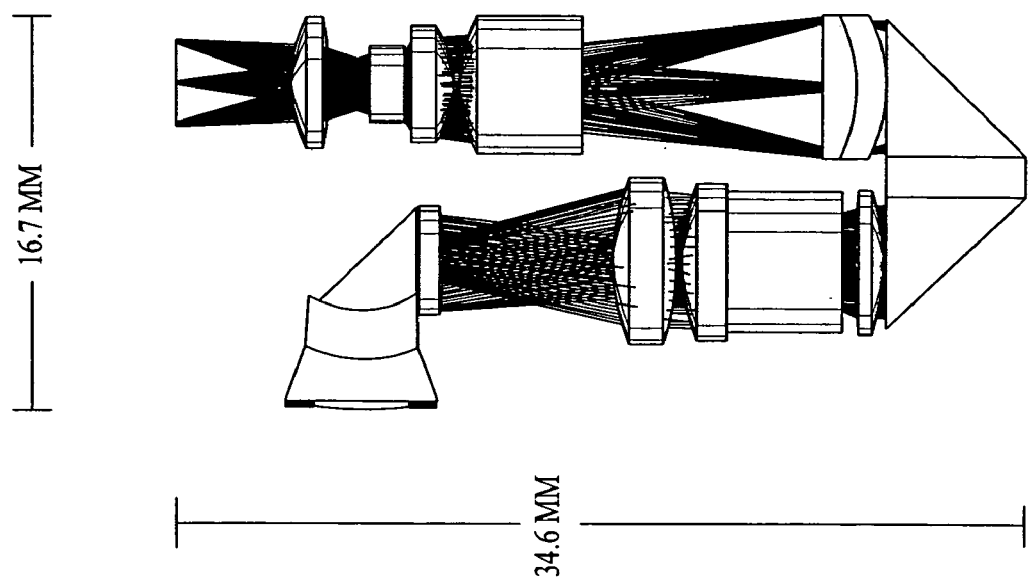
FIG. 6 illustrates a folded layout of the compound zoom lens according to the first embodiment of the present invention.
Figure 7:
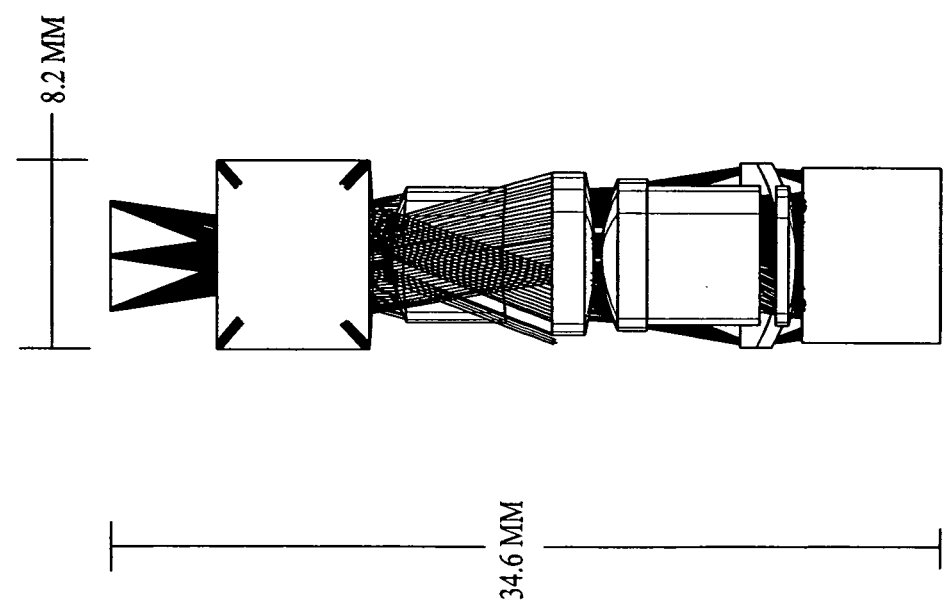
FIG. 7 illustrates a folded layout of the compound zoom lens according to the first embodiment of the present invention.

FIG. 5 shows a three-dimensional view of the system of the first exemplary embodiment. As indicated in FIG. 5, the front two elements and the two field lenses can be truncated with a rectangular profile in non-rotational embodiments to minimize bulk. FIGS. 6 and 7 show two different views of a folded non-rotational system with overall dimensions.

The specifications, performance and optical prescription described and illustrated throughout this application generally correspond to a non-rotating compound zoom lens. However, the optional rotational capability of the compound zoom lens is illustrated in FIG. 5. In one embodiment, the first fold prism 500 and the front elements 502 (which may be round instead of truncated in rotating embodiments) may rotate as a unit about the optical axis 506 with respect to the lens element 508 and all other lens elements and prisms on the image side of the first fold prism 500, as indicated by arrow 510. However, in alternative embodiments the rotation could occur between any of the lens elements 512. In another embodiment, the second fold prism 514 and all elements and prisms on the object side of the second fold prism 514 may rotate as a unit about the optical axis 516 with respect to the elements and prisms on the image side of the second fold prism 514, as indicated by arrow 518. Note that element 520 may be round instead of truncated in rotating embodiments. However, in alternative embodiments the rotation could occur between any of the lens elements 524. In further alternative embodiments, both rotations are possible. These rotations may allow part of the compound zoom lens to be located in the hinge of a clamshell style cellular telephone, for example.

It should also be understood that in order to preserve the example specifications, performance and optical prescription described and illustrated herein and avoid vignetting, rotational embodiments of the present invention require that the detector have a square aspect ratio, each side of the detector being equivalent to the smallest dimension of the rectangular image formed by the optical prescription of the non-rotational embodiment described herein. Alternatively, in order to preserve the image formed by the optical prescription of the non-rotational embodiment described herein and avoid vignetting, rotational embodiments of the present invention require some revisions to the optical prescription that do not require undue experimentation and are well within the capabilities of those skilled in the art to provide for larger prisms and changes to the other lens elements. By doing so, a rectangular image or any. image shape may be captured regardless of how the zoom lens is rotated.

Figure 9:
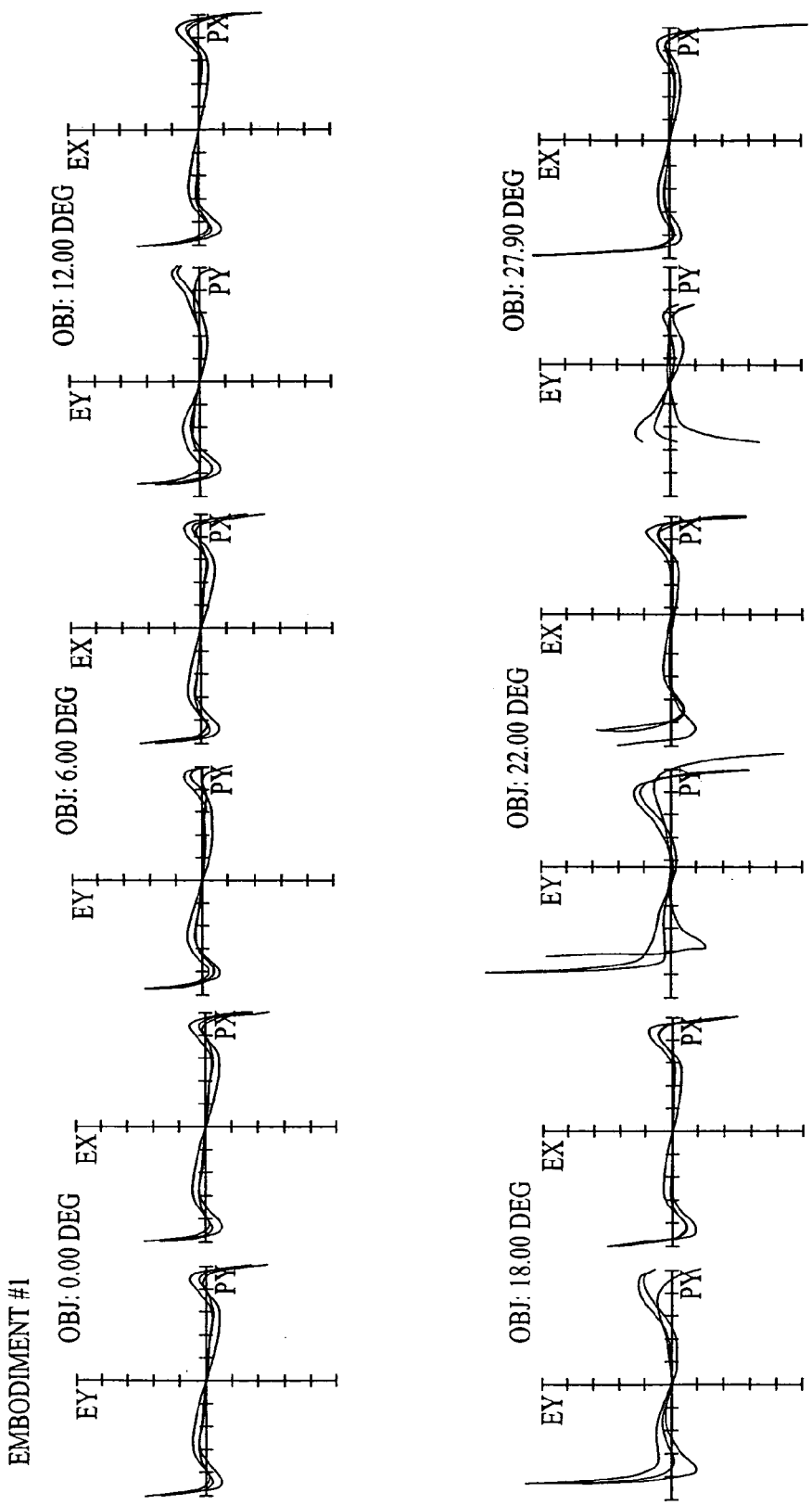
FIG. 9 illustrates transverse ray aberration plots at Zoom Position Z2 with an EFL of 5.7 mm and a FOV of 55.8 degrees according to the first embodiment of the present invention.

Referring now to FIGS. 8–10, the ray aberration graphs for Zoom Positions Z1–Z3, respectively, are shown in a conventional manner by six separate pairs of graphs with the maximum field height of 45° at the lower right corner and zero field height at the upper left corner and for three wavelengths (486 nm, 588 nm, and 656 nm). The left graph in each pair is the Y-FAN, while the right graph in each pair is the X-FAN. Each tic mark on the vertical axis represents 10 microns, and thus the maximum scale is +/−50 microns. As will readily appear to those skilled in the art, these performance curves establish that in all three Zoom Positions the zoom lens system performs exceptionally well for current broadcast television NTSC quality and very well for HDTV broadcast television quality.

Figure 11:
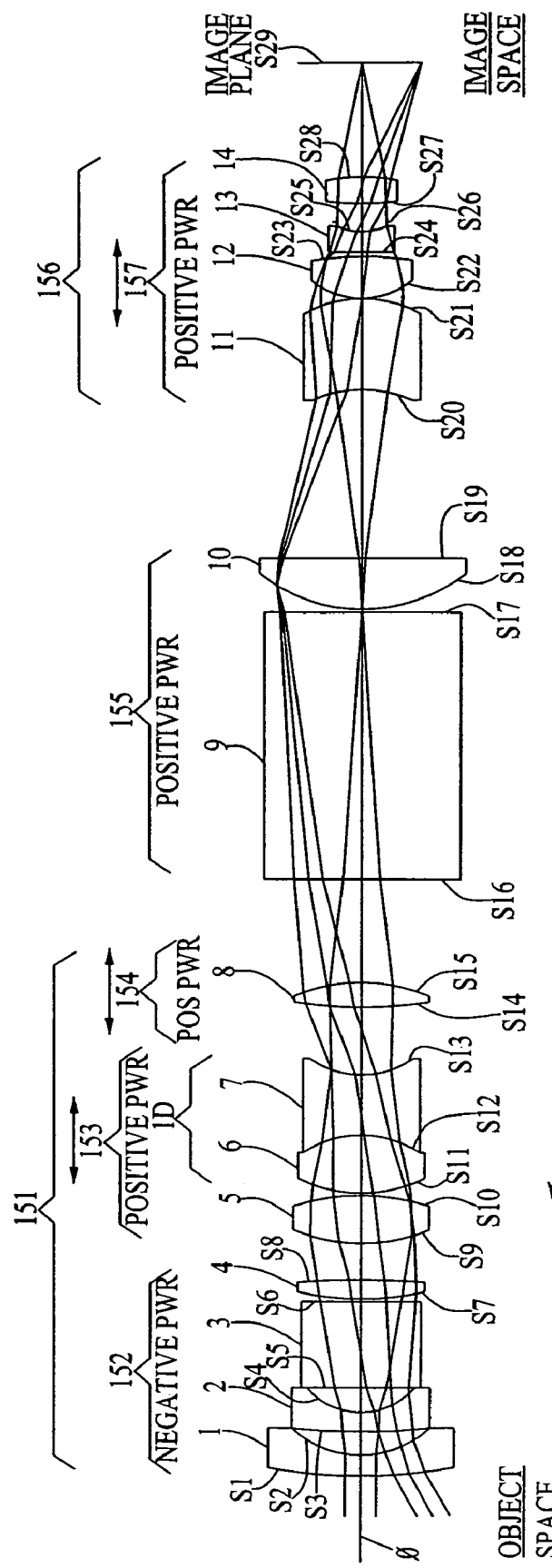
FIG. 11 illustrates an unfolded layout of the compound zoom lens with lens elements and surfaces identified according to a second embodiment of the present invention.

Second exemplary embodiment. FIG. 11 illustrates an unfolded layout of a second exemplary embodiment of the optionally rotatable compound zoom lens with lens elements and surfaces identified. The second exemplary embodiment is similar in specification and performance to the first exemplary embodiment, but uses two moving groups in the kernel and only a single moving group in the relay.

The specifications of the second exemplary embodiment (without the rotation feature) are approximately as follows:

Zoom Ratio: 5.5:1
Focal Length: 2.5–13.9 mm
Aperture: f/2.8–f/6.0
Full Field of View: 100.4 deg.–24.4 deg.
35 mm Still Equivalent: 18 mm–100 mm
35 mm Cine Equivalent: 12 mm–67 mm
Unfolded Vertex Length: 69.5 mm
Format: ⅓" (6 mm diagonal)
Folded Package Size: 34.5 mm×15.1 mm×9.4 mm
Exit Chief Ray Angle: Less than 24.7 degrees throughout zoom range As with the first exemplary embodiment, the focal lengths covered by the zoom range of the second exemplary embodiment have a 35 mm still camera equivalent of about 18 mm to 100 mm, the front element diameter is remarkably small, and the folded package size is very compact.

The vertex length of the second exemplary embodiment is about 69.5 mm, and a single fold prism is provided to allow the system to fit into a package size of about 34.5 mm×15.1 mm×9.4 mm. It should be noted that other configurations are possible. A glass block included in a first lens group could be used as a second fold prism. If the fold prisms are eliminated it would be possible to shorten the vertex length by about 10–15 mm, which may be acceptable or even preferable in some applications.

The working distance of the system is sufficient to place a third fold mirror or prism just before the image plane. This third fold mirror or prism could be used to simplify the sensor placement, or it could also be used to incorporate a true SLR optical viewfinder.

The second exemplary non-rotational embodiment of the present invention illustrated in FIG. 11 will now be described in greater detail with accompanying figures and tables. Referring to FIG. 11, each lens element is identified by a numeral from 1 through 14 and the general configuration of each lens element is depicted, but the actual radius of each lens surface is set forth below in a table. The lens surfaces are identified by the letter "S" followed by a numeral from S1 through S29.

Each lens element has its opposite surfaces identified by a separate but consecutive surface number as, for example, lens element 1 has lens surfaces S1 and S2, lens element 5 has lens surfaces S9 and S10 and so forth, as shown in FIG. 11, except that for doublet lens component 1D the coincident facing lens surfaces are given a single surface number S12. For example, doublet 1D is comprised of lens element 6 having a front lens surface S11 and a rear lens surface S12 and lens element 7 having a front lens surface S12 (coincidental) and a rear lens surface S13. The real image surface is identified by the numeral S29. All of the lens surfaces are spherical except lens surfaces S3, S4, S18, S20, S22 and S23 which are aspheric surfaces that are non-spherical, non-plano but rotationally symmetrical about the optical axis.

Before describing the detailed characteristics of the lens elements, a broad description of the lens groups and their axial positions and movement will be given for the zoom lens system, generally designated 150, of this second exemplary embodiment of the present invention.

Beginning from the end facing the object to be photographed, i.e. the left end in FIG. 11, a first lens group 151 comprises a first lens subgroup 152, a first zoom subgroup 153 and a second zoom subgroup 154. The first lens subgroup 152 is a negative-powered subgroup and comprises singlet lens elements 1–4 which gather light from object space and reduce the angle of the chief ray with respect to the optical axis (identified with a ∅). The first zoom subgroup 153 is a positive-powered subgroup and comprises a singlet lens element 5 and a first doublet 1D comprised of lens elements 6 and 7. The second zoom subgroup 154 comprises a singlet lens element 8. A second lens group 155 is stationary and is a positive-powered group, and comprises a prism element 9, a singlet lens element 10 and an intermediate image located near or within element 10. Lens element 10 may be referred to as a field lens. A third lens group 156 comprises a third zoom subgroup 157, which is a positive-powered subgroup, and includes an optical stop at S26 and comprises singlet lens elements 11–14.

The positive or negative power of each lens element in the exemplary first embodiment of the present invention is set forth below in TABLE 2. As described above, the resultant optical power of each group of lenses is as follows; the first lens subgroup 152 is negative, the first zoom subgroup 153 is positive, the second zoom subgroup 154 is positive, the second lens group 155 is positive, and the third zoom subgroup 157 is positive.

The optical design of the second exemplary embodiment comprises an NPP kernel followed by a P relay. There are three independently moving groups altogether, two on the object side and one on the image side of the intermediate image. The front negative powered group is stationary with respect to the image plane, as are both of the fold prisms. The zoom ratio of 5.5:1 is larger than that found in most compact digital cameras currently on the market, and the field of view at the wide end of 100.4 degrees is dramatically wider than that on any current compact digital camera.

The P relay, comprising a single independently moving positive group, has a notably simple structure that contributes significantly to the simplicity of the system as a whole.

The aperture of the system ranges from about f/2.8 to f/6.0, but is constant at about f/2.8 from about 2.5 mm through 5.5 mm focal length. From about 5.5 mm to 13.9 mm the aperture drops gradually from f/2.8 to f/6.0.

Each of the zoom subgroups 153, 154 and 156 are movable in both directions along the optical axis for focusing, zooming and athermalization, depending on their positions. In particular, at least two of the three zoom subgroups 153, 154 and 156 are simultaneously movable along an optical axis for zooming. Furthermore, when zoom subgroups 153 and 154 are simultaneously moving along the optical axis for zooming, and zoom subgroup 156 is temporarily stationary, the zoom lens system has a zoom ratio of less than 10 to 1. In addition, at least one of the zoom subgroups 153, 154 and 156 may also be movable along the optical axis for focusing and/or thermal compensation.

The stationary first lens subgroup 152 and second lens group 155 remain stationary and at a fixed distance from the real image surface S29 during zooming. The horizontal arrows with arrowheads on both ends in the upper portion of FIG. 11 indicate that each of the zoom subgroups 153, 154 and 157 are movable in both axial directions but in a monotonic manner (i.e. in only one direction when progressing from one extreme to the other of adjustments).

While only the lens elements are physically shown in FIG. 11, it is to be understood that conventional mechanical devices and mechanisms are provided for supporting the lens elements and for causing axial movement of the movable groups in a conventional lens housing or barrel.

The lens construction and fabrication data for the above-described exemplary first zoom lens system embodiment 150 is set forth below in TABLE 2.

In TABLE 2, the first column "ITEM" identifies each optical element, with the same numeral or label as used in FIG. 11. The second and third columns identify the "Group" and "Subgroup," respectively, to which that optical element (lens) belongs with the same numerals used in FIG. 11. The fourth column "Surface" is a list of the surface numbers of the Stop (iris) S26 and each of the actual surfaces of the lenses, as identified in FIG. 11. The fifth column "Zoom Position" identifies three typical zoom positions (Z1–Z3) of the zoom subgroups 153, 154 and 157 (illustrated in FIGS. 12–14) wherein there are changes in the distance (separation) between some of the surfaces listed in the fourth column, as described below more thoroughly. The sixth column, headed by the legend "Radius of Curvature," is a list of the optical surface radius of curvature for each surface, with a minus sign (−) meaning the center of the radius of curvature is to the left of the surface, as viewed in FIG. 11, and "Infinity" meaning an optically flat surface. The asterisk (*) for surfaces S3, S4, S18, S20, S22 and S23 indicate these are aspheric surfaces for which the "radius of curvature" is a base radius, and the formula and coefficients for those two surfaces are set forth as a footnote to TABLE 2 at the * (asterisk). The seventh column "Thickness or Separation" is the axial distance between that surface (fourth column) and the next surface. For example, the distance between surface S2 and surface S3 is 1.143 mm.

The eighth and ninth columns of TABLE 2 provide the refractive index and Abbe # of each lens element. The last column of TABLE 2 headed "Aperture Diameter" provides the maximum diameter for each surface through which the light rays pass. All of the maximum aperture diameters, except for the Stop surface S26, are calculated assuming an image diagonal of 6 mm and a relative aperture ranging from f/2.8 at the shortest focal length to f/6.0 at the longest focal length. The maximum aperture diameters of the Stop surface S26 for Zoom Positions Z1–Z3 are 1.989 mm, 2.185 mm and 1.569 mm, respectively. The relative apertures (f-number) for Zoom Positions Z1–Z3 are f/2.8, f/2.8 and f/6.0, respectively.

TABLE 2

OPTICAL PRESCRIPTION

| Item | Group | Sub-Group | Surface | Zoom Position | Radius of Curvature (mm) | Thickness of Separation (mm) | Refractive Index ($n_d$) | Abbe # ($v_d$) | Aperture Diameter (mm) |
|---|---|---|---|---|---|---|---|---|---|
| 0 | | | | All | Infinity | Infinity | | | |
| 1 | 151 | 152 | S1 | All | 31.809 | 1.000 | 1.74400 | 44.72 | 9.39 |
| | | | S2 | All | 5.617 | 1.143 | | | 7.11 |
| 2 | 151 | 152 | S3 | All | −1381.299* | 0.910 | 1.58913 | 61.27 | 7.11 |
| | | | S4 | All | 3.790* | 1.142 | | | 5.72 |
| 3 | 151 | 152 | S5 | All | Infinity | 4.200 | 1.78472 | 25.76 | 5.72 |
| | | | S6 | All | Infinity | 0.140 | | | 6.15 |
| 4 | 151 | 152 | S7 | All | 16.545 | 0.936 | 1.78472 | 25.76 | 6.43 |
| | | | S8 | Z1 | −62.821 | 8.076 | | | 6.50 |
| | | | | Z2 | | 1.741 | | | |
| | | | | Z3 | | 0.143 | | | |
| 5 | 151 | 153 | S9 | All | 9.353 | 2.333 | 1.57960 | 53.89 | 6.91 |
| | | | S10 | All | −11.419 | 0.140 | | | 6.70 |
| 6 | 151 | 153 | S11 | All | 8.170 | 2.792 | 1.62004 | 36.37 | 6.44 |
| 7 | 151 | 153 | S12 | All | −5.671 | 2.984 | 1.84666 | 23.83 | 5.96 |
| | | | S13 | Z1 | 4.694 | 1.819 | | | 5.19 |
| | | | | Z2 | | 3.333 | | | |
| | | | | Z3 | | 1.934 | | | |
| 8 | 151 | 154 | S14 | All | 24.277 | 1.200 | 1.62004 | 36.37 | 6.58 |
| | | | S15 | Z1 | −8.915 | 0.092 | | | 6.74 |
| | | | | Z2 | | 5.178 | | | |
| | | | | Z3 | | 7.778 | | | |
| 9 | 155 | | S16 | All | Infinity | 13.000 | 1.71300 | 53.83 | 9.28 |
| | | | S17 | All | Infinity | 0.140 | | | 9.28 |
| 10 | 155 | | S18 | All | 6.527* | 2.500 | 1.81600 | 46.60 | 9.85 |
| | | | S19 | Z1 | Infinity | 9.472 | | | 9.53 |
| | | | | Z2 | | 8.221 | | | |
| | | | | Z3 | | 5.057 | | | |
| 11 | 156 | 157 | S20 | All | −5.614* | 4.389 | 1.77250 | 49.60 | 4.72 |
| | | | S21 | All | −5.866 | 0.107 | | | 5.55 |
| 12 | 156 | 157 | S22 | All | 3.306 | 2.000 | 1.77250 | 49.60 | 4.73 |
| | | | S23 | All | −19.745* | 0.199 | | | 4.02 |
| 13 | 156 | 157 | S24 | All | Infinity | 1.000 | 1.84666 | 23.83 | 3.05 |
| | | | S25 | All | 2.185 | 0.500 | | | 2.20 |

TABLE 2-continued

OPTICAL PRESCRIPTION

| Item | Group | Sub-Group | Surface | Zoom Position | Radius of Curvature (mm) | Thickness of Separation (mm) | Refractive Index ($n_d$) | Abbe # ($v_d$) | Aperture Diameter (mm) |
|---|---|---|---|---|---|---|---|---|---|
| Stop | | | S26 | All | Infinity | 0.892 | | | 2.19 |
| 14 | 156 | 157 | S27 | All | 13.533 | 1.260 | 1.77250 | 49.60 | 2.90 |
| | | | S28 | Z1 | −8.762 | 4.861 | | | 3.20 |
| | | | | Z2 | | 5.516 | | | |
| | | | | Z3 | | 9.651 | | | |
| Image | | | S29 | All | Infinity | | | | 6.00 |

*Surface profiles of aspheric surfaces S3, S4, S18, S20, S22 and S23 are governed by the following conventional equation:

$$Z = \frac{(CURV)Y^2}{1 + (1 - (1 + K)(CURV)^2 Y^2)^{1/2}} + (A)Y^4 + (B)Y^6 + (C)Y^8 + (D)Y^{10}$$

where:
CURV=1/(Radius of Curvature)
Y=Aperture height, measured perpendicular to optical axis
K, A, B, C, D=Coefficients
Z=Position of surface profile for a given Y value, as measured along the optical axis from the pole (i.e. axial vertex) of the surface.

The coefficients for the surface S3 of item 2 are:
K=0.00000
A=−4.92392E-04
B=1.01829E-04
C=3.93142E-06
D=−2.99149E-07

The coefficients for the surface S4 of item 2 are:
K=−2.50191
A=3.33430E-03
B=−2.53054E-04
C=5.73234E-05
D=8.41399E-06

The coefficients for the surface S18 of item 10 are:
K=0.00000
A=−9.13121E-04
B=1.55486E-05
C=3.83553E-07
D=7.85338E-09

The coefficients for the surface S20 of item 11 are:
K=−2.07603
A=1.86374E-04
B=−4.19463E-04
C=3.84247E-05
D=−4.02336E-06

The coefficients for the surface S22 of item 12 are:
K=0.00000
A=−2.60448E-03
B=−4.28207E-04
C=3.49618E-05
D=−1.46515E-05

The coefficients for the surface S23 of item 12 are:
K=0.00000
A=−1.28492E-03
B=−2.88524E-04
C=−9.90931E-05
D=1.53404E-05

The foregoing footnote * to TABLE 2 includes the equation for calculating the shape of the aspheric surfaces S3, S4, S18, S20, S22 and S23 for the value Z, wherein CURV is the curvature at the pole of the surface, Y is the height or distance from the optical axis of a specific point on the surface of the glass, K is the conic coefficient, and A, B, C and D are the 4th, 6th, 8th, and 10th, respectively, order deformation coefficients. As noted above, for illustrating the scope and versatility of the present invention there are three different Zoom Positions Z1, Z2 and Z3 set forth in the data of TABLE 2 which provide specific data for three different positions for the three movable zoom subgroups. The Zoom Positions Z1, Z2 and Z3 are representative of three positions of the zoom subgroups 153, 154 and 157 with Zoom Positions Z1 and Z3 being the extreme positions and Z2 being an intermediate position. Of course, it will be understood that continuous zooming is available between the extreme Zoom Positions Z1 and Z3, and that any combination of continuous zooming is available within the described zoom ranges with the lens system 150.

The Effective Focal Length (EFL), Full Field Of View (FFOV) and F-number of the lens system 150 varies for the different Zoom Positions. Referring now to FIGS. 12–14, the zoom lens system 150 is shown with the zoom groups in various Zoom Positions and with light ray traces for those positions. FIG. 12 represents the zoom position Z1 for which data is set forth above in TABLE 2 with an EFL of about 2.5 mm, a FFOV of about 100.4°, and an F-number of about 2.8. FIG. 13 represents the zoom position Z2 from TABLE 2 with an EFL of about 5.5 mm, a FFOV of about 56.8°, and an F-number of about 2.8. FIG. 14 represents the zoom position Z3 from TABLE 2 with an EFL of about 13.9 mm, a FFOV of about 24.4°, and an F-number of about 6.0.

From the specifications for the individual lens elements (Items 1–14) and the separation between lens elements set forth in TABLE 2, the focal lengths of each lens element and then each group of lens elements (i.e. first lens group 152, first zoom subgroup 153, second zoom subgroup 154, second lens group 155, and third zoom subgroup 157) may be calculated by using the aforementioned ZEMAX® optical design software, and those calculated group focal lengths are as follows:

First lens group 152 (elements 1–4)=−6.440 mm;
First zoom subgroup 153 (elements 5–7)=11.084 mm;
Second zoom subgroup 154 (element 8)=10.664 mm;
Second lens group 155 (elements 9 and 10)=7.999 mm; and
Third zoom subgroup 157 (elements 11–14)=5.197 mm.

Also, it should be noted that the zoom lens system 150 is provided with one optical stop at the surface S26 which controls the diameter of the aperture through which light rays may pass at that point to thereby cause any light rays in the zoom lens system radially beyond that diameter to be stopped. The optical stop is the location at which a physical iris is located. The iris is located within or at an end of the second zoom subgroup 156, and moves with that zoom subgroup. Note that in FIG. 14, for examples the rim rays pass through the S26 with room to spare, while in FIG. 13, the rim rays are almost touching the extreme edges of S26 as they pass through the optical stop. This shows that the iris located at S26 must open as the focal length increases. To maintain a constant f-number at the image, the iris must "zoom" or change. In other words, the iris must be adjusted for constant aperture. A separate cam may be used to open or close the iris during zooming. In addition, it should be noted that all of the lens element surface apertures, set forth in TABLE 2, act as field stops at all focus and zoom positions as depicted in FIGS. 12–14.

The three zoom subgroups 153, 154 and 157 are each axially movable independently and their respective movements are coordinated by any convenient means, such as conventional mechanical devices such as cams or the like, to accomplish the desired focusing, zooming and athermalization functions.

The zoom lens system 150 has an iris S26 located within the third zoom subgroup 157 and therefore the iris S26 moves axially therewith. The size of the aperture of iris S26 is adjusted as the third zoom subgroup 157 moves axially, as described above, with respect to the maximum aperture diameters listed in TABLE 2 and is given with its largest value in TABLE 2.

Figure 17:
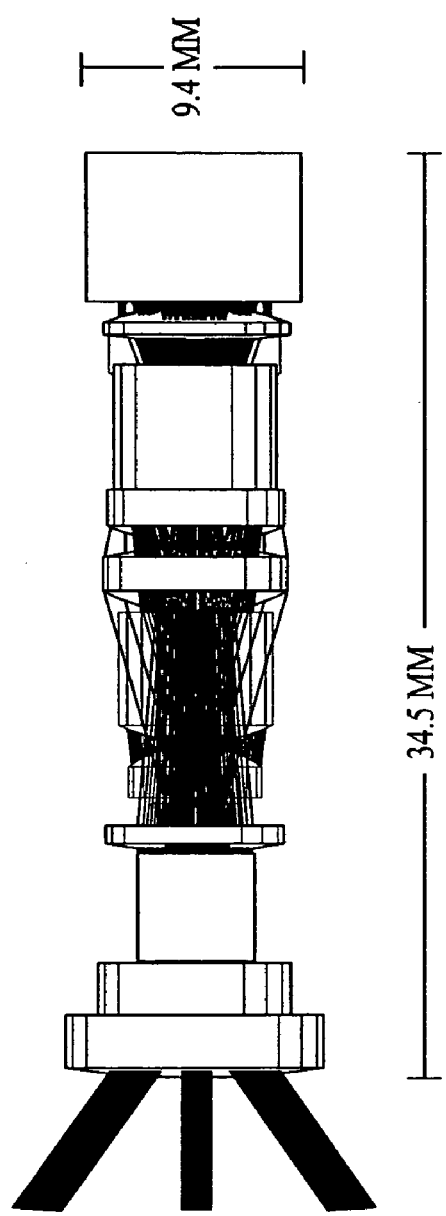
FIG. 17 illustrates a folded layout of the compound zoom lens according to the first embodiment of the present invention.
Figure 18:
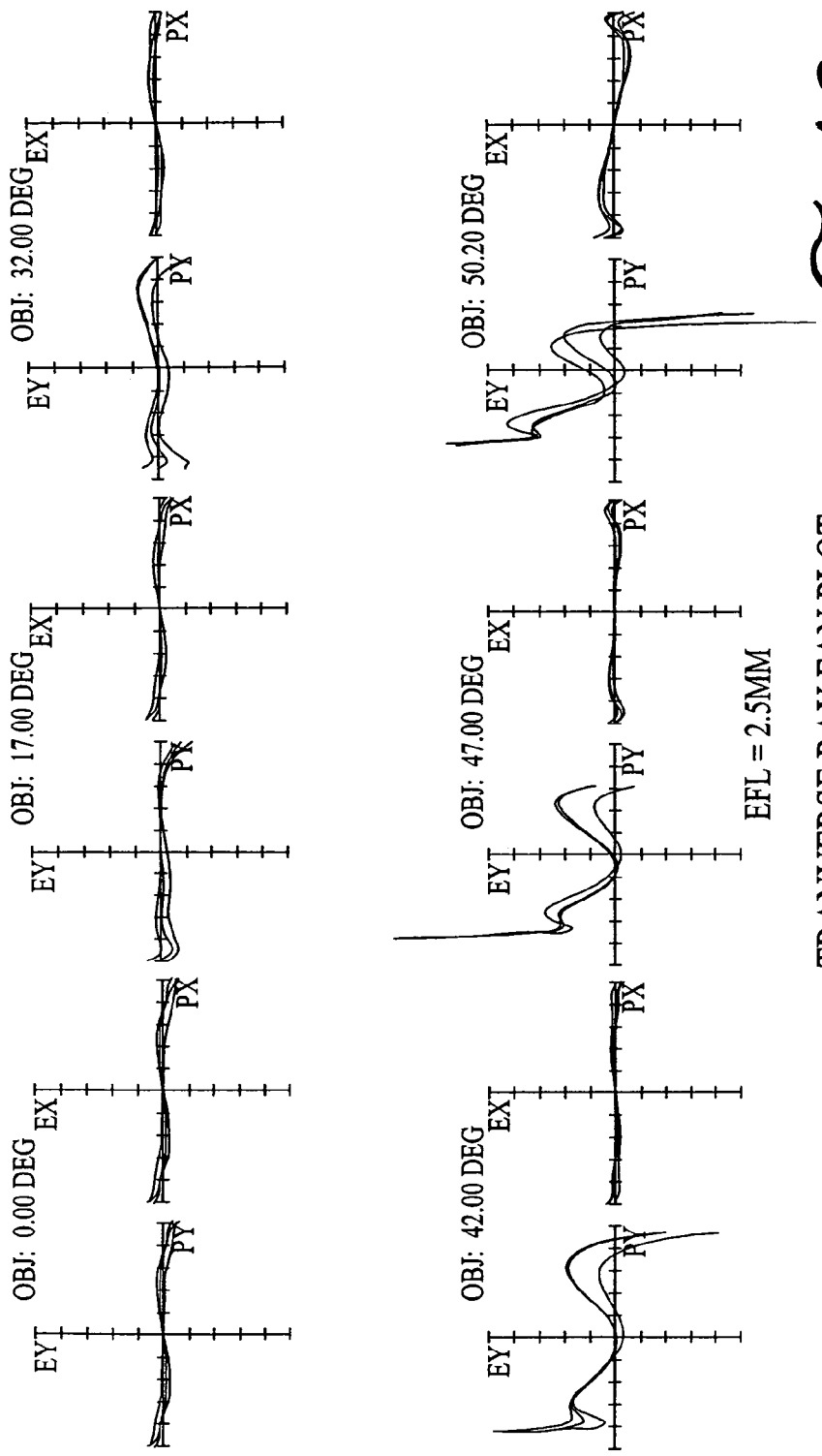
FIG. 18 illustrates transverse ray aberration plots at Zoom Position Z1 with an EFL of 2.5 mm and a FOV of 100.4 degrees according to the second embodiment of the present invention.

FIG. 15 shows a three-dimensional view of the system of the second exemplary embodiment. As indicated in FIG. 15, the field lens 1528 can be truncated with a rectangular profile in non-rotational embodiments to minimize bulk. A glass block 1530 included in the first lens group could be used as a second fold prism, but the three-dimensional drawing in FIG. 18 illustrates an unfolded configuration. FIGS. 16 and 17 show two different views of a folded non-rotational system with overall dimensions.

Figure 19:
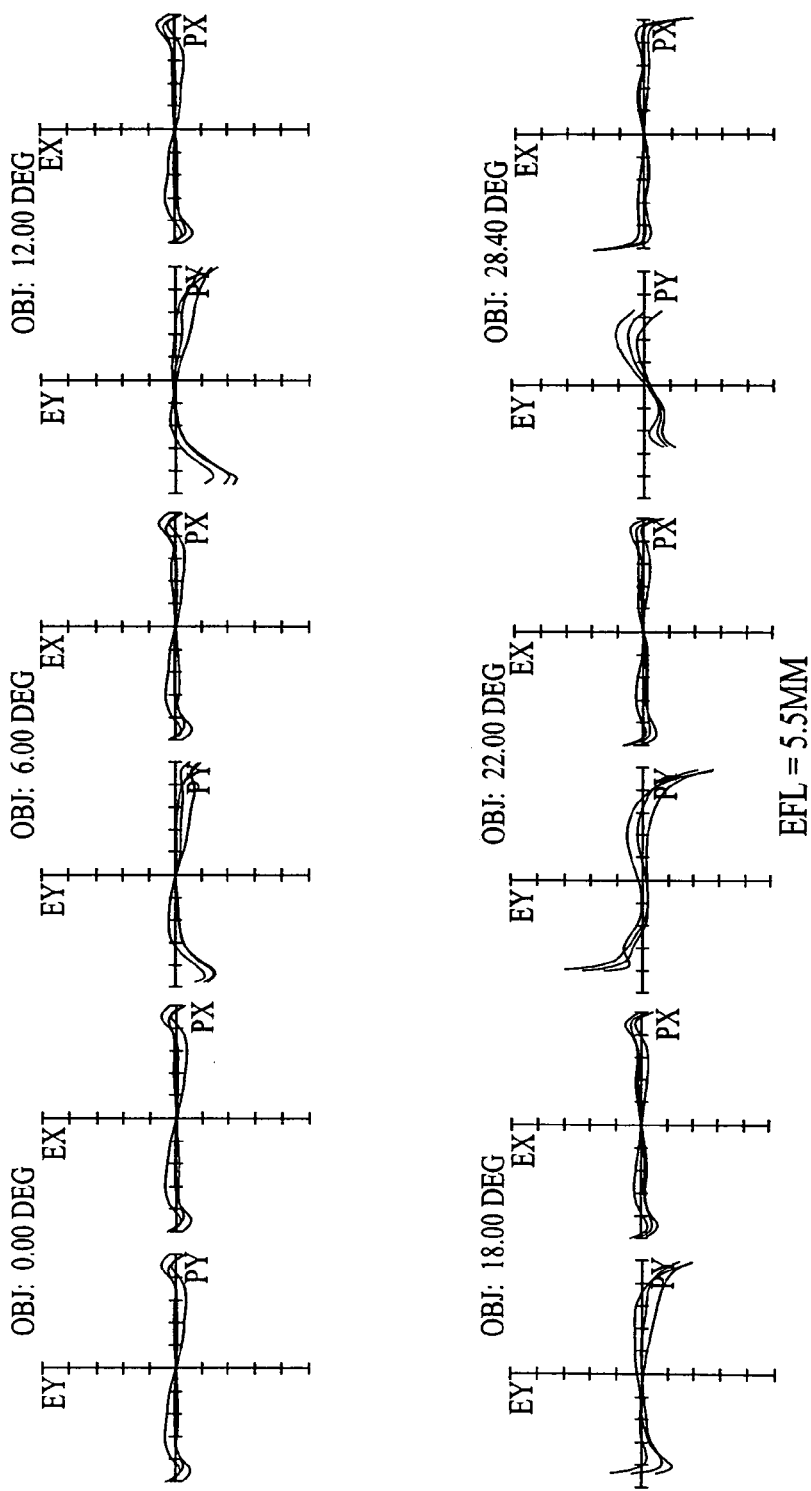
FIG. 19 illustrates transverse ray aberration plots at Zoom Position Z2 with an EFL of 5.5 mm and a FOV of 56.8 degrees according to the second embodiment of the present invention.
Figure 20:
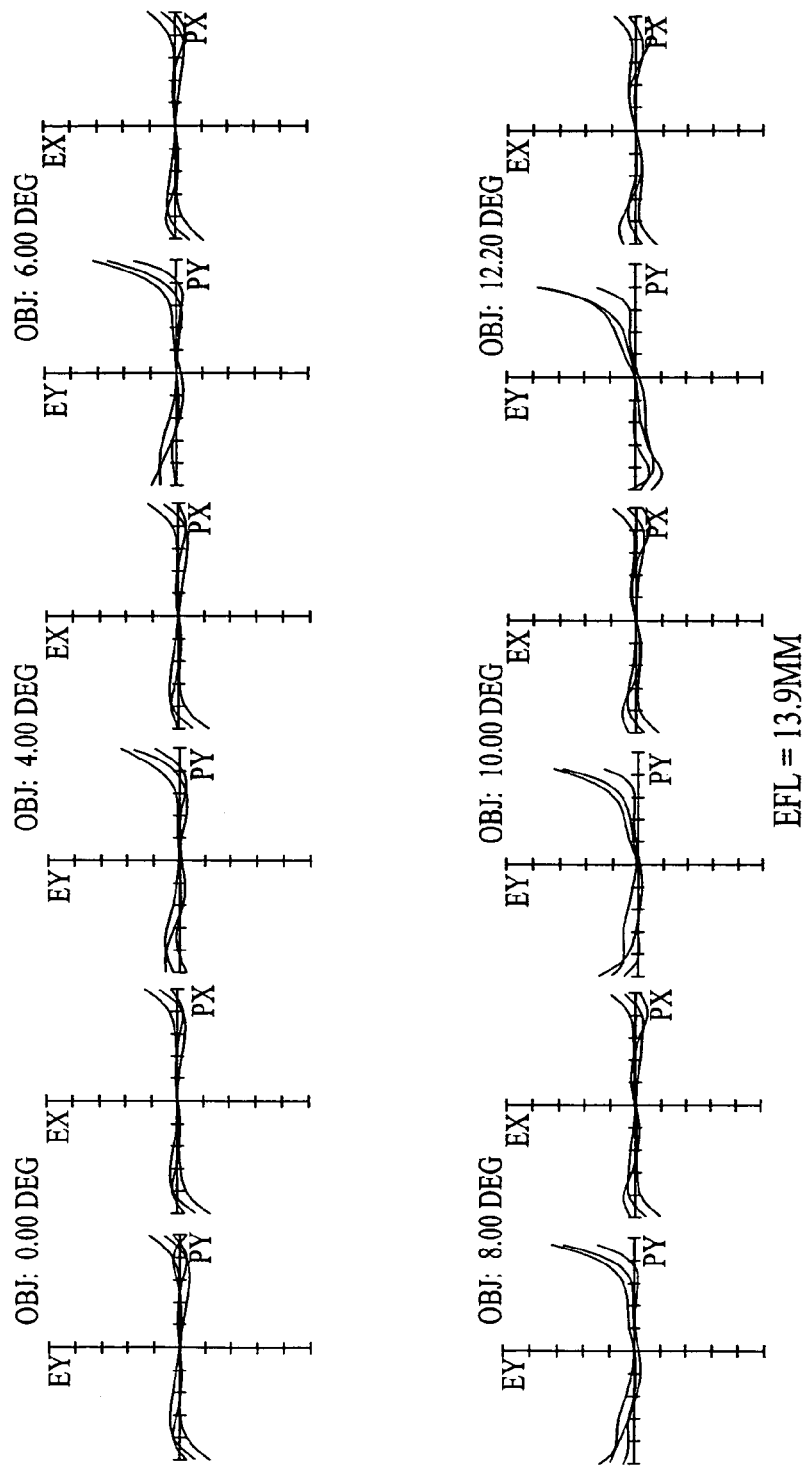
FIG. 20 illustrates transverse ray aberration plots at Zoom Position Z3 with an EFL of 13.9 mm and a FOV of 24.4 degrees according to the second embodiment of the present invention.

Referring now to FIGS. 18–20, the ray aberration graphs for Zoom Positions Z1–Z3, respectively, are shown in a conventional manner by six separate pairs of graphs with the maximum field height of 45° at the lower right corner and zero field height at the upper left corner and for three wavelengths (486 nm, 588 nm, and 656 nm). The left graph in each pair is the Y-FAN, while the right graph in each pair is the X-FAN. Each tic mark on the vertical axis represents 10 microns, and thus the maximum scale is +/−50 microns. As will readily appear to those skilled in the art, these performance curves establish that in all three Zoom Positions the zoom lens system performs exceptionally well for current broadcast television NTSC quality and very well for HDTV broadcast television quality.

Figure 21:
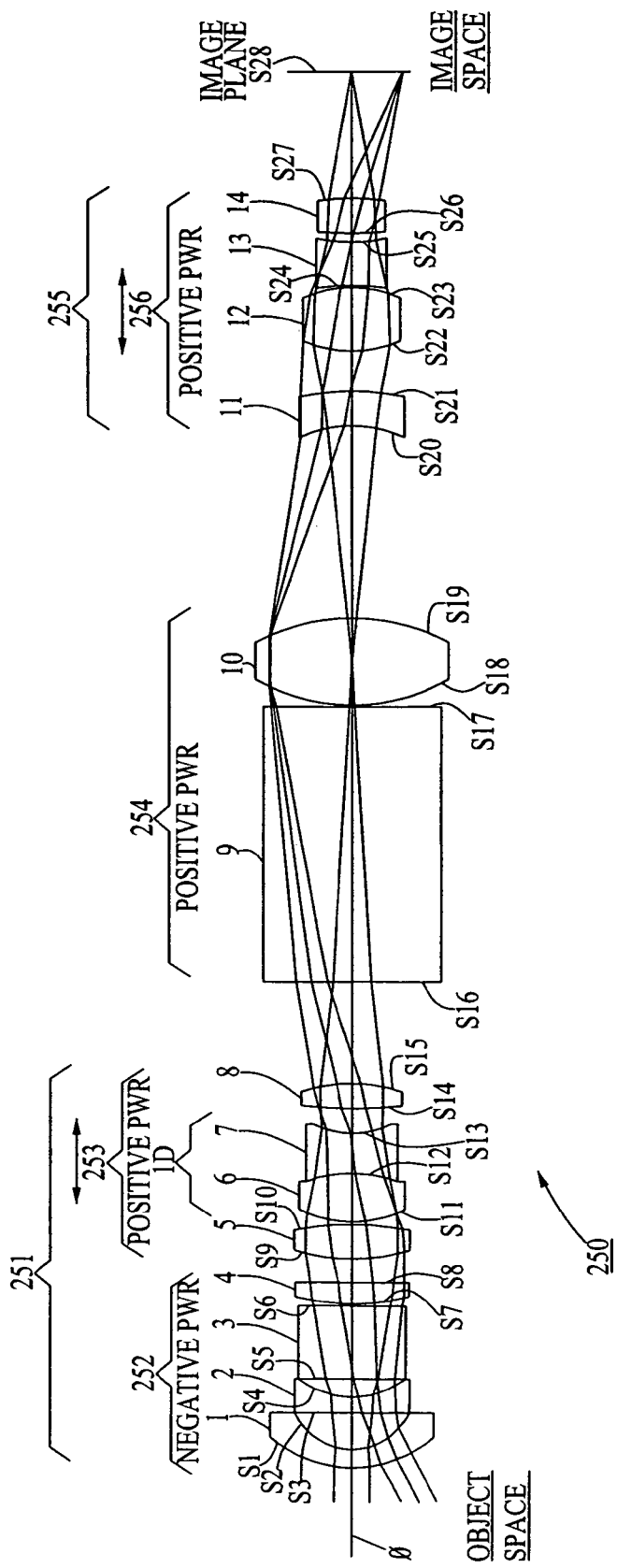
FIG. 21 illustrates an unfolded layout of the compound zoom lens with lens elements and surfaces identified according to a third embodiment of the present invention.

Third exemplary embodiment. FIG. 21 illustrates an unfolded layout of a third exemplary embodiment of the optionally rotatable compound zoom lens with lens elements and surfaces identified. The third exemplary embodiment is similar in specification and performance to the first and second exemplary embodiments, but represents a significant simplification over the first two embodiments in that the number of independently moving groups has been reduced to just two. Several plastic aspherical elements are also incorporated to enhance manufacturability. The plastic material chosen for these elements has the trade name Zeonex, and is currently regarded as the material of choice for molded plastic optics due to its resistance to water absorption.

The specifications of the second exemplary embodiment (without the rotation feature) are approximately as follows:
Zoom Ratio: 4.8:1
Focal Length: 3.0–13.9 mm
Aperture: f/3.0–f/6.3
Full Field of View: 90.0 deg.–24.4 deg.
35 mm Still Equivalent: 21 mm–100 mm
35 mm Cine Equivalent: 14 mm–67 mm
Unfolded Vertex Length: 80.6 mm
Format: ⅓" (6 mm diagonal)
Folded Package Size: 42.2 mm×20.5 mm×8.0 mm
Exit Chief Ray Angle: Less than 20.0 degrees throughout zoom range The focal lengths covered by the zoom range of the third exemplary embodiment have a 35 mm still camera equivalent of about 21 mm to 100 mm, the front element diameter is remarkably small, and the folded package size is very compact.

The vertex length is 80.6 mm, and two fold prisms are provided to allow the system to fit into a package size of 42.2 mm×20.5 mm×8.0 mm. It should be noted that other configurations are possible. The vertex is longer than in the previous two embodiments primarily because the 180 degree fold prism has been lengthened by several millimeters. This lengthening has the direct effect of widening the gap between the folded parts of the optical path, thus allowing more room for mechanical and electrical components.

The working distance of the system is sufficient to place a third fold mirror or prism just before the image plane. This third fold mirror or prism could be used to simplify the sensor placement, or it could also be used to incorporate a true SLR optical viewfinder.

The third exemplary non-rotational embodiment of the present invention illustrated in FIG. 21 will now be described in greater detail with accompanying figures and tables. Referring to FIG. 21, each lens element is identified by a numeral from 1 through 14 and the general configuration of each lens element is depicted, but the actual radius of each lens surface is set forth below in a table. The lens surfaces are identified by the letter "S" followed by a numeral from S1 through S28.

Each lens element has its opposite surfaces identified by a separate but consecutive surface number as, for example, lens element 1 has lens surfaces S1 and S2, lens element 5 has lens surfaces S9 and S10 and so forth, as shown in FIG. 21, except that for doublet lens component 1D the coincident facing lens surfaces are given a single surface number S12. For example, doublet 1D is comprised of lens element 6 having a front lens surface S11 and a rear lens surface S12 and lens element 7 having a front lens surface S12 (coincidental) and a rear lens surface S13. The real image surface is identified by the numeral S28. All of the lens surfaces are spherical except lens surfaces S4, S18, S19, S20, S22 and S23 which are aspheric surfaces that are non-spherical, non-plano but rotationally symmetrical about the optical axis.

Before describing the detailed characteristics of the lens elements, a broad description of the lens groups and their axial positions and movement will be given for the zoom lens system, generally designated 250, of this third exemplary embodiment of the present invention.

Beginning from the end facing the object to be photographed, i.e. the left end in FIG. 21, a first lens group 251 comprises a first lens subgroup 252 and a first zoom subgroup 253. The first lens subgroup 252 is a negative-powered subgroup and comprises singlet lens elements 1–4 which gather light from object space and reduce the angle of the chief ray with respect to the optical axis (identified with a ∅). The first zoom subgroup 253 is a positive-powered subgroup and comprises a singlet lens element 5, a first doublet 1D comprised of lens elements 6 and 7, and a singlet lens element 8. A second lens group 254 is stationary and is a positive-powered group, and comprises a prism element 9, a singlet lens element 10 and an intermediate image located near or within element 10. Lens element 10 may be referred to as a field lens. A third lens group 255 comprises a second zoom subgroup 256, which is a positive-powered subgroup, and includes an optical stop at S25 and comprises singlet lens elements 11–14.

The positive or negative power of each lens element in the third exemplary embodiment of the present invention is set forth below in TABLE 3. As described above, the resultant optical power of each group of lenses is as follows; the first lens subgroup 252 is negative, the first zoom subgroup 253 is positive, the second lens group 254 is positive, and the second zoom subgroup 256 is positive.

The optical design consists of an NP kernel followed by a P relay. There are only two independently moving groups altogether; one on the object side and one on the image side of the intermediate image. This represents the minimum number of moving groups necessary to produce a true zoom lens. The front negative powered group is stationary with respect to the image plane, as are both of the fold prisms. The zoom ratio of 4.8:1 is larger than that found in most compact digital cameras currently on the market, and the field of view at the wide end of 90 degrees is considerably wider than that on any current compact digital camera.

The P relay, comprising a single independently moving positive group, has a notably simple structure that contributes significantly to the simplicity of the system as a whole.

The aperture of the system ranges from about f/3.0 to f/6.0, but is constant at about f/3.0 from about 3.0 mm through 6.0 mm focal length. From 6.0 mm to 13.9 mm focal length the aperture drops gradually from f/3.0 to f/6.0.

A significant advantage of this two-group compound zoom structure is that the same two moving groups can be used for focusing as well as for zooming, while maintaining excellent image quality. As a result the outermost lens group remains completely stationary for all configurations of the lens system, which allows for a more robust opto-mechanical design with good environmental sealing.

The optimal group motions for focusing are dependent on the focal length setting. At short focal lengths it is preferable to use the image side moving group for focusing, while at long focal lengths it is preferable to use the object side moving group for focusing. For intermediate focal lengths a combined motion of both groups may be used. It is important to note that these preferences are generalizations, and that in practice there is a great deal of latitude in the choice of group motions for focusing. The specific group motions chosen for focusing this design to an object distance of 100 mm were selected to provide good image quality while moving the fewest possible groups. In this case it is possible to move just a single group for focusing over much of the zoom range, and a two-group motion is only required in a restricted middle portion of the zoom range.

In addition, the same moving groups used for zooming and focusing can be used for thermal compensation. For example, in the present embodiment an increase in temperature from 20° C. to 40° C. would require a compensation equivalent to focusing on an object approximately 900 mm from the front vertex. This is a very slight compensation, despite the use of three plastic elements in the design, and has almost no impact at all on the aberration correction. Because the thermal characteristics of this embodiment are almost linear, this lens can work over a range of about 0° C. (32° F.) to about 40° C. (104° F.). This range can be extended depending on the application requirement.

Each of the zoom subgroups 253 and 256 are movable in both directions along the optical axis for focusing, zooming and athermalization, depending on their positions. In particular, at least one of the zoom subgroups 253 and 256 may be movable along the optical axis for either focusing and zooming, thermal compensation and zooming, or for focusing, thermal compensation and zooming. The stationary first lens subgroup 252 and second lens group 254 remain stationary and at a fixed distance from the real image surface S28 during zooming. The horizontal arrows with arrowheads on both ends in the upper portion of FIG. 21 indicate that each of the zoom subgroups 253 and 256 are movable in both axial directions but in a monotonic manner (i.e. in only one direction when progressing from one extreme to the other of adjustments).

While only the lens elements are physically shown in FIG. 21, it is to be understood that conventional mechanical devices and mechanisms are provided for supporting the lens elements and for causing axial movement of the movable groups in a conventional lens housing or barrel.

The lens construction and fabrication data for the above-described exemplary first zoom lens system embodiment 250 is set forth below in TABLE 3.

In TABLE 3, the first column "ITEM" identifies each optical element, with the same numeral or label as used in FIG. 21. The second and third columns identify the "Group" and "Subgroup," respectively, to which that optical element (lens) belongs with the same numerals used in FIG. 21. The fourth column "Surface" is a list of the surface numbers of the Stop (iris) S25 and each of the actual surfaces of the lenses, as identified in FIG. 21. The fifth column "Zoom Position" identifies six typical zoom positions (Z1–Z6) of the zoom subgroups 253 and 256 (illustrated in FIGS. 22–24) wherein there are changes in the distance (separation) between some of the surfaces listed in the fourth column, as described below more thoroughly. The sixth column, headed by the legend "Radius of Curvature," is a list of the optical surface radius of curvature for each surface, with a minus sign (−) meaning the center of the radius of curvature is to the left of the surface, as viewed in FIG. 21, and "Infinity" meaning an optically flat surface. The asterisk (*) for surfaces S4, S18, S19, S20, S22 and S23 indicate these are aspheric surfaces for which the "radius of curvature" is a base radius, and the formula and coefficients for those two surfaces are set forth as a footnote to TABLE 3 at the * (asterisk). The seventh column "Thickness or Separation" is the axial distance between that surface (fourth column) and the next surface. For example, the distance between surface S2 and surface S3 is 2.144 mm.

The eighth and ninth columns of TABLE 3 provide the refractive index and Abbe # of each lens element. The last column of TABLE 3 headed "Aperture Diameter" provides the maximum diameter for each surface through which the light rays pass. All of the maximum aperture diameters, except for the Stop surface S25, are calculated assuming an image diagonal of 6 mm and a relative aperture ranging from f/3.0 at the shortest focal length to f/6.3 at the longest focal length. The maximum aperture diameters of the Stop surface S25 for Zoom Positions Z1–Z6 are 2.414 mm, 2.426 mm, 2.548 mm, 2.500 mm, 1.986 mm, and 1.790 mm, respectively. The relative apertures (f-number) for Zoom Positions Z1–Z6 are f/3.0, f/3.0, f/3.0, f/3.1, f/6.0 and f/6.6, respectively.

TABLE 3

OPTICAL PRESCRIPTION

| Item | Group | Sub-Group | Surface | Zoom Position | Radius of Curvature (mm) | Thickness or Separation (mm) | Refractive Index ($n_d$) | Abbe # ($v_d$) | Aperture Diameter (mm) |
|---|---|---|---|---|---|---|---|---|---|
| 0 | | | | Z1 | | Infinity | | | |
| | | | | Z2 | | 100.000 | | | |
| | | | | Z3 | | Infinity | | | |
| | | | | Z4 | | 100.000 | | | |
| | | | | Z5 | | Infinity | | | |
| | | | | Z6 | | 100.000 | | | |
| 1 | 251 | 252 | S1 | All | 7.653 | 1.000 | 1.74400 | 44.72 | 9.28 |
| | | | S2 | All | 3.647 | 2.144 | | | 6.59 |
| 2 | 251 | 252 | S3 | All | −82.240 | 0.900 | 1.52996 | 55.87 | 6.59 |
| | | | S4 | All | 3.520* | 1.004 | | | 5.68 |
| 3 | 251 | 252 | S5 | All | Infinity | 4.200 | 1.78472 | 25.76 | 5.68 |
| | | | S6 | All | Infinity | 0.150 | | | 6.11 |
| 4 | 251 | 252 | S7 | All | 14.124 | 1.200 | 1.78472 | 25.76 | 6.34 |
| | | | S8 | Z1 | −211.503 | 7.120 | | | 6.38 |
| | | | | Z2 | | 7.120 | | | |
| | | | | Z3 | | 1.313 | | | |
| | | | | Z4 | | 1.883 | | | |
| | | | | Z5 | | 0.500 | | | |
| | | | | Z6 | | 1.120 | | | |
| 5 | 251 | 253 | S9 | All | 10.650 | 2.000 | 1.57960 | 53.89 | 6.46 |
| | | | S10 | All | −15.563 | 0.150 | | | 6.21 |
| 6 | 251 | 253 | S11 | All | 6.574 | 2.800 | 1.62004 | 36.37 | 5.94 |
| 7 | 251 | 253 | S12 | All | −7.293 | 2.336 | 1.84666 | 23.83 | 5.13 |
| | | | S13 | All | 4.640 | 1.444 | | | 4.16 |
| 8 | 251 | 253 | S14 | All | 36.819 | 1.400 | 1.62004 | 36.37 | 5.21 |
| | | | S15 | Z1 | −8.741 | 0.150 | | | 5.64 |
| | | | | Z2 | | 0.150 | | | |
| | | | | Z3 | | 5.958 | | | |
| | | | | Z4 | | 5.388 | | | |
| | | | | Z5 | | −6.770 | | | |
| | | | | Z6 | | 6.150 | | | |
| 9 | 254 | | S16 | All | Infinity | 16.000 | 1.77250 | 49.60 | 9.85 |
| | | | S17 | All | Infinity | 0.150 | | | 9.85 |
| 10 | 254 | | S18 | All | 10.047* | 5.000 | 1.52996 | 55.87 | 10.72 |
| | | | S19 | Z1 | − 8.560* | 11.589 | | | 10.72 |
| | | | | Z2 | | 11.439 | | | |
| | | | | Z3 | | 11.114 | | | |
| | | | | Z4 | | 10.964 | | | |
| | | | | Z5 | | 5.997 | | | |
| | | | | Z6 | | 5.997 | | | |
| 11 | 255 | 256 | S20 | All | −4.606* | 2.000 | 1.52996 | 55.87 | 5.59 |
| | | | S21 | All | −12.713 | 2.357 | | | 5.71 |
| 12 | 255 | 256 | S22 | All | 4.689* | 3.636 | 1.77250 | 49.60 | 5.19 |
| | | | S23 | All | −7.449* | 0.150 | | | 5.19 |
| 13 Stop | 255 | 256 | S24 | All | −62.170 | 2.499 | 1.84666 | 23.83 | 3.80 |
| | | | S25 | All | 3.281 | 0.530 | | | 2.55 |
| 14 | 255 | 256 | S26 | All | 12.439 | 2.000 | 1.77250 | 49.60 | 2.72 |
| | | | S27 | Z1 | −9.610 | 6.713 | | | 3.39 |
| | | | | Z2 | | 6.863 | | | |
| | | | | Z3 | | 7.188 | | | |
| | | | | Z4 | | 7.338 | | | |
| | | | | Z5 | | 12.305 | | | |
| | | | | Z6 | | 12.305 | | | |
| Image | | | S28 | All | Infinity | | | | 6.00 |

*Surface profiles of aspheric surfaces S4, S18, S19, S20, S22 and S23 are governed by the following conventional equation:

$$Z = \frac{(CURV)Y^2}{1 + (1 - (1 + K)(CURV)^2 Y^2)^{1/2}} + (A)Y^4 + (B)Y^6 + (C)Y^8 + (D)Y^{10} + (E)Y^{12} + (F)Y^{14} + (G)Y^{16}$$

where:

CURV=1/(Radius of Curvature)

Y=Aperture height, measured perpendicular to optical axis

K, A, B, C, D, E, F, G=Coefficients

Z=Position of surface profile for a given Y value, as measured along the optical axis from the pole (i.e. axial vertex) of the surface.

The coefficients for the surface S4 of item 2 are:
K=−1.89477
A=1.44889E-03
B=−5.88728E-04
C=1.31651E-04
D=−2.99149E-05
E =1.41310E-07
F=8.64508E-08
G=−4.47413E-09

The coefficients for the surface S18 of item 10 are:
K=1.20801
A=−7.62699E-04
B=5.22283E-05
C=−2.37254E-06
D=3.31184E-08
E=0.00000
F=0.00000
G=0.00000

The coefficients for the surface S19 of item 10 are:
K=0.00000
A=2.75081E-04
B=4.52938E-05
C=−2.19723E-06
D=3.72702E-08
E=0.00000
F=0.00000
G=0.00000

The coefficients for the surface S20 of item 11 are:
K=−4.17760
A=4.82288E-04
B=−1.05427E-04
C=1.45621E-05
D=−8.69523E-07
E=0.00000
F=0.00000
G=0.00000

The coefficients for the surface S22 of item 12 are:
K=−0.29273
A=−3.44108E-03
B=−4.55219E-05
C=−1.13048E-05
D=−1.26399E-06
E=0.00000
F=0.00000
G=0.00000

The coefficients for the surface S23 of item 12 are:
K=3.69958
A=1.24196E-03
B=−7.54294E-04
C=1.97648E-05
D=−9.60029E-05
E=2.91221E-06
F=−5.00753E-07
G=3.95930E-08

The foregoing footnote * to TABLE 3 includes the equation for calculating the shape of the aspheric surfaces S4, S18, S19, S20, S22 and S23 for the value Z, wherein CURV is the curvature at the pole of the surface, Y is the height or distance from the optical axis of a specific point on the surface of the glass, K is the conic coefficient, and A, B, C, D, E, F and G are the 4th, 6th, 8th, 10th, 12th, 14th and 16th, respectively, order deformation coefficients. As noted above, for illustrating the scope and versatility of the present invention there are six different Zoom Positions Z1–Z6 set forth in the data of TABLE 3 which provide specific data for three different positions for the two movable zoom subgroups. The Zoom Positions Z1, Z3 and Z5 are representative of three positions of the zoom subgroups 253 and 256 adjusted for an infinitely distant object, with Zoom Positions Z1 and Z5 being the extreme positions and Z3 being an intermediate position. Of course, it will be understood that continuous zooming is available between the extreme Zoom Positions Z1 and Z5, and that any combination of continuous zooming is available within the described zoom ranges with the lens system 250. Zoom Positions Z2, Z4 and Z6 are representative of three close-focus positions of the zoom subgroups 253 and 256 adjusted for an object located 100 mm from the front vertex of the lens system. Zoom Position Z2 is a close-focus companion to Zoom Position Z1 in the sense that it is the shortest focal length position for a 100 mm object distance. Similarly, Zoom Positions Z4 and Z6 are close-focus companions to Zoom Positions Z3 and Z5, respectively.

The Effective Focal Length (EFL), Full Field Of View (FFOV) and F-number of the lens system 250 varies for the different Zoom Positions. Referring now to FIGS. 22–24, the zoom lens system 250 is shown with the zoom groups in various Zoom Positions and with light ray traces for those positions. FIG. 22 represents the zoom position Z1 for which data is set forth above in TABLE 3 with an EFL of about 3.0 mm, a FFOV of about 90.0°, and an F-number of about 3.0. FIG. 23 represents the zoom position Z2 from TABLE 3 with an EFL of about 6.0 mm, a FFOV of about 53.4°, and an F-number of about 3.0. FIG. 24 represents the zoom position Z3 from TABLE 3 with an EFL of about 13.9 mm, a FFOV of about 24.4°, and an F-number of about 6.0.

From the specifications for the individual lens elements (Items 1–14) and the separation between lens elements set forth in TABLE 3, the focal lengths of each lens element and then each group of lens elements (i.e. first lens group 252, first zoom subgroup 253, second lens group 254, and second zoom subgroup 256) may be calculated by using the aforementioned ZEMAX® optical design software, and those calculated group focal lengths are as follows:

First lens group 252 (elements 1–4)=−6.510 mm;
First zoom subgroup 253 (elements 5–8)=9.834 mm;
Second lens group 254 (elements 9 and 10)=9.617 mm; and
Second zoom subgroup 256 (elements 11–14)=6.687 mm.

Also, it should be noted that the zoom lens system 250 is provided with one optical stop at the surface S25 which controls the diameter of the aperture through which light rays may pass at that point to thereby cause any light rays in the zoom lens system radially beyond that diameter to be stopped. The optical stop is the location at which a physical iris is located. The iris is located within or at an end of the second zoom subgroup 256, and moves with that zoom subgroup. Note that in FIG. 24, for example, the rim rays pass through S25 with room to spare, while in FIG. 23, the rim rays are almost touching the extreme edges of S25 as they pass through the optical stop. This shows that the iris located at S25 must open as the focal length increases. To maintain a constant f-number at the image, the iris must "zoom" or change. In other words, the iris must be adjusted for constant aperture. A separate cam may be used to open or close the iris during zooming. In addition, it should be noted that all of the lens element surface apertures, set forth in TABLE 3, act as field stops at all focus and zoom positions as depicted in FIGS. 22–24.

The two zoom subgroups 253 and 256 are each axially movable independently and their respective movements are coordinated by any convenient means, such as conventional mechanical devices such as cams or the like, to accomplish the desired focusing, zooming and athermalization functions.

The zoom lens system 250 has an iris S25 located within the second zoom subgroup 256 and therefore the iris S25 moves axially therewith. The size of the aperture of iris S25 is adjusted as the second zoom subgroup 256 moves axially, as described above, with respect to the maximum aperture diameters listed in TABLE 3 and is given with its largest value in TABLE 3.

Figure 26:
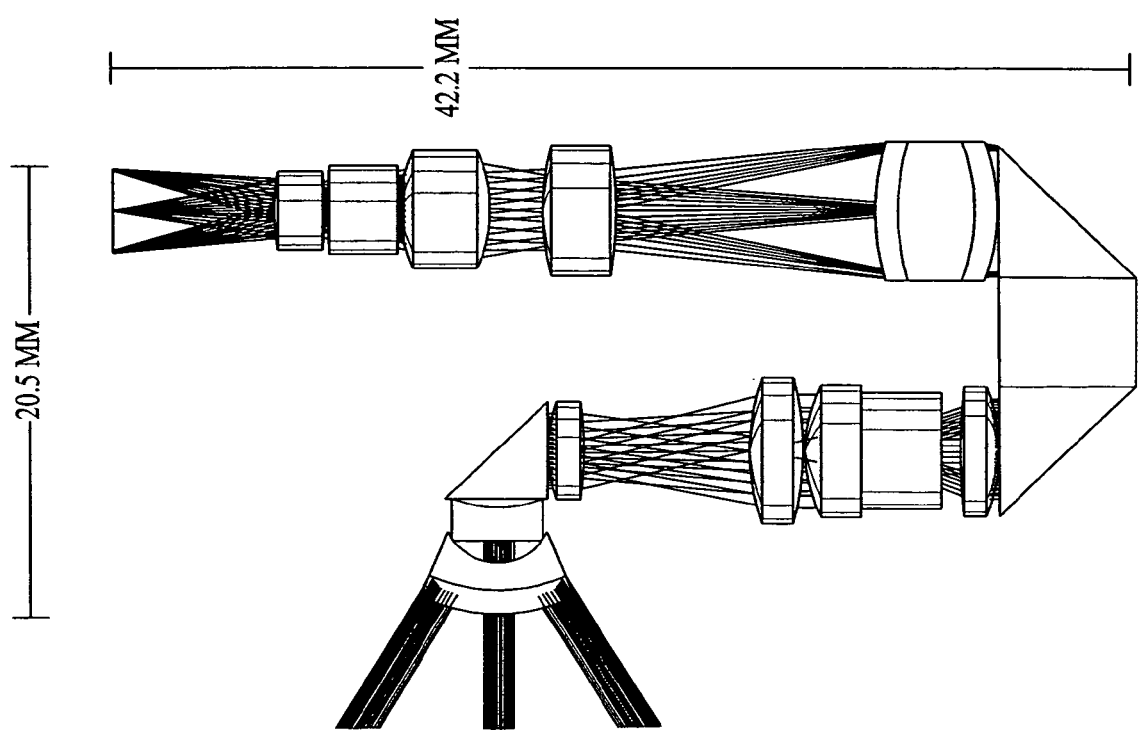
FIG. 26 illustrates a folded layout of the compound zoom lens according to the third embodiment of the present invention.
Figure 27:
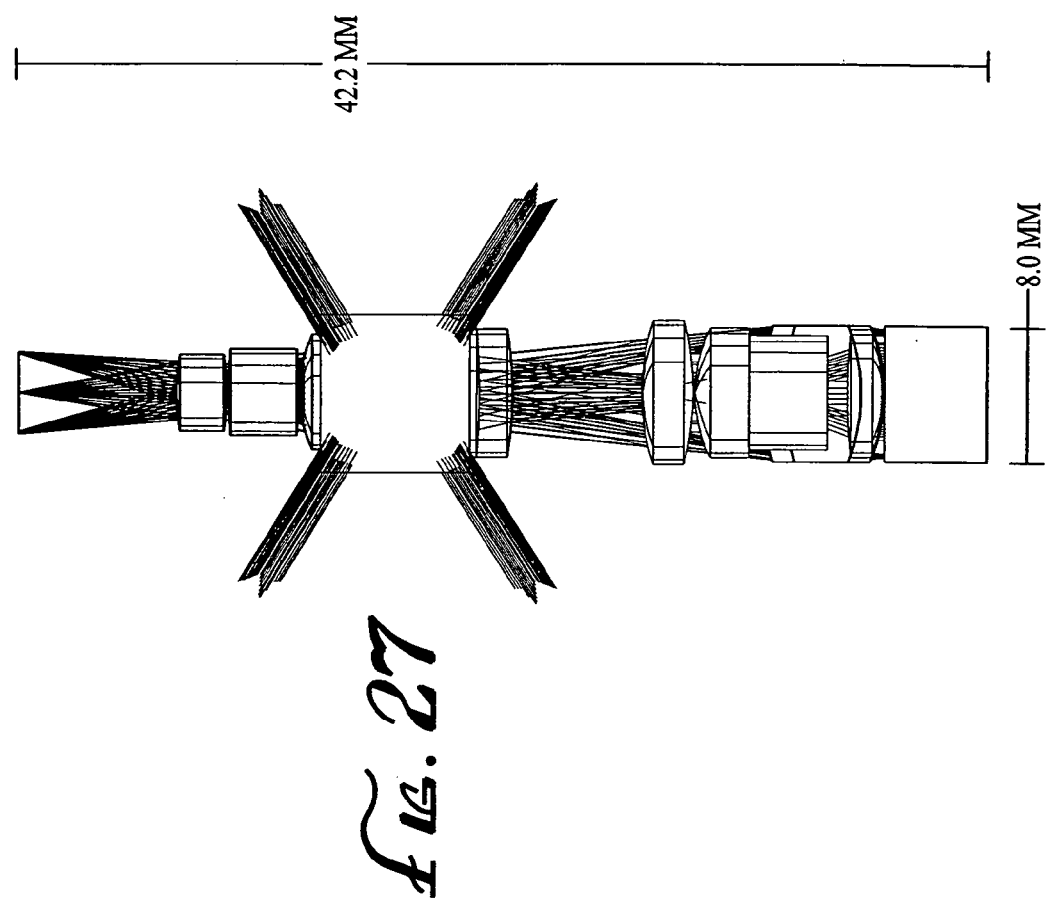
FIG. 27 illustrates a folded layout of the compound zoom lens according to the third embodiment of the present invention.

FIG. 25 shows a three-dimensional view of the system of the first exemplary embodiment. As indicated in FIG. 25, the front two elements and the two field lenses can be truncated with a rectangular profile in non-rotational embodiments to minimize bulk. FIGS. 26 and 27 show two different views of a folded non-rotational system with overall dimensions.

The specifications, performance and optical prescription described and illustrated throughout this application generally correspond to a non-rotating compound zoom lens. However, the optional rotational capability of the compound zoom lens is illustrated in FIG. 25. In one embodiment, the first fold prism 2500 and the front elements 2502 (which may be round instead of truncated in rotating embodiments) may rotate as a unit about the optical axis 2506 with respect to the lens element 2508 and all other lens elements and prisms on the image side of the first fold prism 2500, as indicated by arrow 2510. However, in alternative embodiments the rotation could occur between any of the lens elements 2512. In another embodiment, the second fold prism 2514 and all elements and prisms on the object side of the second fold prism 2514 may rotate as a unit about the optical axis 2516 with respect to the elements and prisms on the image side of the second fold prism 2514, as indicated by arrow 2518. Note that element 2520 may be round instead of truncated in rotating embodiments. However, in alternative embodiments the rotation could occur between any of the lens elements 2524. In further alternative embodiments, both rotations are possible. These rotations may allow part of the compound zoom lens to be located in the hinge of a clamshell style cellular telephone, for example.

It should also be understood that in order to preserve the example specifications, performance and optical prescription described and illustrated herein and avoid vignetting, rotational embodiments of the present invention require that the detector have a square aspect ratio, each side of the detector being equivalent to the smallest dimension of the rectangular image formed by the optical prescription of the non-rotational embodiment described herein. Alternatively, in order to preserve the image formed by the optical prescription of the non-rotational embodiment described herein and avoid vignetting, rotational embodiments of the present invention require some revisions to the optical prescription that do not require undue experimentation and are well within the capabilities of those skilled in the art to provide for larger prisms and changes to the other lens elements. By doing so, a rectangular image or any image shape may be captured regardless of how the zoom lens is rotated.

Referring now to FIGS. 28–33, the ray aberration graphs for Zoom Positions Z1–Z6, respectively, are shown in a conventional manner by six separate pairs of graphs with the maximum field height of 45° at the lower right corner and zero field height at the upper left corner and for three wavelengths (486 nm, 588 nm, and 656 nm). The left graph in each pair is the Y-FAN, while the right graph in each pair is the X-FAN. Each tic mark on the vertical axis represents 10 microns, and thus the maximum scale is +/−50 microns. As will readily appear to those skilled in the art, these performance curves establish that in all six Zoom Positions the zoom lens system performs exceptionally well for current broadcast television NTSC quality and very well for HDTV broadcast television quality.

Fourth exemplary embodiment. FIG. 34 illustrates an unfolded layout of a fourth exemplary embodiment of the optionally rotatable compound zoom lens with lens elements and surfaces identified. The fourth exemplary embodiment is similar in specification and performance to the third exemplary embodiment, but utilizes a variable focus liquid lens chamber for focusing to a close object distance.

The specifications of the fourth exemplary embodiment (without the rotation feature) are approximately as follows:
Zoom Ratio: 4.8:1
Focal Length: 3.0–13.9 mm
Aperture: f/3.0–f/6.3
Full Field of View: 90.0 deg.–24.4 deg.
35 mm Still Equivalent: 21 mm–100 mm
35 mm Cine Equivalent: 14 mm–67 mm
Unfolded Vertex Length: 80.9 mm
Format: ⅓" (6 mm diagonal)
Folded Package Size: 42.7 mm×20.7 mm×8.0 mm
Exit Chief Ray Angle: Less than 20.0 degrees throughout zoom range The focal lengths covered by the zoom range of the fourth exemplary embodiment have a 35 mm still camera equivalent of about 21 mm to 100 mm, the front element diameter is remarkably small, and the folded package size is very compact.

The vertex length is 80.9 mm, and two fold prisms are provided to allow the system to fit into a package size of 42.7 mm×20.7 mm×8.0 mm. It should be noted that other configurations are possible. The vertex is longer than in the first two embodiments primarily because the 180 degree fold prism has been lengthened by several millimeters. This lengthening has the direct effect of widening the gap between the folded parts of the optical path, thus allowing more room for mechanical and electrical components.

The working distance of the system is sufficient to place a third fold mirror or prism just before the image plane. This third fold mirror or prism could be used to simplify the sensor placement, or it could also be used to incorporate a true SLR optical viewfinder.

The fourth exemplary non-rotational embodiment of the present invention illustrated in FIG. 34 will now be described in greater detail with accompanying figures and tables. Referring to FIG. 34, each lens element is identified by a numeral from 1 through 18 and the general configuration of each lens element is depicted, but the actual radius of each lens surface is set forth below in a table. The lens surfaces are identified by the letter "S" followed by a numeral from S1 through S33.

Each lens element has its opposite surfaces identified by a separate but consecutive surface number as, for example, lens element 1 has lens surfaces S1 and S2, lens element 5 has lens surfaces S9 and S10 and so forth, as shown in FIG. 34, except that for doublet lens component 1D the coincident facing lens surfaces are given a single surface number S12. For example, doublet 1D is comprised of lens element 6 having a front lens surface S11 and a rear lens surface S12 and lens element 7 having a front lens surface S12 (coincidental) and a rear lens surface S13. The real image surface is identified by the numeral S33. All of the lens surfaces are spherical except lens surfaces S4, S18, S19, S20, S22 and S23 which are aspheric surfaces that are non-spherical, non-plano but rotationally symmetrical about the optical axis.

Before describing the detailed characteristics of the lens elements, a broad description of the lens groups and their axial positions and movement will be given for the zoom lens system, generally designated 350, of this fourth exemplary embodiment of the present invention.

Beginning from the end facing the object to be photographed, i.e. the left end in FIG. 34, a first lens group 351 comprises a first lens subgroup 352 and a first zoom subgroup 353. The first lens subgroup 352 is a negative-powered subgroup and comprises singlet lens elements 1–4 which gather light from object space and reduce the angle of the chief ray with respect to the optical axis (identified with a ∅). The first zoom subgroup 353 is a positive-powered subgroup and comprises a singlet lens element 5, a first doublet 1D comprised of lens elements 6 and 7, and a singlet lens element 8. A second lens group 354 is stationary and is a positive-powered group, and comprises a prism element 9, a singlet lens element 10 and an intermediate image located near or within element 10. Lens element 10 may be referred to as a field lens. A third lens group 355 comprises a second zoom subgroup 356, which is a positive-powered subgroup, and includes an optical stop at S25 and comprises singlet lens elements 11–14 and a variable focus liquid lens chamber comprised of lens elements 15–18.

The positive or negative power of each lens element in the fourth exemplary embodiment of the present invention is set forth below in TABLE 4. As described above, the resultant optical power of each group of lenses is as follows; the first lens subgroup 352 is negative, the first zoom subgroup 353 is positive, the second lens group 354 is positive, and the second zoom subgroup 356 is positive.

The optical design consists of an NP kernel followed by a P relay. There are only two independently moving groups altogether; one on the object side and one on the image side of the intermediate image. This represents the minimum number of moving groups necessary to produce a true zoom lens. The front negative powered group is stationary with respect to the image plane, as are both of the fold prisms. The zoom ratio of 4.8:1 is larger than that found in most compact digital cameras currently on the market, and the field of view at the wide end of 90 degrees is considerably wider than that on any current compact digital camera.

The P relay, comprising a single independently moving positive group, has a notably simple structure that contributes significantly to the simplicity of the system as a whole.

The aperture of the system ranges from about f/3.0 to f/6.0, but is constant at about f/3.0 from about 3.0 mm through 6.0 mm focal length. From 6.0 mm to 13.9 mm focal length the aperture drops gradually from f/3.0 to f/6.0.

This fourth embodiment is significant in its use of a variable focus liquid lens chamber to achieve close focusing. This type of liquid focusing chamber comprises a glass cell enclosing a pair of non miscible liquids having different refractive indices, and is described in detail in U.S. Pat. No. 6,369,954, incorporated by reference herein. The advantage of using such a variable power liquid element is that no moving parts are required for focusing. This can increase the speed and reliability of the focusing action.

In order to minimize the size and optical power of the liquid focusing cell, it is preferably located near the aperture stop. By placing the cell on the image side of the stop the entrance pupil of the system remains constant during focusing. This will largely eliminate any focus breathing, which is an important feature for lenses intended for video cameras.

Each of the zoom subgroups 353 and 356 are movable in both directions along the optical axis for zooming, depending on their positions. In particular, at least one of the zoom subgroups 353 and 356 may be movable along the optical for either focusing and zooming, thermal compensation and zooming, or for focusing, thermal compensation and zooming. The stationary first lens subgroup 352 and second lens group 354 remain stationary and at a fixed distance from the real image surface S33 during zooming. The horizontal arrows with arrowheads on both ends in the upper portion of FIG. 34 indicate that each of the zoom subgroups 353 and 356 are movable in both axial directions but in a monotonic manner (i.e. in only one direction when progressing from one extreme to the other of adjustments).

While only the lens elements are physically shown in FIG. 34, it is to be understood that conventional mechanical devices and mechanisms are provided for supporting the lens elements and for causing axial movement of the movable groups in a conventional lens housing or barrel.

The lens construction and fabrication data for the above-described exemplary fourth zoom lens system embodiment 350 is set forth below in TABLE 4.

In TABLE 4, the first column "ITEM" identifies each optical element, with the same numeral or label as used in FIG. 34. The second and third columns identify the "Group" and "Subgroup," respectively, to which that optical element (lens) belongs with the same numerals used in FIG. 34. The fourth column "Surface" is a list of the surface numbers of the Stop (iris) S25 and each of the actual surfaces of the lenses, as identified in FIG. 34. The fifth column "Zoom Position" identifies six typical zoom positions (Z1–Z6) of the zoom subgroups 353 and 356 (illustrated in FIGS. 35–37) wherein there are changes in the distance (separation) between some of the surfaces listed in the fourth column, as described below more thoroughly. The sixth column, headed by the legend "Radius of Curvature," is a list of the optical surface radius of curvature for each surface, with a minus sign (–) meaning the center of the radius of curvature is to the left of the surface, as viewed in FIG. 34, and "Infinity" meaning an optically flat surface. The asterisk (*) for surfaces S4, S18, S19, S20, S22 and S23 indicate these are aspheric surfaces for which the "radius of curvature" is a base radius, and the formula and coefficients for those two surfaces are set forth as a footnote to TABLE 4 at the * (asterisk). The seventh column "Thickness or Separation" is the axial distance between that surface (fourth column) and the next surface. For example, the distance between surface S2 and surface S3 is 2.124 mm.

The eighth and ninth columns of TABLE 4 provide the refractive index and Abbe # of each lens element. The last column of TABLE 4 headed "Aperture Diameter" provides the maximum diameter for each surface through which the light rays pass. All of the maximum aperture diameters, except for the Stop surface S25, are calculated assuming an image diagonal of 6 mm and a relative aperture ranging from f/3.0 at the shortest focal length to f/6.3 at the longest focal length. The maximum aperture diameters of the Stop surface S25 for Zoom Positions Z1–Z6 are 2.406 mm, 2.366 mm, 2.517 mm, 2.392 mm, 1.976 mm, and 1.718 mm, respectively. The relative apertures (f-number) for Zoom Positions Z1–Z6 are f/3.0, f/3.0, f/3.0, f/3.1, f/6.0 and f/6.7, respectively.

TABLE 4

OPTICAL PRESCRIPTION

| Item | Group | Sub-Group | Surface | Zoom Position | Radius of Curvature (mm) | Thickness or Separation (mm) | refractive Index ($n_d$) | Abbe # ($v_d$) | Aperture Diameter (mm) |
|---|---|---|---|---|---|---|---|---|---|
| 0 | | | | Z1 | | Infinity | | | |
| | | | | Z2 | | 100.000 | | | |
| | | | | Z3 | | Infinity | | | |
| | | | | Z4 | | 100.000 | | | |
| | | | | Z5 | | Infinity | | | |
| | | | | Z6 | | 100.000 | | | |
| 1 | 351 | 352 | S1 | All | 7.649 | 1.000 | 1.74400 | 44.72 | 9.25 |
| | | | S2 | All | 3.632 | 2.124 | | | 6.56 |
| 2 | 351 | 352 | S3 | All | −99.644 | 0.900 | 1.52996 | 55.87 | 6.56 |
| | | | S4 | All | 3.458 | 1.006 | | | 5.64 |
| 3 | 351 | 352 | S5 | All | Infinity | 4.200 | 1.78472 | 25.76 | 5.64 |
| | | | S6 | All | Infinity | 0.150 | | | 6.15 |
| 4 | 351 | 352 | S7 | All | 14.535 | 1.200 | 1.78472 | 25.76 | 6.39 |
| | | | S8 | Z1 | −174.397 | 7.039 | | | 6.43 |
| | | | | Z2 | | 7.039 | | | |
| | | | | Z3 | | 1.302 | | | |
| | | | | Z4 | | 1.302 | | | |
| | | | | Z5 | | 0.500 | | | |
| | | | | Z6 | | 0.500 | | | |
| 5 | 351 | 353 | S9 | All | 11.059 | 2.000 | 1.57960 | 53.89 | 6.54 |
| | | | S10 | All | −14.959 | 0.150 | | | 6.32 |
| 6 | 351 | 353 | S11 | All | 6.740 | 2.800 | 1.62004 | 36.37 | 5.94 |
| 7 | 351 | 353 | S12 | All | −7.405 | 2.379 | 1.84666 | 23.83 | 5.14 |
| | | | S13 | All | 4.849 | 1.280 | | | 4.13 |
| 8 | 351 | 353 | S14 | All | 34.344 | 1.400 | 1.62004 | 36.37 | 5.01 |
| | | | S15 | Z1 | −8.717 | 0.130 | | | 5.44 |
| | | | | Z2 | | 0.130 | | | |
| | | | | Z3 | | 5.866 | | | |
| | | | | Z4 | | 5.866 | | | |
| | | | | Z5 | | 6.670 | | | |
| | | | | Z6 | | 6.670 | | | |
| 9 | 354 | | S16 | All | Infinity | 16.000 | 1.77250 | 49.60 | 6.66 |
| | | | S17 | All | Infinity | 0.150 | | | 9.75 |
| 10 | 354 | | S18 | All | 10.384 | 5.000 | 1.52996 | 55.87 | 10.53 |
| | | | S19 | Z1 | −8.243 | 11.633 | | | 10.53 |
| | | | | Z2 | | 11.633 | | | |
| | | | | Z3 | | 11.239 | | | |
| | | | | Z4 | | 11.239 | | | |
| | | | | Z5 | | 6.068 | | | |
| | | | | Z6 | | 6.068 | | | |
| 11 | 355 | 356 | S20 | All | −4.581 | 2.000 | 1.52996 | 55.87 | 5.67 |
| | | | S21 | All | −11.018 | 2.335 | | | 5.84 |
| 12 | 355 | 356 | S22 | All | 4.648 | 3.667 | 1.77250 | 49.60 | 5.26 |
| | | | S23 | All | −7.441 | 0.150 | | | 5.26 |
| 13 Stop | 355 | 356 | S24 | All | −79.308 | 2.422 | 1.84666 | 23.83 | 3.79 |
| | | | S25 | All | 3.160 | 0.530 | | | 2.52 |
| 14 | 355 | 356 | S26 | All | 14.997 | 2.000 | 1.77250 | 49.60 | 2.66 |
| | | | S27 | All | −9.299 | 0.200 | | | 3.36 |
| 15 | 355 | 356 | S28 | All | Infinity | 0.400 | 1.51680 | 64.17 | 4.00 |
| 16 | 355 | 356 | S29 | All | Infinity | 0.500 | 1.51500 | 47.50 | 4.00 |
| 17 | 355 | 356 | S30 | Z1 | Infinity | 0.500 | 1.33953 | 57.92 | 4.00 |
| | | | | Z2 | 59.981 | | | | |
| | | | | Z3 | Infinity | | | | |
| | | | | Z4 | −21.131 | | | | |
| | | | | Z5 | Infinity | | | | |
| | | | | Z6 | −13.357 | | | | |
| 18 | 355 | 356 | S31 | All | Infinity | 0.400 | 1.51680 | 64.17 | 4.00 |
| | | | S32 | Z1 | Infinity | 5.242 | | | 4.00 |
| | | | | Z2 | | 5.242 | | | |
| | | | | Z3 | | 5.637 | | | |
| | | | | Z4 | | 5.637 | | | |
| | | | | Z5 | | 10.807 | | | |
| | | | | Z6 | | 10.807 | | | |
| Image | | | S33 | All | Infinity | | | | 6.00 |

*Surface profiles of aspheric surfaces S4, S18, S19, S20, S22 and S23 are governed by the following conventional equation:

$$Z = \frac{(CURV)Y^2}{1 + (1 - (1+K)(CURV)^2 Y^2)^{1/2}} + (A)Y^4 + (B)Y^6 + (C)Y^8 + (D)Y^{10} + (E)Y^{12} + (F)Y^{14} + (G)Y^{16}$$

where:

CURV=1/(Radius of Curvature)

Y=Aperture height, measured perpendicular to optical axis

K, A, B, C, D, E, F, G=Coefficients

Z=Position of surface profile for a given Y value, as measured along the optical axis from the pole (i.e. axial vertex) of the surface.

The coefficients for the surface S4 of item 2 are:
K=−1.89477
A=1.44889E-03
B=−5.88728E-04
C=1.31651E-04
D=−2.99149E-05
E=1.41310E-07
F=8.64508E-08
G=−4.47413E-09

The coefficients for the surface S18 of item 10 are:
K=1.20801
A=−7.62699E-04
B=5.22283E-05
C=−2.37254E-06
D=3.31184E-08
E=0.00000
F=0.00000
G=0.00000

The coefficients for the surface S19 of item 10 are:
K=0.00000
A=2.75081E-04
B=4.52938E-05
C=−2.19723E-06
D=3.72702E-08
E=0.00000
F=0.00000
G=0.00000

The coefficients for the surface S20 of item 11 are:
K=−4.17760
A=4.82288E-04
B=−1.05427E-04
C=1.45621E-05
D=−8.69523E-07
E=0.00000
F=0.00000
G=0.00000

The coefficients for the surface S22 of item 12 are:
K=−0.29273
A=−3.44108E-03
B=−4.55219E-05
C=−1.13048E-05
D=−1.26399E-06
E=0.00000
F=0.00000
G=0.00000

The coefficients for the surface S23 of item 12 are:
K=3.69958
A=1.24196E-03
B=−7.54294E-04
C=1.97648E-05
D=−9.60029E-05
E=2.91221E-06
F=−5.00753E-07
G=3.95930E-08

The foregoing footnote * to TABLE 4 includes the equation for calculating the shape of the aspheric surfaces S4, S18, S19, S20, S22 and S23 for the value Z, wherein CURV is the curvature at the pole of the surface, Y is the height or distance from the optical axis of a specific point on the surface of the glass, K is the conic coefficient, and A, B, C, D, E, F and G are the 4th, 6th, 8th, 10th, 12th, 14th and 16th, respectively, order deformation coefficients. As noted above, for illustrating the scope and versatility of the present invention there are six different Zoom Positions Z1, Z2, Z3, Z4, Z5 and Z6 set forth in the data of TABLE 4 which provide specific data for six different positions for the two movable zoom subgroups and the variable focus liquid. The Zoom Positions Z1, Z3 and Z5 are representative of three positions of the zoom subgroups 253 and 256 adjusted for an infinitely distant object, with Zoom Positions Z1 and Z5 being the extreme positions and Z3 being an intermediate position. Of course, it will be understood that continuous zooming is available between the extreme Zoom Positions Z1 and Z5, and that any combination of continuous zooming is available within the described zoom ranges with the lens system 350.

Zoom Positions Z2, Z4 and Z6 are representative of three close-focus positions of the zoom subgroups 353 and 356 adjusted for an object located 100 mm from the front vertex of the lens system. Zoom Position Z2 is a close-focus companion to Zoom Position Z1 in the sense that it is the shortest focal length position for a 100 mm object distance. Similarly, Zoom Positions Z4 and Z6 are close-focus companions to Zoom Positions Z3 and Z5, respectively.

The Effective Focal Length (EFL), Full Field Of View (FFOV) and F-number of the lens system 350 varies for the different Zoom Positions. Referring now to FIGS. 35–37, the zoom lens system 350 is shown with the zoom groups in various Zoom Positions and with light ray traces for those positions. FIG. 35 represents the zoom position Z1 for which data is set forth above in TABLE 4 with an EFL of about 3.0 mm, a FFOV of about 90.0°, and an F-number of about 3.0. FIG. 36 represents the zoom position Z3 from TABLE 4 with an EFL of about 6.0 mm, a FFOV of about 53.4°, and an F-number of about 3.0. FIG. 37 represents the zoom position Z5 from TABLE 4 with an EFL of about 13.9 mm, a FFOV of about 24.4°, and an F-number of about 6.0.

From the specifications for the individual lens elements (Items 1–18) and the separation between lens elements set forth in TABLE 4, the focal lengths of each lens element and then each group of lens elements (i.e. first lens group 352, first zoom subgroup 353, second lens group 354, and second zoom subgroup 356) may be calculated by using the aforementioned ZEMAX optical design software, and those calculated group focal lengths are as follows:

First lens group 352 (elements 1–4)=−6.357 mm;
First zoom subgroup 353 (elements 5–8)=9.645 mm;
Second lens group 354 (elements 9 and 10)=9.560 mm; and
Second zoom subgroup 356 (elements 11–14)=6.777 mm.

Also, it should be noted that the zoom lens system 350 is provided with one optical stop at the surface S25 which controls the diameter of the aperture through which light rays may pass at that point to thereby cause any light rays in the zoom lens system radially beyond that diameter to be stopped. The optical stop is the location at which a physical iris is located. The iris is located within or at an end of the second zoom subgroup 356, and moves with that zoom subgroup. Note that in FIG. 37, for example, the rim rays pass through S25 with room to spare, while in FIG. 36, the rim rays are almost touching the extreme edges of S25 as they pass through the optical stop. This shows that the iris located at S25 must open as the focal length increases. To maintain a constant f-number at the image, the iris must "zoom" or change. In other words, the iris must be adjusted for constant aperture. A separate cam may be used to open or close the iris during zooming. In addition, it should be noted that all of the lens element surface apertures, set forth in TABLE 4, act as field stops at all focus and zoom positions as depicted in FIGS. 35–37.

The two zoom subgroups 353 and 356 are each axially movable independently and their respective movements are coordinated by any convenient means, such as conventional mechanical devices such as cams or the like, to accomplish the desired zooming functions.

The zoom lens system 350 has an iris S25 located within the second zoom subgroup 356 and therefore the iris 325 moves axially therewith. The size of the aperture of iris S25 is adjusted as the second zoom subgroup 356 moves axially, as described above, with respect to the maximum aperture diameters listed in TABLE 4 and is given with its largest value in TABLE 4.

Figure 39:
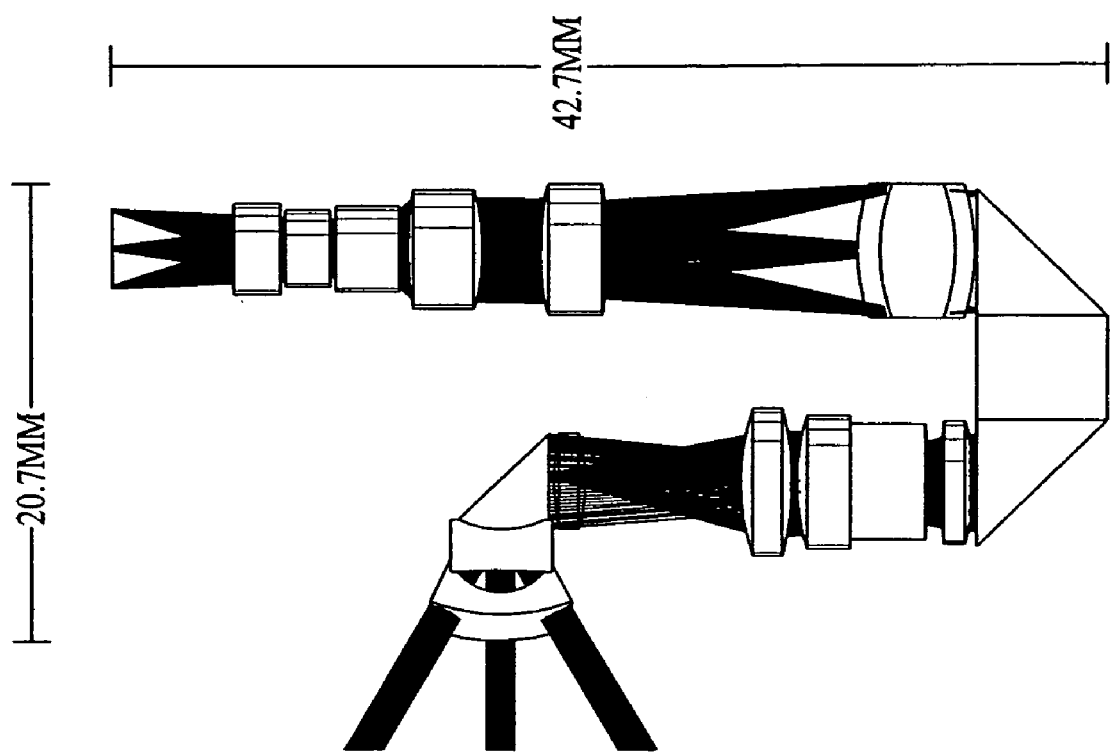
FIG. 39 illustrates a folded layout of the compound zoom lens according to the fourth embodiment of the present invention.
Figure 40:
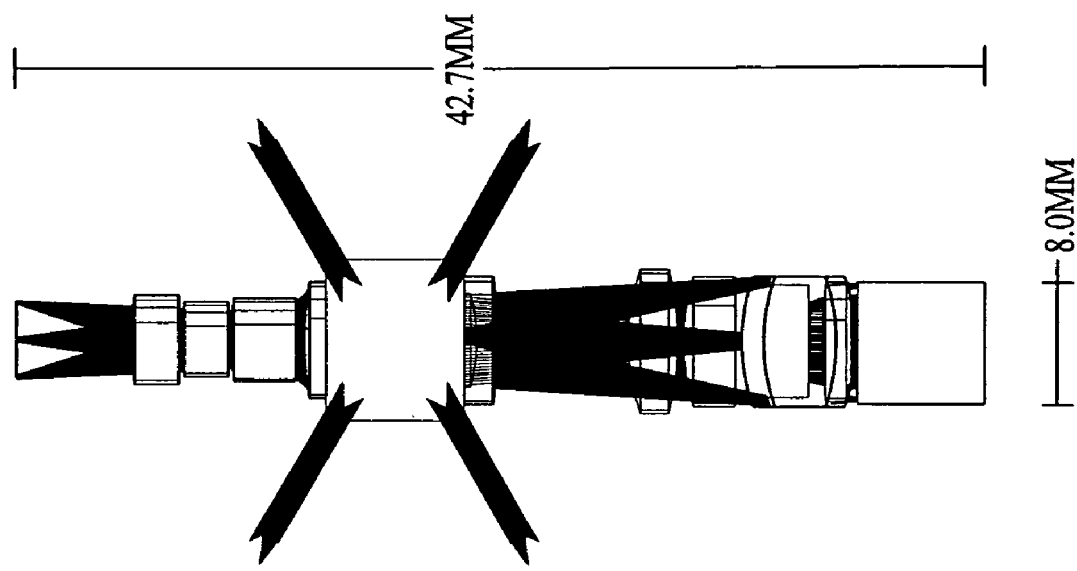
FIG. 40 illustrates a folded layout of the compound zoom lens according to the fourth embodiment of the present invention.

FIG. 38 shows a three-dimensional view of the system of the first exemplary embodiment. As indicated in FIG. 38, the front two elements and the two field lenses can be truncated with a rectangular profile in non-rotational embodiments to minimize bulk. FIGS. 39 and 40 show two different views of a folded non-rotational system with overall dimensions.

The specifications, performance and optical prescription described and illustrated throughout this application generally correspond to a non-rotating compound zoom lens. However, the optional rotational capability of the compound zoom lens is illustrated in FIG. 38. In one embodiment, the first fold prism 3500 and the front elements 3502 (which may be round instead of truncated in rotating embodiments) may rotate as a unit about the optical axis 3506 with respect to the lens element 3508 and all other lens elements and prisms on the image side of the first fold prism 3500, as indicated by arrow 3510. However, in alternative embodiments the rotation could occur between any of the lens elements 3512. In another embodiment, the second fold prism 3514 and all elements and prisms on the object side of the second fold prism 3514 may rotate as a unit about the optical axis 3516 with respect to the elements and prisms on the image side of the second fold prism 3514, as indicated by arrow 3518. Note that element 3520 may be round instead of truncated in rotating embodiments. However, in alternative embodiments the rotation could occur between any of the lens elements 3524. In further alternative embodiments, both rotations are possible. These rotations may allow part of the compound zoom lens to be located in the hinge of a clamshell style cellular telephone, for example.

It should also be understood that in order to preserve the example specifications, performance and optical prescription described and illustrated herein and avoid vignetting, rotational embodiments of the present invention require that the detector have a square aspect ratio, each side of the detector being equivalent to the smallest dimension of the rectangular image formed by the optical prescription of the non-rotational embodiment described herein. Alternatively, in order to preserve the image formed by the optical prescription of the non-rotational embodiment described herein and avoid vignetting, rotational embodiments of the present invention require some revisions to the optical prescription that do not require undue experimentation and are well within the capabilities of those skilled in the art to provide for larger prisms and changes to the other lens elements. By doing so, a rectangular image or any image shape may be captured regardless of how the zoom lens is rotated.

Referring now to FIGS. 41–46, the ray aberration graphs for Zoom Positions Z1–Z6, respectively, are shown in a conventional manner by six separate pairs of graphs with the maximum field height of 45° at the lower right corner and zero field height at the upper left corner and for three wavelengths (486 nm, 588 nm, and 656 nm). The left graph in each pair is the Y-FAN, while the right graph in each pair is the X-FAN. Each tic mark on the vertical axis represents 10 microns, and thus the maximum scale is +/−50 microns. As will readily appear to those skilled in the art, these performance curves establish that in all six Zoom Positions the zoom lens system performs exceptionally well for current broadcast television NTSC quality and very well for HDTV broadcast television quality.

It should be known that the fly-off shown in several of the transverse ray aberration plots in all of the embodiments described above only applies to a very small area of the light beam for each plot, and therefore has little effect on performance. In addition, it should be understood that all of the data in all of the embodiments described above is given at a temperature of 20° C. (68° F.) and standard atmospheric pressure (760 mm Hg).

Although the present invention has been fully described in connection with embodiments thereof with reference to the accompanying drawings, it is to be noted that various changes and modifications will become apparent to those skilled in the art. Such changes and modifications are to be understood as being included within the scope of the present invention.

What is claimed is:

1. A zoom lens system for forming a final image of an object, said system having an object side and an image side and forming a first intermediate real image between the object and the final image, said system comprising in order from the object side to the image side:
    a first lens group including a zoom subgroup A containing at least one lens element located between the object and the first intermediate real image; and
    a second lens group including a zoom subgroup B containing at least one lens element located between the first intermediate real image and the final image;
    wherein the zoom subgroups A and B are simultaneously movable along an optical axis for zooming; and
    wherein zooming is performed in at least one of the first and second lens groups by only a single zoom subgroup.

2. The zoom lens system as recited in claim 1, further comprising a negatively powered first lens subgroup on the object side of the zoom subgroup A that is stationary with respect to the final image.

3. The zoom lens system as recited in claim 2, the first lens subgroup for accepting a maximum field of view of at least about 65 degrees.

4. The zoom lens system as recited in claim 2, the first lens subgroup including a fold prism for folding gathered light and the optical axis.

5. The zoom lens system as recited in claim 4, wherein the fold prism and all lens elements on the object side of the fold prism are rotatable as a unit about the optical axis.

6. The zoom lens system as recited in claim 2, the first lens subgroup and the zoom subgroups A and B having a −++ construction.

7. The zoom lens system as recited in claim 2, wherein one lens element within the first lens subgroup or the zoom subgroup A and all lens elements on the object side of the one lens element are rotatable as a unit about the optical axis.

8. The zoom lens system as recited in claim 1, further comprising a second lens group located between the zoom subgroup A and the zoom subgroup B, said another lens group including or having adjacent to it the first intermediate real image.

9. The zoom lens system as recited in claim 8, wherein the first intermediate real image is formed in an air space between lens elements in the another lens group.

10. The zoom lens system as recited in claim 8, the another lens group including a fold prism for folding gathered light and the optical axis.

11. The zoom lens system as recited in claim 10, wherein the fold prism and all lens elements on the object side of the fold prism are rotatable as a unit about the optical axis.

12. The zoom lens system as recited in claim 8, the another lens group having a + construction.

13. The zoom lens system as recited in claim 8, the another lens group being stationary with respect to the final image.

14. The zoom lens system as recited in claim 1, wherein one lens element within the zoom subgroup B and all lens elements on the object side of the one lens element are rotatable as a unit about the optical axis.

15. The zoom lens system as recited in claim 1, further comprising at least one fold prism located in an area that does not interfere with movement of the zoom subgroups A and B.

16. The zoom lens system as recited in claim 1, further comprising at least one aspherical optical surface.

17. The zoom lens system as recited in claim 16, the at least one aspheric optical surface for contributing to the correction of at least one of distortion and spherical aberrations.

18. The zoom lens system as recited in claim 1, further comprising a fold mirror located between the zoom subgroup B and the final image.

19. The zoom lens system as recited in claim 1, further comprising a fold prism located between the zoom subgroup B and the final image.

20. The zoom lens system as recited in claim 1, the zoom subgroup B comprising at least one lens element radius of curvature that is variable for focusing.

21. The zoom lens system as recited in claim 20, the zoom subgroup B comprising at least one liquid lens element.

22. The zoom lens system as recited in claim 20, wherein the lens element variable radius of curvature is located near an aperture stop for minimizing focus breathing.

23. The zoom lens system as recited in claim 1, at least one of the zoom subgroups A and B movable along the optical for focusing and zooming.

24. The zoom lens system as recited in claim 1, at least one of the zoom subgroups A and B movable along the optical axis for thermal compensation and zooming.

25. The zoom lens system as recited in claim 1, at least one of the zoom subgroups A and B movable along the optical axis for focusing, thermal compensation and zooming.

26. The zoom lens system as recited in claim 1, the second lens group further including a zoom subgroup C containing at least one lens element located between the zoom subgroup B and the final image;
wherein at least two of the three zoom subgroups A, B and C are simultaneously movable along an optical axis for zooming.

27. The zoom lens system as recited in claim 26, the zoom subgroup C having a + construction.

28. The zoom lens system as recited in claim 26, at least one of the zoom subgroups A, B and C movable along the optical for focusing and zooming.

29. The zoom lens system as recited in claim 26, at least one of the zoom subgroups A, B and C movable along the optical axis for thermal compensation and zooming.

30. The zoom lens system as recited in claim 26, at least one of the zoom subgroups A, B and C movable along the optical axis for focusing, thermal compensation and zooming.

31. The zoom lens system as recited in claim 1, the first lens group further including a zoom subgroup C containing at least one lens element and located between the zoom subgroup A and the first intermediate real image;
wherein at least two of the three zoom subgroups A, B and C are simultaneously movable along an optical axis for zooming; and
wherein when the zoom subgroups A and C are simultaneously moving along the optical axis for zooming, and the zoom subgroup B is temporarily stationary, the zoom lens system has a zoom ratio of less than 10 to 1.

32. The zoom lens system as recited in claim 31, the zoom subgroup C having a + construction.

33. The zoom lens system as recited in claim 31, at least one of the zoom subgroups A, B and C movable along the optical axis for focusing and zooming.

34. The zoom lens system as recited in claim 31, at least one of the zoom subgroups A, B and C movable along the optical axis for thermal compensation and zooming.

35. The zoom lens system as recited in claim 31, at least one of the zoom subgroups A, B and C movable along the optical axis for focusing, thermal compensation and zooming.

36. The zoom lens system as recited in claim 1, the first lens group comprising only a single zoom subgroup and the second lens group comprising only a single zoom subgroup.

37. The zoom lens system as recited in claim 36, at least one of the zoom subgroups A and B movable along the optical axis for focusing and zooming.

38. The zoom lens system as recited in claim 36, at least one of the zoom subgroups A and B movable along the optical axis for thermal compensation and zooming.

39. The zoom lens system as recited in claim 36, at least one of the zoom subgroups A and B movable along the optical axis for focusing, thermal compensation and zooming.

40. A zoom lens system for forming a final image of an object, said system having an object side and an image side and forming a first intermediate real image between the object and the final image, said system comprising in order from the object side to the image side:
a first zooming portion including at least one lens element and located between the object and the first intermediate real image; and
a second zooming portion including at least one lens element and located between the first intermediate real image and the final image;
wherein the first and second zooming portions are continuously and simultaneously movable along an optical axis for zooming; and
wherein zooming is performed in at least one of the first and second zooming portions by only a single zoom subgroup.

41. A zoom lens system for forming a final image of an object, said system forming a first intermediate real image between the object and the final image, said system comprising compounded zoom subgroups A and B wherein the zoom subgroups A and B are continuously and simultaneously movable along an optical axis for zooming, the compounded zoom subgroups A and B have controlled pupil imaging with respect to one another, and zooming is performed in at least one of the zoom subgroups A and B by only a single zoom subgroup.

42. A zoom lens system for forming a final image of an object, said system having an object side and an image side and comprising in order from the object side to the image side:
- a zoom subgroup A that forms an intermediate real image; and
- a variable focal length zoom subgroup B that receives the intermediate real image and changes its magnification to form the final image;
- wherein the zoom subgroups A and B are continuously and simultaneously movable along an optical axis for zooming; and
- wherein zooming is performed in at least one of the zoom subgroups A and B by only a single zoom subgroup.

43. A zoom lens system for forming a final image of an object, the zoom lens system having a range of focal lengths between a maximum focal length and a minimum focal length and forming at least a first intermediate real image between the object and the final image for all focal lengths within the range of focal lengths, the zoom lens system having an object side and an image side and comprising in order from the object side to the image side:
- a zoom subgroup A having a focal length that is changed to change the magnification of the first intermediate real image, the zoom subgroup A being located between the object and the first intermediate real image; and
- a zoom subgroup B for changing the magnification of the final image, the zoom subgroup B being located between the first intermediate real image and the final image;
- wherein the zoom subgroups A and B are continuously and simultaneously movable along an optical axis for zooming and focusing; and
- wherein zooming is performed in at least one of the zoom subgroups A and B by only a single zoom subgroup.

44. A zoom lens system comprising:
- a zoom kernel for forming an intermediate real image; and
- a zoom relay that zooms for magnifying the intermediate real image to form a final image;
- wherein the zoom kernel and relay are comprised of zoom subgroups that are continuously and simultaneously movable along an optical axis for zooming; and
- wherein zooming is performed in at least one of the zoom kernel or zoom relay by only a single zoom subgroup.

* * * * *